United States Patent [19]
Schneider

[11] Patent Number: 5,809,560
[45] Date of Patent: Sep. 15, 1998

[54] ADAPTIVE READ-AHEAD DISK CACHE

[75] Inventor: Randy D. Schneider, Spring, Tex.

[73] Assignee: Compaq Computer Corporation, Houston, Tex.

[21] Appl. No.: 543,067

[22] Filed: Oct. 13, 1995

[51] Int. Cl.[6] .................................................. G06F 12/00
[52] U.S. Cl. .............................. 711/204; 711/6; 711/203; 711/202; 711/213
[58] Field of Search .................................... 395/440, 471, 395/417, 823; 711/6, 203, 204, 202, 213

[56] References Cited

U.S. PATENT DOCUMENTS

| | | | |
|---|---|---|---|
| 4,885,680 | 12/1989 | Anthony et al. | 395/471 |
| 4,985,829 | 1/1991 | Thatte et al. | 395/417 |
| 5,003,459 | 3/1991 | Ramanujan et al. | 395/403 |
| 5,317,713 | 5/1994 | Glassburn | 395/440 |
| 5,410,653 | 4/1995 | Macon, Jr. et al. | 395/440 |
| 5,483,641 | 1/1996 | Jones et al. | 395/823 |
| 5,630,097 | 5/1997 | Orbits et al. | 395/492 |

OTHER PUBLICATIONS

Kempainen, Stephen, "Controller boosts SCSI rate to 80 Mbytes/sec", EDN, Sep. 2, 1996, p. 30.
Symbios Logic, Data Sheet —PCI–SCSI Host Adapters.
Symbios Logic, Data Sheet —Fast–20 PCI–SCSI Host Adapters.
Symbios Logic, Data Sheet —SYM53C895 PCI to Ultra2 SCSI I/O Processor.

*Primary Examiner*—Tod R. Swann
*Assistant Examiner*—Fred Fei Tzeng
*Attorney, Agent, or Firm*—Pravel, Hewitt, Kimball & Krieger

[57] ABSTRACT

An adaptive read ahead cache is provided with a real cache and a virtual cache. The real cache has a data buffer, an address buffer, and a status buffer. The virtual cache contains only an address buffer and a status buffer. Upon receiving an address associated with the consumer's request, the cache stores the address in the virtual cache address buffer if the address is not found in the real cache address buffer and the virtual cache address buffer. Further, the cache fills the real cache data buffer with data responsive to the address from said memory if the address is found only in the virtual cache address buffer. The invention thus loads data into the cache only when sequential accesses are occurring and minimizes the overhead of unnecessarily filling the real cache when the host is accessing data in a random access mode.

61 Claims, 41 Drawing Sheets

ADAPTIVE READ-AHEAD DISK CACHE

BACKGROUND OF THE INVENTION

1. Field of the Invention

The present invention relates to a read ahead cache, and more particularly, to an adaptive read ahead cache.

2. Description of the Related Art

Advances in semiconductor technology have delivered processors with more computing power than that of a mainframe. While processing speed has increased tremendously, the input/output (I/O) speed of secondary storage devices such as disk drives has not kept pace. As the processing throughput of the system depends in part on the slowest component, the bottleneck associated with an unduly slow storage system may neutralize the speed advantages of a fast host processor. Additionally, the use of multiple bus masters may further accentuate the imbalance between the host computer and the peripheral I/O performance. Thus, a high performance disk drive system has become requisite in a modern computer.

Typically, disk I/O performance is dominated by the time mechanical parts of the disk move to a location where the data is stored. After a disk controller receives an instruction from a consumer or a bus master, the controller causes a disk drive motor to actuate disk heads to move to the appropriate location and retrieves the requested data. The time required to position the disk head over the recording surface of a disk is known as a seek time. Seek times for random disk accesses are, on the average, orders of magnitude longer than data transfer times if a semiconductor memory device were accessed. Additionally, because the disk drives have spinning magnetic media platters, a rotational latency while the platter spins to get the data in place for reading is also introduced. These rotational latencies are also orders of magnitude greater than data transfer times of semiconductor memory devices.

To minimize seek and rotational time delays, disk systems incorporate disk caches which take advantage of the principle of locality of references well known in the computer programming art. Typically, the data from the disk is buffered by a large semiconductor memory with a relatively fast access time. If the data requested by the bus master already resides in the cache memory, the controller can transfer the data directly from the cache memory to the requesting bus master. Performance is increased because accessing data from the cache memory is substantially faster than accessing data from the disk drive.

Although often quite effective, such a cache can experience a performance degradation caused in part by the sensitivity of the disk cache to cache hit statistics. A disk cache system having a low hit rate may perform more poorly than an uncached disk due to caching overhead and queuing delays, among others.

One factor affecting the cache performance is the size of the disk cache. With a limited cache memory, a multitude of requests over a variety of data segments can easily exhaust the capability of the disk cache system to retain the desirable data in the cache memory. Often, data that may be reused in the near future is flushed prematurely to make room in the cache memory for handling new requests from the host computer, leading to an increase in the number of disk accesses to fill the cache. The increase in disk activity, also known as thrashing, institutes a self-defeating cycle in which feeding the cache with data previously flushed takes a disproportionate impact on the disk drive utilization. A related factor affecting the hit rate is the cache memory block size allocation. An allocation of a relatively large block of memory reduces the quantity of individually allocatable memory blocks. In systems having multiple concurrent tasks and processes that require access to a large number of data files, a reduction in the number of individually allocatable blocks increases the rate of cache block depletion, once more leading to thrashing which decreases the overall disk system throughput. Although additional memory can be added to the disk cache to alleviate the above-mentioned problems, an upper limit exists as to the size of the disk cache that is cost effective. Thus, a need exists for a cache which minimizes the premature flushing of data from the cache memory.

Another factor affecting the performance of the disk cache is the read-ahead policy for prefetching data into the cache. Prefetching data into the cache enhances performance when the bus master, or consumer, issues sequential data requests. However, in the event that the data is accessed in a random manner, the prefetching policy may be ineffective as data brought into the cache is not likely to be used again soon. Additionally, the prefetching policy may cause a bottleneck on the disk data path, as each attempt to prefetch data from the disk into the cache memory potentially creates a contention for the data path between the disk drive and the bus master. Thus, an automatic prefetch of data in a system with a large percentage of random I/O operations may degrade the overall system performance. As a result, the prefetching of data into the cache memory must be judiciously utilized to minimize the data path contention and the overhead associated with loading data into the cache.

Thus, a read ahead disk cache is needed to avoid the seek and rotational latency and low data transfer rates commonly associated with disk accesses. Further, it is desirable that the readahead disk cache minimizes the loss of performance which occurs when random accesses occur frequently without requiring overly large cache sizes.

SUMMARY OF THE INVENTION

An adaptive read ahead cache is provided with a real cache and a virtual cache. The real cache has a data buffer, an address buffer, and a status buffer. The virtual cache contains only an address buffer and a status buffer. The virtual cache operates in conjunction with the real cache to detect whether or not requests from the consumer, or bus master, are sequential or random in nature.

In the event of a hit in the real cache, data is provided directly from the real cache to the host. The status buffer is appropriately updated to note that the cache line containing the hit is the most recently used line. Alternatively, if the request generates a miss in both the real cache and the virtual cache, the system predicts that random accesses are occurring. The data retrieved from the disk is not buffered in the real cache, but is transferred directly from the disk to the consumer. The virtual cache address buffer is updated with the address of the request generating the miss to enable subsequent accesses to be checked for sequential operation. Thus, the data is not cached to minimize the overhead of filling the cache when the data is randomly accessed.

If the request generates a miss in the real cache but a hit in the virtual cache, the cache predicts that sequential accesses are occurring. After retrieving data from the disk, the system presents the host with the requested data and updates the real cache with data from the disk request. Thus, data is loaded into the real cache only when sequential accesses are occurring.

The invention further reads ahead data based on the size of the request. In the event the request is small, and further, in the event of a hit in the real cache, or in the event of a miss in the real cache and a hit in the virtual cache, the request is modified so that one or more lines of read ahead data is prefetched.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
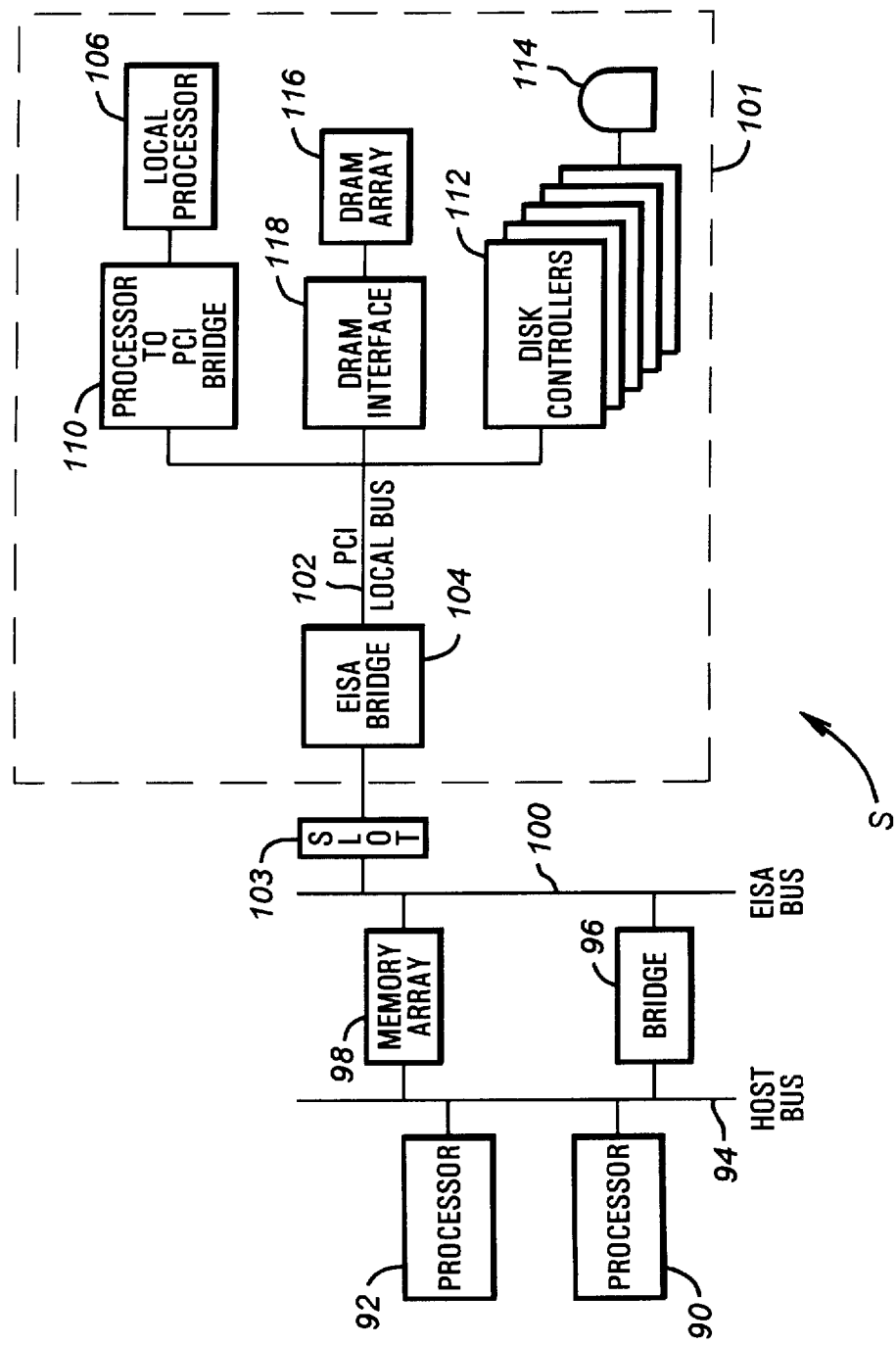
FIG. 1 is a block diagram of the disk array system containing the adaptive read ahead cache of the present invention.

Turning to the drawings, FIGS. 1 shows a block diagram of an intelligent disk array system having an adaptive read-ahead disk cache. For purposes of illustration only, and not to limit generality, the invention will be described with reference to its operation within a disk array system.

The computer system S has a plurality of host processors 90 and 92. These host processors are connected to a host bus 94. The host bus 94 is a relatively high speed bus in comparison with a peripheral bus 100, preferably an EISA bus, which is provided to interface the system S with a plurality of peripherals. A memory array 98 is positioned between the host bus 94 and the EISA bus 100. Additionally, a host bus to EISA bus bridge 96 is placed between the two buses to transfer data from one bus to the other. The EISA bus has one or more slots 103, upon which the disk array system is connected to. Although the bus 100 is illustrated as being an EISA bus, it may alternatively be a PCI bus, or any other suitable buses.

During the operation of the computer system, the bus master issues I/O requests, such as disk read and write requests, to the intelligent disk array system 101 to request that data be transferred over the EISA bus 100. The EISA bus 100 is connected to an EISA bridge 104, which is connected to the disk array system via a PCI local bus 102. The dual bus hierarchy of FIG. 1 allows for concurrent operations on both buses. The EISA bridge 104 also performs data buffering which permits concurrency for operations that cross over from one bus into another bus. For example, an EISA device could post data into the bridge 104, permitting the PCI local bus transaction to complete independently and freeing the EISA bus 100 for further transactions.

The PCI local bus 102 is further connected to a processor to PCI bridge 110. The other side of the processor to PCI bridge 110 is connected to a local processor 106 which oversees the operation of the intelligent disk array system 101, including the caching of the disk data, among others. The processor to PCI bridge 110 interfaces the local processor 106 to the local PCI bus 102 to provide host access to the local processor support functions and to enable the local processor to access resources on the PCI bus 102. The bridge 110 performs a number of functions, including interrupt controls, local processor DRAM interfacing, and decoding for the local processor ports, among others.

The PCI local bus 102 is also connected to a DRAM interface 118, which in turn is connected to a DRAM memory array 116. The DRAM interface 118 and the DRAM memory array 116 can support either a 32 or a 64-bit data path with a parity protected interface and/or an 8-bit error detection and correction of the DRAM array data. The DRAM array 116 provides a buffer which can serve, among others, as a disk caching memory to increase the system throughput. In addition to supporting the DRAM array 116, the DRAM interface 118 supports three hardware commands essential for drive array operations: memory to memory move operation, zero fill operation and zero detect operation. The memory to memory move operation moves data from system memory 98 to a write cache located in the DRAM array 116 during write posting operations. Also, on cache hits to previously posted data still residing in cache, a bus master in the DRAM interface 118 is programmed to move the data in the write cache to the system memory 98. Further, the movement of data located within the DRAM array 116 is supported by the DRAM interface 118. The second hardware command supporting drive array operations is a zero-fill command, which is used to initialize the XOR buffer for RAID 4 and 5 operations. Finally, the DRAM interface bus master supports a zero detect operation, which is used in RAID 1, RAID 4, and RAID 5 operations to check redundant disk data integrity.

The PCI local bus 102 is also connected to one or more disk controllers 112 which is further connected to a plurality of disk drives 114. Each of the plurality of disk controllers 112 is preferably configured for a small computer systems interface (SCSI) type interface and operate as PCI bus masters. As shown in FIG. 1, the local processor 106 may, through the processor to PCI bridge 110, access the DRAM array 116 via the DRAM interface 118 or the disk drives 114 via the disk controllers 112. Similarly, a host processor can, through the EISA bus 100 and through the EISA bridge 104, access the PCI local bus 102 to communicate with the processor to PCI bridge 110, the DRAM interface 118, or the disk controllers 112 to acquire the necessary data.

During operation, the host processor 90 sets up one or more command descriptor blocks (CDBs) to point to a host command packet in the memory array 98. The host processor 90 writes the address of the CDB to the processor to PCI bridge 110 preferably using an exchange operation, with the processor to PCI bridge 110 storing the CDB in a command list FIFO, which is preferably a locked exchange FIFO according to the invention disclosed in a copending application bearing Ser. No. 08/542,801, entitled "LOCKED EXCHANGE FIFO", which was filed concurrently herewith and which is hereby incorporated by reference. The processor to PCI bridge 110 then retrieves the CDB from the memory array 98 into a command FIFO in the processor to PCI bridge 110 and informs the local processor 106 that a command list is available for processing. The local processor 106 parses the CDB for commands. The local processor 106 then builds the CDB in the DRAM memory array 116 for each command. Next, the local processor 106 issues requests or commands pointing to the local CDBs to the DRAM interface 118 as necessary to read or write data to the memory array 98 or other host memory. The local processor 106 issues these commands pointing to the local CDBs to a locked exchange FIFO. The DRAM interface 118 then performs the operations indicated in the local CDBs.

Figure 2:
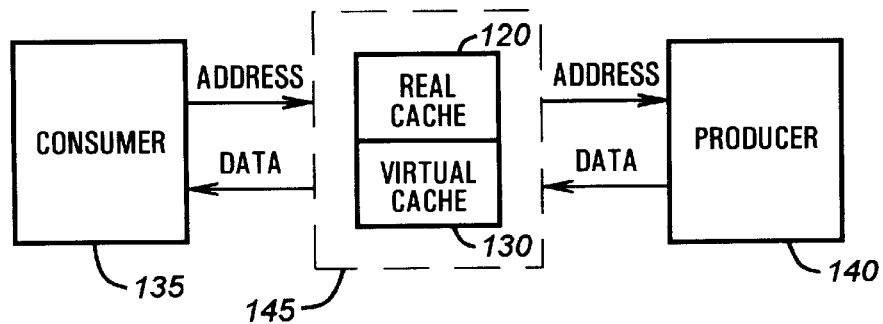
FIG. 2 is a block diagram illustrating the relationship between a consumer, a producer and the adaptive read ahead cache of the present invention.

FIG. 2 shows the relationship between a producer 140, a consumer 135 and an adaptive read-ahead cache 145 of the present invention. In FIG. 2, the consumer 135 provides address signals to and receives data from the adaptive read-ahead cache 145. Further, the producer 140 receives address signals from and provides data to the adaptive read-ahead cache 145. The consumer is preferably one of the bus masters or threads generating disk I/O read requests. The producer is preferably one or more secondary data storage devices, including disk drives, which contain the requested data. The adaptive read-ahead cache 145 buffers data from the disk to improve I/O performance and comprises a real cache 120 and a virtual cache 130, both of which will be discussed in more detail shortly below.

Figure 2A:
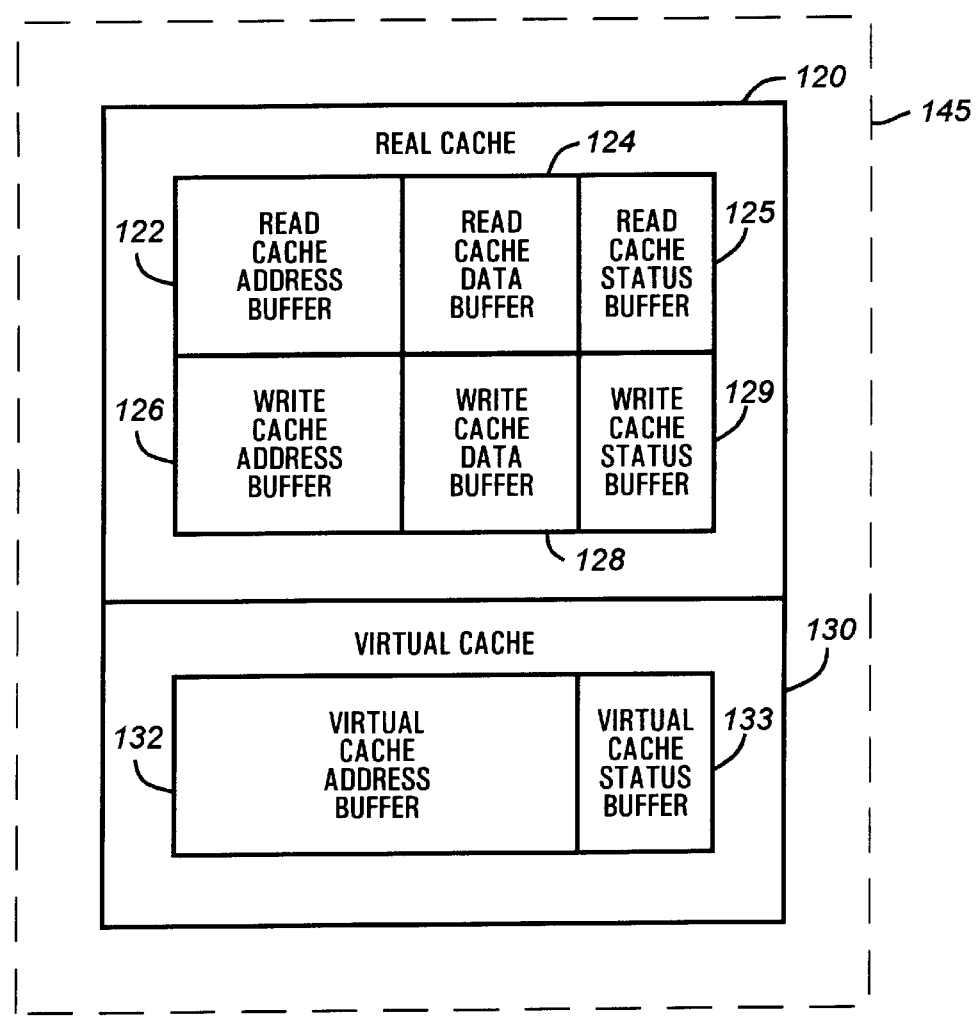
FIG. 2A is a more detailed block diagram of the adaptive read ahead cache of the present invention.

FIG. 2A shows in more detail a block diagram of the adaptive read-ahead cache of the present invention. The adaptive read-ahead cache comprises a real cache 120 and a virtual cache 130 which are allocated from the DRAM array 116. The real cache 120 is further comprised of a read cache for buffering and providing read data to the consumer and a write cache for performing write posting operations. The read cache has a read cache address buffer 122 for storing disk addresses, a read cache data buffer 124 for buffering data corresponding to the disk addresses stored in the read cache address buffer 122, and a read cache status buffer 125. The read cache status buffer 125 tracks the status of each line in the read cache to determine the next candidate line to be swapped out to make room for a new entry in the read cache. The data stored in the read cache data buffer 124 is eventually provided to the consumer in the event of a read hit. Similarly, the write cache has a write cache address buffer 126 for storing write addresses, a write cache data buffer 128 for posting data to be written to the disk, and a write cache status buffer 129 for tracking the next candidate line in the write cache to be replaced when new data is written to the write cache.

The adaptive read-ahead cache additionally has a virtual cache 130 which has a virtual cache address buffer 132 for storing previously requested addresses and a virtual cache status buffer 133 for tracking the status of each line in the virtual cache to determine the next candidate line to be swapped out to make room for a new entry in the virtual cache. The virtual cache operates in conjunction with the real cache to detect whether or not requests from the consumer, or bus master, are sequential or random in nature.

Figure 5:
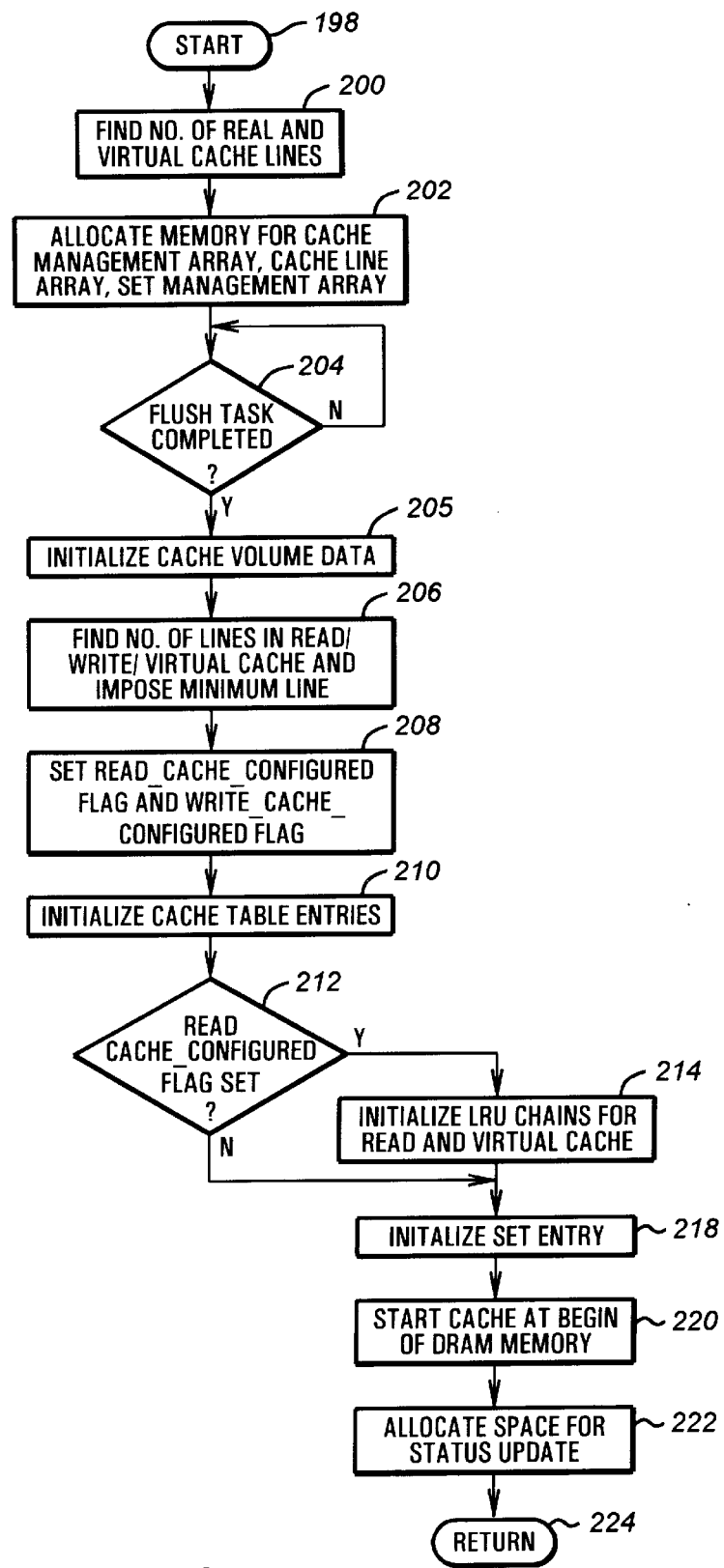
FIG. 5 is a flowchart disclosing the process for allocating space for a write cache, a read cache, and a virtual cache of the present invention.
Figure 6:
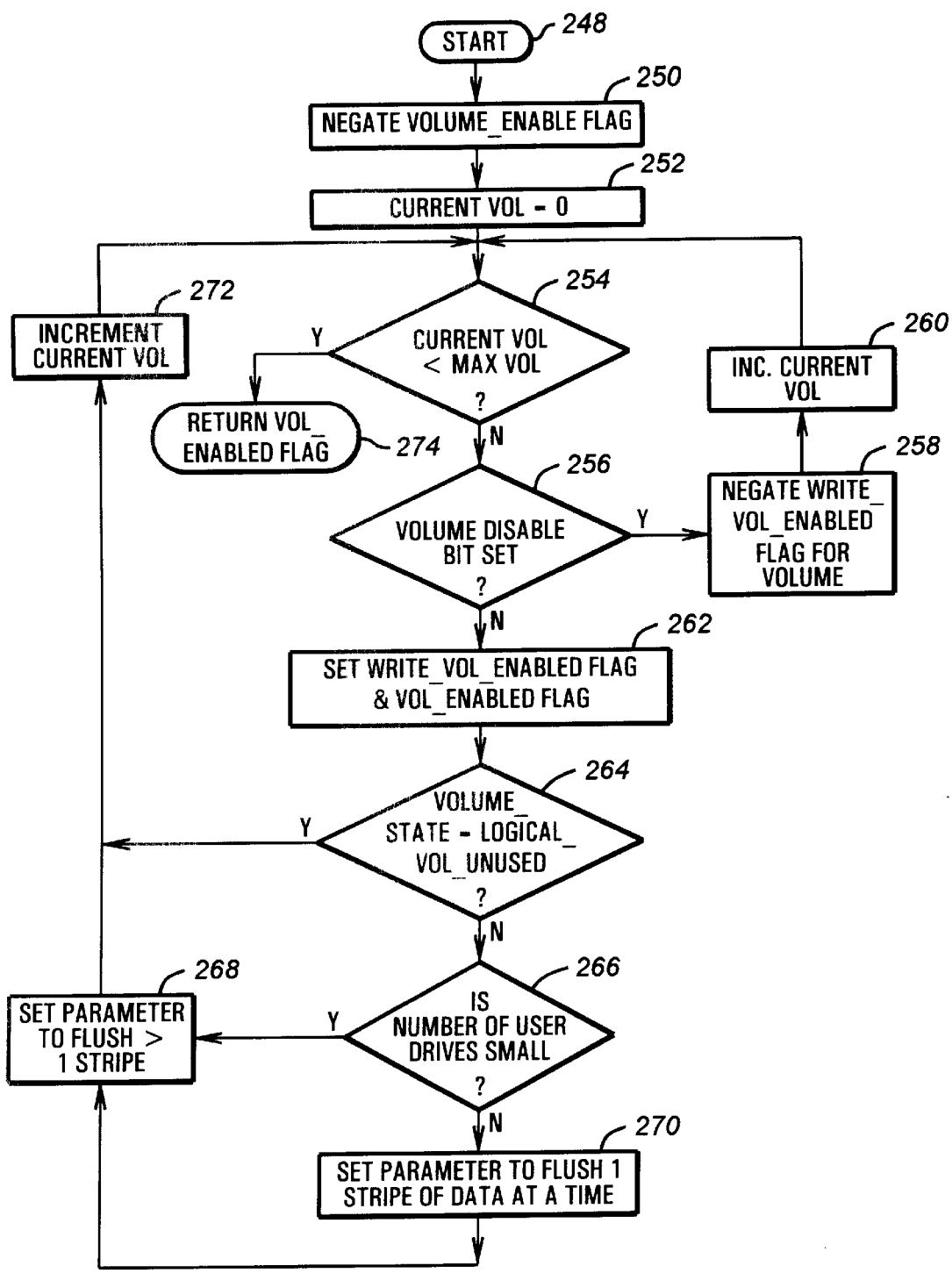
FIG. 6 is a flowchart disclosing the initialization process for cached volumes.
Figure 7:
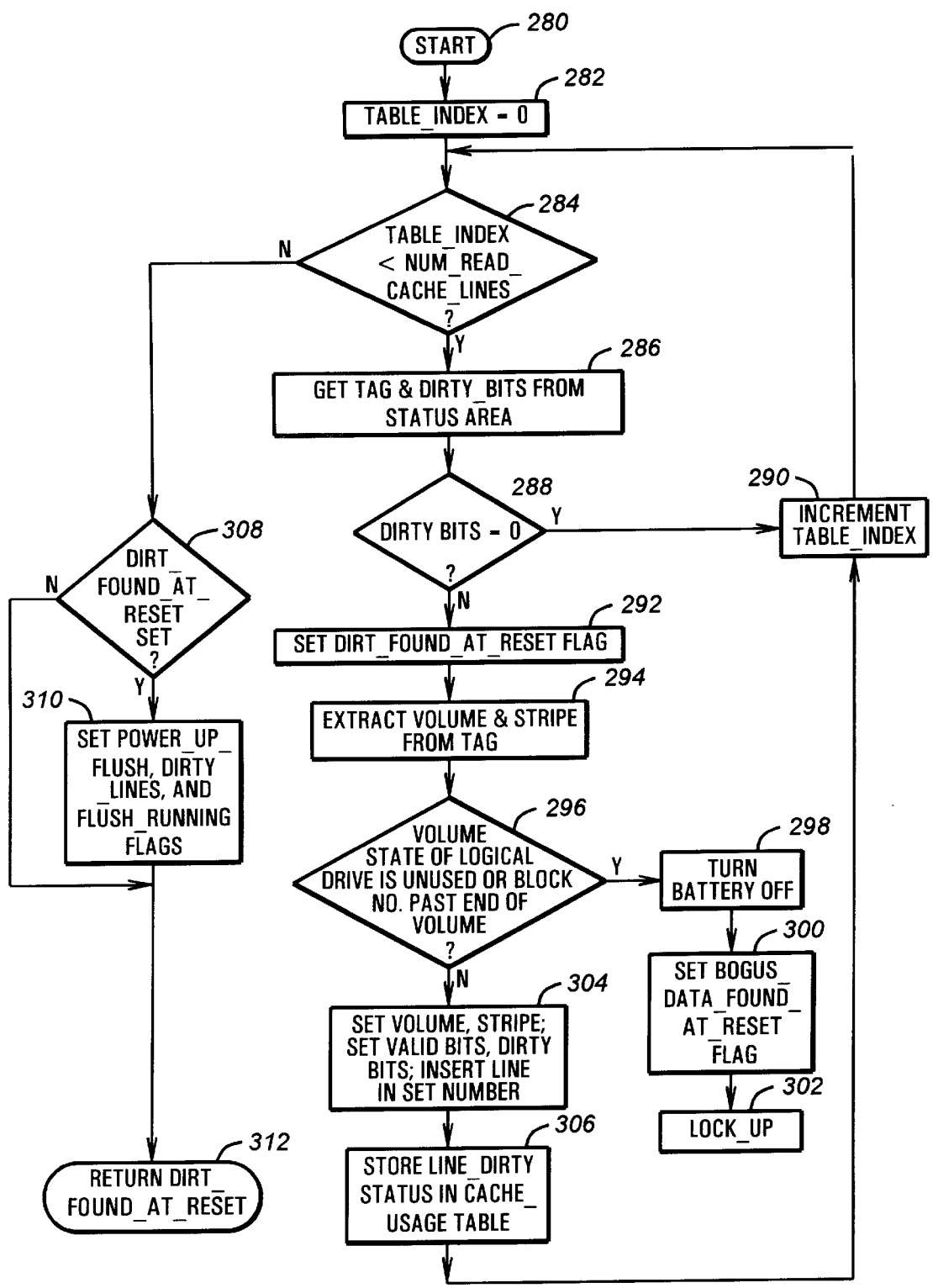
FIG. 7 is a flowchart disclosing the process for loading the cache status during start-up.

The available memory in the DRAM array 116 dictates the line count and the set depth of the adaptive read-ahead cache. In one embodiment, 4MB of memory is allocated to the real cache, which is further divided into 256 lines with a line containing 16,384 bytes or 32 hard disk sectors, while the virtual cache size is allocated 2MB. Preferably, the number of sets is 64, leading to an average set depth of 6. The chosen number of sets influences the average set depth, which ultimately affects the time spent searching for an item in the cache. The process for allocating and initializing the read cache, the write cache, and the virtual cache is shown in FIGS. 5–7 and will be discussed shortly below.

In the event of a hit in the read cache, data is provided directly from the read cache data buffer 124 to the host. The status buffer 125 is appropriately updated to note that the cache line containing the hit is the most recently used line. Alternatively, if the request generates a miss in both the read cache and the virtual cache, the system predicts that random accesses are occurring. The data retrieved from the disk is not buffered in the read cache, but is transferred directly from the disk to the consumer. The virtual cache address buffer 132 is updated with the address of the request generating the miss to enable subsequent accesses to be checked for sequential operation, while the corresponding line in the virtual cache status buffer 133 is updated as the most recently used line.

Figure 3:
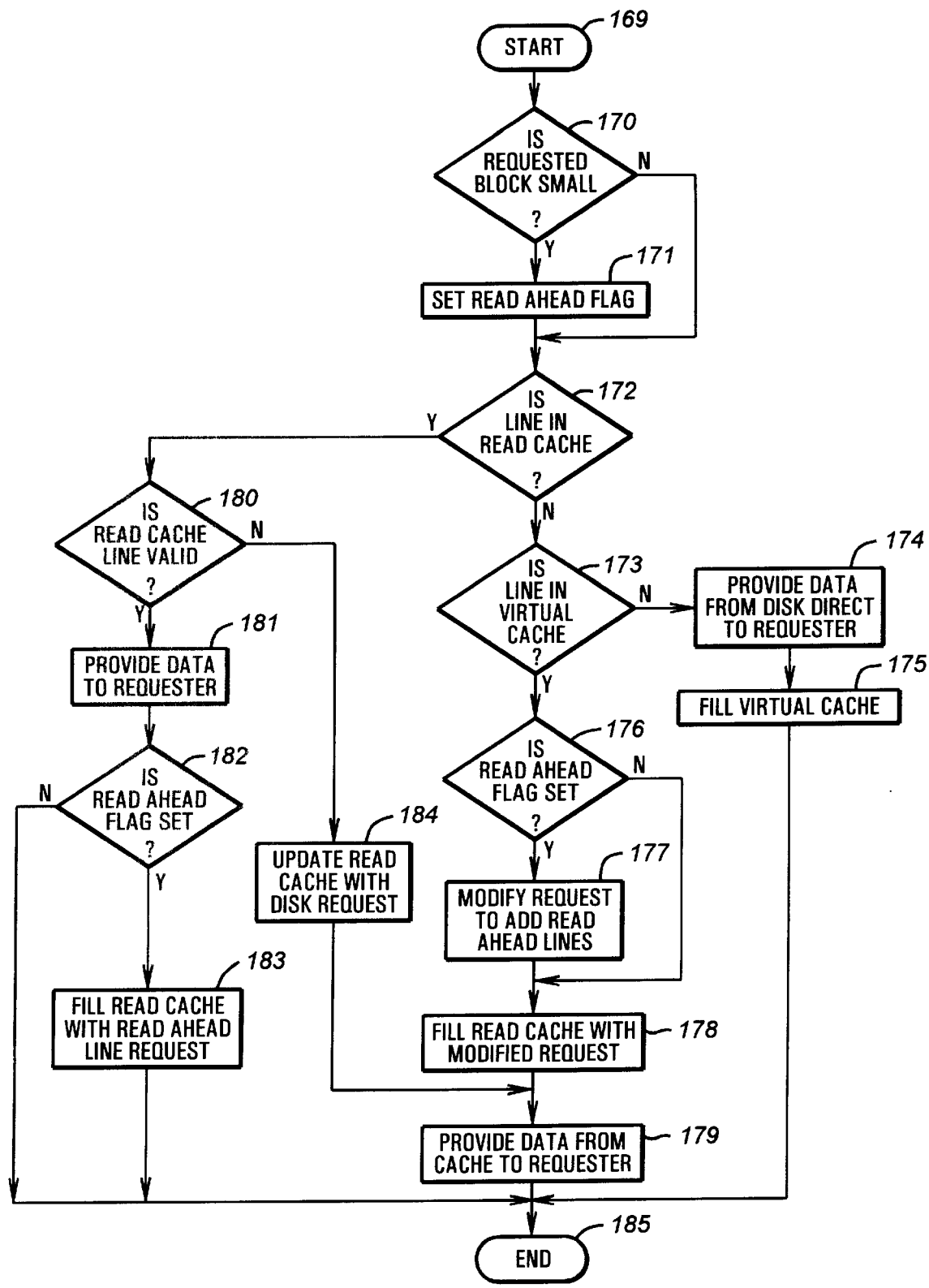
FIG. 3 is a flow diagram illustrating the adaptive read ahead process of the present invention.

Turning to FIG. 3, the process for adaptively performing the read ahead operation using a virtual cache is disclosed. At this point, the consumer has set up a data request via the CDB block and the local processor 106 has already parsed the CDB to identify particular block requests. After entering the routine in step 169, the process checks to see if a requested block count is small, preferably less than 10, in step 170. If the requested block count is less than or equal to a predetermined small value, preferably sixteen, a read ahead flag is set in step 171 to enable prefetching. If the requested block, as defined by the block count, exceeds the predetermined small value, the routine proceeds to step 172 where the requested line is checked to see whether or not it is in the read cache. If the requested line is not in the read cache in step 172, the routine further checks to see if the line exists in the virtual cache in step 173. If the line is also not in the virtual cache, suggesting that the request is a random I/O access, the routine provides data directly from the disk to the bus master 90 in step 174 and subsequently updates the virtual cache address buffer in step 175 with the address of the block just retrieved from the disk so that subsequent read requests can be checked for sequential operations. As data is not entered into the read cache during random I/O accesses, the overhead associated with the filling of the read cache when the system is performing random I/O operation is eliminated.

If the line is not in the read cache, but is present in the virtual cache address buffer, a sequential mode of operation is detected by the system in step 173. Once the sequential access mode has been detected, the system checks to see if the read ahead flag has been set to enable read ahead operations in the event that the requested block count is small, preferably less than or equal to 16, as performed in step 171. If read ahead operations are enabled in step 176, the routine modifies the line count of the current disk request to add a small number of read ahead lines, preferably a number between one and three, to the request in step 177. In step 178, the routine fills the read cache with the modified request appending the original request with the read ahead lines. In step 179, once data has been delivered from the disk to the cache, the routine provides the originally requested data from the read cache to the requester or consumer. Thus, the virtual cache detects sequential data accesses and fills the read cache only in the event of sequential data requests. Further, in the event of small requests, the requests are enlarged to cover a few adjacent lines to enhance the performance of the block transfer by minimizing the issuance of small consecutive requests to the disk.

In step 172, if the requested line exists in the read cache, the routine checks the validity of the read cache line, as stored in the real cache status buffer, in step 180. If the status buffer indicates that the read cache line is valid, a read hit has occurred and the the cached data is provided to the requester in step 181. Further, while data is being provided to the requester, the routine checks to see if the read ahead flag has been set in step 182. If the read ahead operation is enabled, and after the cache has searched ahead a predetermined number of lines to make sure that data that is likely to be requested soon is still in the cache, the routine supplements the read cache with requests for a small number of read ahead lines, preferably one to three lines, in step 183. Hence, read ahead data is retrieved even as the current request is being provided to the requester. In step 180, if the real cache status buffer indicates that the read cache line has been invalidated, the routine updates the read cache with data from the disk in step 184. It next provides the data from the read cache to the requester in step 179. Once the data has been provided to the requester, the routine exits in step 185.

Figure 4A:
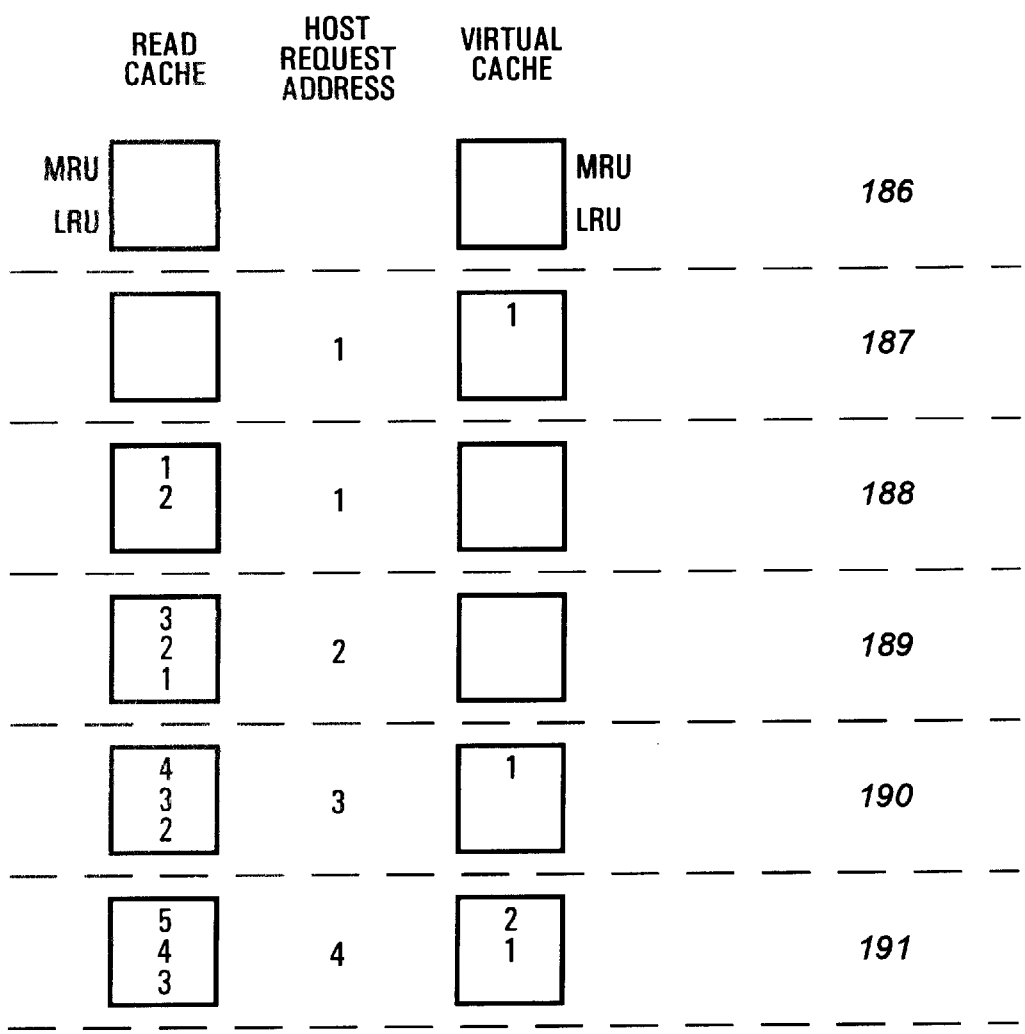
FIG. 4A is a simplified diagram illustrating the operation of the adaptive read ahead cache for sequential I/O accesses.
Figure 4B:
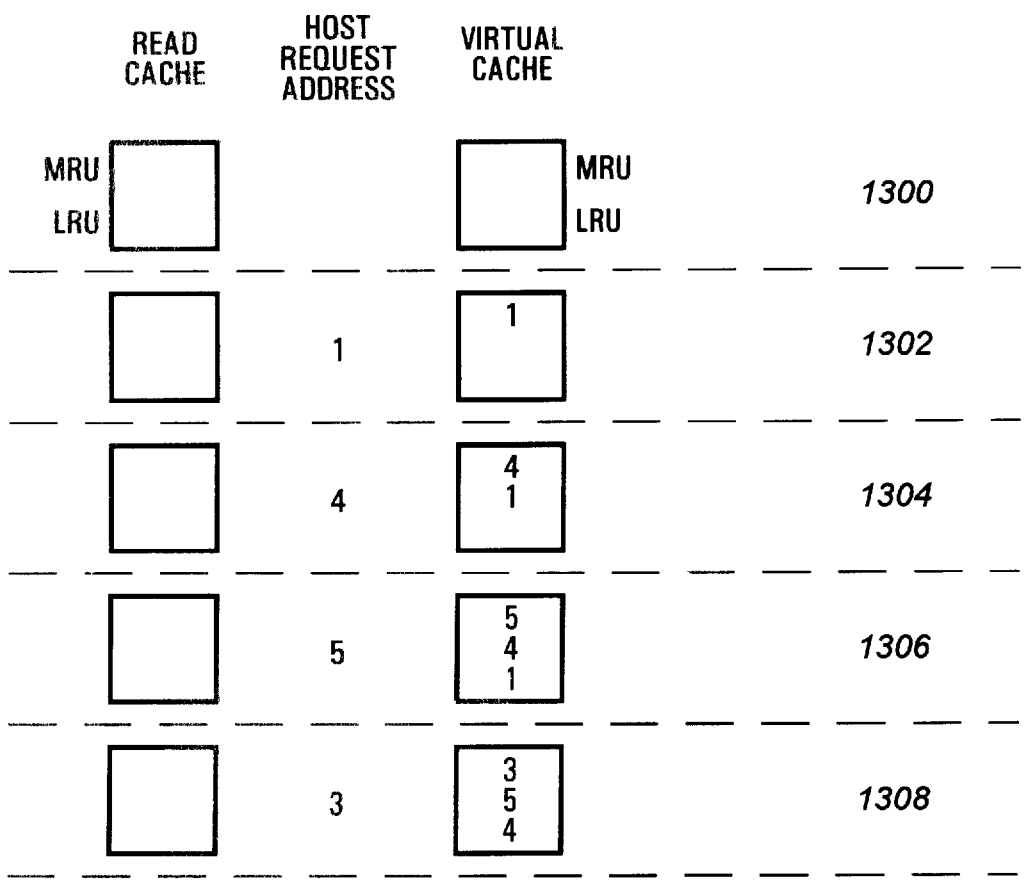
FIG. 4B is a simplified diagram illustrating the operation of the adaptive read ahead cache for random I/O accesses.
Figure 4C:
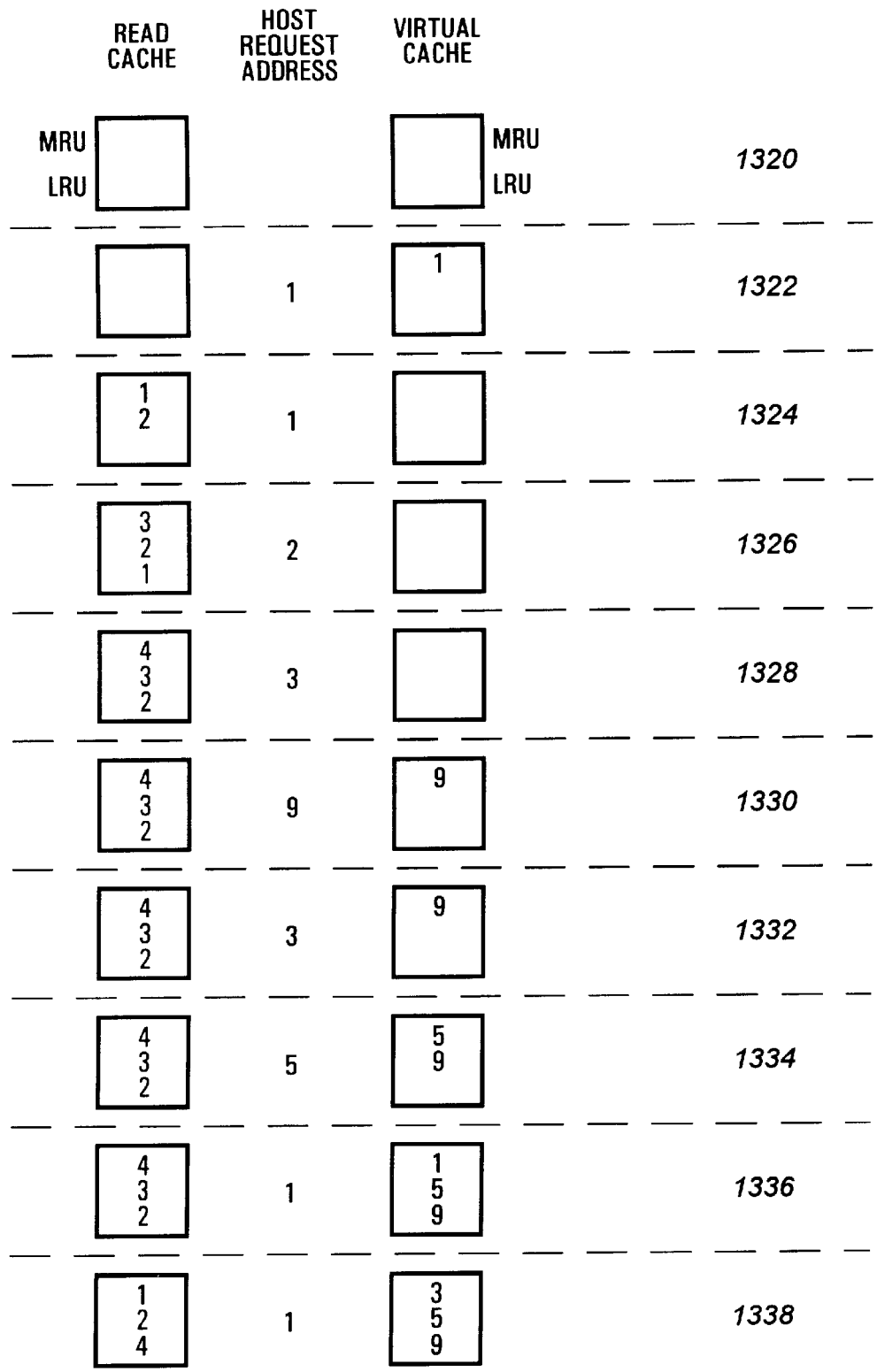
FIG. 4C is a simplified diagram illustrating the operation of the adaptive read ahead cache for a mixture of sequential and random I/O accesses.

FIGS. 4A, 4B and 4C show simplified illustrations of the operation of the virtual cache in combination with the read cache to perform adaptive read ahead operations in sequential I/O, random I/O and a mixture of sequential and random I/O operations. The read-ahead operation is shown by illustrating the effects of data requests on the address buffers of the read and virtual caches. In this simplified illustration, the read cache and the virtual cache address buffers are artificially limited to three lines in each of the cache address buffers, although the preferred embodiment contains significantly more lines in each cache buffer. In FIGS. 4A–4C, the MRU position for the read cache or the virtual cache is illustrated as being located above the LRU position in either the read cache or the virtual cache.

FIG. 4A illustrates the operation of the cache in periods where sequential I/O accesses are occurring. In time period 186, the read cache and the virtual cache address buffers are initialized to the empty state. In time 187, the host bus master requests address 1 from the disk. Because the read cache and the virtual cache address buffers do not contain data associated with line 1, the request results in complete misses to the read and the virtual caches. In this event, the routine of FIG. 3 provides data directly from the disk to the requester, and, after the data has been provided to the requester, fills the virtual cache address buffer with address 1 and updates the corresponding virtual cache status buffer to indicate that the entry is the most recently used entry. The read cache data and address buffers are not disturbed at this time. In time 188, the host again accesses address 1. Because the MRU line of the virtual cache address buffer has stored address 1 already, the current request, viewed in light of the address stored in the virtual cache address buffer, indicates that a sequential read operation is potentially occurring. Thus, data is transferred into the read cache data buffer as well as to the requester. Further, in time 188, as only one line is requested, the read ahead flag is set, causing the routine to buffer data associated with address 1 plus an additional read ahead (RA) line in the read cache data buffer. In this case, the contents of address 2 is prefetched into the next recently used line in the read cache data buffer in time 188. Address 1 is then eliminated from the virtual cache to prevent having entries for one address in multiple places in the cache.

In step 189, the host bus master sequentially requests address 2 from the disk. As data associated with address 2 is already prefetched into the read cache, the request results in a read hit. Further, since the requested line count is small and since address 3 was not present in the cache, the routine of FIG. 3 accordingly prefetches data associated with address 3 into the read cache data buffer in time period 189. Further, the read cache address buffer is updated to store addresses 3 and 4 in time periods 190 and 191 to prefetch data when sequential I/O operations are encountered. The virtual cache and the read cache status buffer are also appropriately updated with respect to the MRU/LRU status for cache lines containing addresses 1 and 2. As addresses are 'pushed' out of the read cache, they become the MRU line in the virtual cache.

FIG. 4B illustrates the operation of the cache when it encounters random I/O accesses. In time period 1300, the read cache and the virtual cache address buffers are initialized to the empty state. In time 1302, the host bus master requests address 1 from the disk. Because the read cache and the virtual cache address buffers do not contain data associated with line 1, the request results in complete misses to the read and the virtual caches. As such, data is provided directly from the disk to the requester. The read-ahead cache then fills the MRU line in the virtual cache status buffer with address 1. The read cache data and address buffers are not disturbed at this time. In time period 1304, address 4 is requested. As address 4 is also not stored in the read or virtual cache address buffer, data is provided directly from the disk to the consumer and not buffered in the read cache. Further, the virtual cache updates its address buffer with address 4 and notes in the virtual cache status buffer that the line containing address 4 is the most recently used line. Next, in time period 1306, address 5 is requested. As address 5 is also not stored in the virtual cache address buffer, the virtual cache updates its address buffer with address 5 and indicates in the status buffer that the line containing address 5 is the most recently used line. Only the virtual cache address buffer is updated with the address of the request generating the miss to enable subsequent accesses to be checked for sequential operation. Similarly, in time period 1308, address 3 is requested and, after generating misses in both the read and virtual caches, is stored in the MRU position of the virtual cache. Thus, as data is provided directly from the disk to the requester and not buffered in the read cache, the overhead of caching data that is not likely to be used again is eliminated.

FIG. 4C illustrates the operation of the cache when it encounters a mixture of sequential and random I/O accesses. In time period 1320, the read cache and the virtual cache address buffers are initialized to the empty state. In time 1322, the host bus master requests address 1 from the disk. Because the read cache and the virtual cache address buffers do not contain data associated with line 1, the request results in complete misses to the read and the virtual caches. In this event, the routine of FIG. 3 provides data directly from the disk to the requester. After the data has been provided to the requester and stored into the read cache data buffer, the routine fills the virtual cache address buffer with address 1 and updates the corresponding virtual cache status buffer to indicate that the line containing address 1 is the most recently used line. The read cache data and address buffers are not disturbed at this time. In time period 1324, the host again accesses address 1. Because the MRU line in the virtual cache has stored address 1 already, the current request, viewed in light of the address stored in the virtual cache address buffer, indicates that a sequential read operation is potentially occurring. Thus, data is transferred into the read cache as well as to the requester. Further, in time 1324, as the number of lines requested is small, the read ahead flag is set, causing the routine to store data associated with address 1 plus an additional read ahead (RA) line into the read cache data buffer. In this case, the contents of address 2 is prefetched into the next recently used line in the read cache in time 1324.

In step 1326, the host bus master requests address 2 from the disk. As data associated with address 2 is already prefetched into the read cache, the request results in a read hit. Further, since the requested line count is small, the routine of FIG. 3 prefetches data associated with address 3 into the read cache in time period 1326. The read cache status buffer is appropriately updated with respect to the MRU/LRU status of the respective lines containing addresses 1–3.

Next, a string of random accesses occurs. In time period 1330, address 9 is requested. As address 9 is not stored in either the read cache or the virtual cache address buffers, the MRU position of the virtual cache address buffer is updated with address 9. However, the read cache data and address buffers are not updated with data from address 9. Next, in time period 1332, address 3 is requested. As address 3 is buffered in the read cache, the request results in a read hit. Next, in time period 1334, address 5 is requested. As address 5 is not stored in either the read or the virtual cache address buffers, data is provided directly to the consumer from the disk. Further, the virtual cache updates its address buffer with address 5 and indicates in its status buffer that the line containing address 5 is the most recently used line. However, the read cache is not updated.

In step 1336, the host bus master requests address 1. As address 1 is not found in the read and virtual cache address buffers, the cache continues to assume that random accesses are occurring. As such, data is transferred directly from the disk to the requester while only the virtual cache address and status buffers are updated to add address 1. Next, in step 1338, the host again requests address 1. Upon seeing this request, the adaptive read-ahead cache presumes that a sequential I/O access may be occurring and begins the read-ahead process by storing in the data and address associated with addresses 1–2 into the read cache and repeats the process associated with time periods 1322–1324.

In sum, as the read cache is updated only during sequential I/O operations, the overhead associated with buffering random I/O data requests is avoided. The read ahead cache tracks the disk request and optimizes the disk cache operation to minimize the unnecessary loading and flushing of data from the read cache in the event of random I/O operations.

FIGS. 5–7 illustrate the process for allocating and initializing the write cache, read cache, and the virtual cache. FIG. 5 discloses a flowchart for allocating memory for the real and the virtual caches. In step 200, the number of real cache lines and the number of virtual cache lines are computed based on the total memory size and the default stripe size. The real cache line size is preferably computed by the formula (2*cache size)/default stripe size. The virtual cache line size is preferably computed by dividing a predetermined number of virtual cache sectors by the default stripe size. The total number of cache lines is preferably computed by adding the number of real cache lines and the number of virtual cache lines together. In step 202, available memory from the DRAM array 116 is allocated into a cache management array, a cache RAM line array, and a set management array. Upon the successful allocation of memory for these arrays, various configuration flags are set to indicate that the memory has been successfully allocated to the cache arrays of step 202. Alternatively, if one of the requested memory allocation steps fails, the routine aborts with a flag indicating initialization failure.

Upon a successful allocation of memory in step 202, the system next checks to ensure that a flush task has completed operation in step 204. If the flush task is still running, the cache initialization routine sleeps for a predetermined period before the next check for the completion of the flush task in step 204. Once the flush task has completed operation, cache volume data is initialized in step 205, which is shown in more detail in FIG. 6. Next, the routine determines the number of lines available to the read cache and the write cache and adjusts for left-over lines in step 206. Step 206 also imposes a minimum cache size in the event the number of lines in either the read or the write cache is less than a predetermined minimum size. In the preferred embodiment, the virtual cache lines are placed at the end of the real cache lines, which includes the read and write caches, and extends from the end of the real cache lines by the number of lines in the virtual cache in step 206. In step 208, upon a successful configuration of the cache line size, a READ_CACHE_CONFIGURED flag and a WRITE_CACHE_CONFIGURED flag are set in step 208 to indicate that the read and writ In step 21 been configured.

In step 210, the routine initializes the cache table entries and links the table entries as a chain of LRU/MRU elements. Preferably, the cache table is implemented as a queue having pointers to a previous line and a next line. Two MRU lists are maintained, one for the read portion of the real cache, the other for the virtual cache. These are implemented as doubly-linked lists. In step 212, if READ_CACHE_CONFIGURED has been set in steps 206–208, the routine initializes the LRU chains for the read and the virtual cache in step 214. The set entries are initialized in step 218 by clearing the pointers to the first member of each set. In step 220, after the cache line size computations and flags have been generated, the routine starts the cache near the beginning of the DRAM memory 116. Finally, the routine allocates space for status update information in step 222.

Turning now to FIG. 6, the routine to initialize the cache volume data is disclosed. This routine initializes volume specific cache parameters and, upon completion, indicates whether or not one or more volumes has been enabled. In step 250, the routine initially negates a VOLUME_ENABLED flag and clears the current volume count in step 252. In step 254, the routine checks to see if all volumes have been checked. If so, the routine branches to step 274 where it returns with the VOLUME_ENABLED flag. Otherwise, step 254 continues processing in step 256 where it checks on the setting of a volume disable bit. If the volume disable bit is set, cache usage is disabled on that volume by negating a write volume enable flag WRITE_VOL_ENABLED in step 258. After the flag has been negated, the current volume count is incremented in step 260 to examine the next volume before looping back to step 254. If the volume disable bit is not set in step 256, the write volume enable flag WRITE_VOL_ENABLED and the volume enable flag VOL_ENABLED is set in step 262. In step 264, the state of the volume is checked. If the volume state equals LOGICAL_VOL_UNUSED, the current volume is not being used, the routine increments the current volume count to point to the next volume in step 272. Otherwise, the routine checks to see if the number of user drives is small. If such is the case, control transfers to step 268 where parameters are set for the flush task based on the number of drives in the volume. The volume count is incremented in step 272 to point to the next volume to be initialized. If the number of drives is larger than a predetermined count, the routine sets parameters to flush only one stripe at a time in step 270. After step 270, the volume count is incremented in step 272 and control transfers to step 254 to process the next volume or to exit the routine altogether in step 274. In this manner, the routine of FIG. 6 configures the volume enable array and sets parameters to flush the volume adaptively, depending on the number of drives.

FIG. 7 illustrates the routine to load the cache status from a dirty cache whose content may no longer be consistent with the corresponding content on the disk after rebooting. The reloading of the cache status is executed at the time of restart of the system. The routine stores the status of each read or write cache line in a corresponding line-dirty status location in a cache usage table. In step 282, a table index count TABLE_INDEX is cleared to zero. In step 284, TABLE_INDEX is compared against the maximum number of real cache lines in the table. If TABLE_INDEX indicates that the requested line is located in the real cache, control transfers to step 286 whereby the tag and the dirty bits are retrieved from the status location. In step 288, the status of a dirty bit flag DIRT_BITS is checked: if DIRTY_BITS equals zero, control transfers to step 290 wherein TABLE_INDEX is incremented to point to the next line to be checked. If DIRTY_BITS is not equal to zero, indicating that the line is dirty, control transfers to step 292 wherein a DIRT_FOUND_AT_RESET flag is set. In step 294, the volume and stripe information is extracted from the tag. Using this information, the volume state of the logical drive is checked in step 296. If the volume state is unused or the stripe address exceeds the number of stripes configured for the volume, a fatal error is detected and control transfers to step 298 wherein the battery backing up the DRAM 116 is turned off. From step 298, a BOGUS_DATA_FOUND_AT_RESET flag is set in step 300 indicating the error condition. Next, the system is locked up in step 302 so that the computer can be serviced.

Alternatively, if the logical drive is being used and the block number is within a legal range, control transfers from step 296 to step 304. In step 304, the volume and stripe information are stored, valid bits and dirty bits are appropriately configured and the line is inserted in the set that it belongs to. In step 306, the line dirty status is stored in the cache usage table before control is transferred to step 290 to increment the table index count TABLE_INDEX. Once TABLE_INDEX has been incremented in step 290, the routine transitions to step 284 where TABLE_INDEX is compared against the number of real cache lines. If TABLE_INDEX exceeds the number of real cache lines, control is transferred from step 284 to step 308, wherein DIRT_FOUND_AT_RESET flag is checked. In step 308, if DIRT_FOUND_AT_RESET has been set, various flags, including the POWER_UP_FLUSH, DIRTY_LINES, and FLUSH_RUNNING flags are set before the routine exits at step 312 and providing the DIRT_FOUND_AT_RESET flag to the caller. In this manner, the cache dirty status is preserved at the time of restart and dirty write data can be flushed to the drives.

Figure 8:
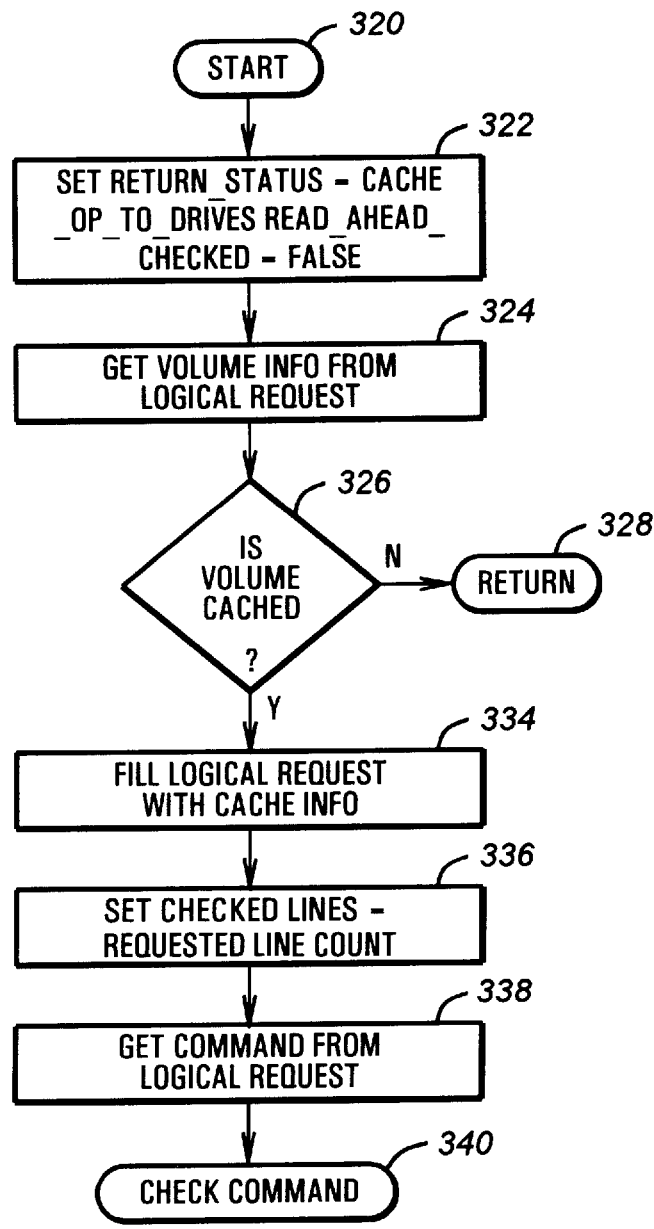
FIG. 8 is a flowchart disclosing steps in processing a data request.

FIG. 8 shows the process for a preliminary checking of the logical request prior to processing the commands. As shown in FIG. 8, upon entry to the routine in step 320, a RETURN_STATUS flag is preliminarily set to CACHE_OP_TO_DRIVES and a READ_AHEAD_CHECKED flag is negated in step 322. The READ_AHEAD_CHECKED flag indicates whether or not one or more extra lines are to be added to the requested lines for read ahead operation. The RETURN_STATUS flag has a plurality of modes, one of which includes the CACHE_OP_TO_DRIVES mode for indicating that operations are to be passed to the drives.

In step 324, the volume information is retrieved from the logical request. In step 326, the volume is checked to see if it is a cached volume or not. If not, control transfers from step 326 to step 328 where the routine simply returns to its caller as the volume is not cached. The logical request is next filled with cache information, including the requested line count, in step 334. The filling of the logical request with cache information will be explained in more detail in FIG. 24. Upon completing step 334, the information that needs to be added to the logical request for the cache operation is stored in the logical request. In step 336, the number of lines to be checked by the cache is initially set to the requested line count. In step 338, the command is retrieved from the logical request. At this stage, the preliminary information has been extracted from the logical request and the cache routine is ready to process the commands. The command is next checked in sequence 340 to see whether or not it is a write to cache, a write to media, or a read command.

Figure 9:
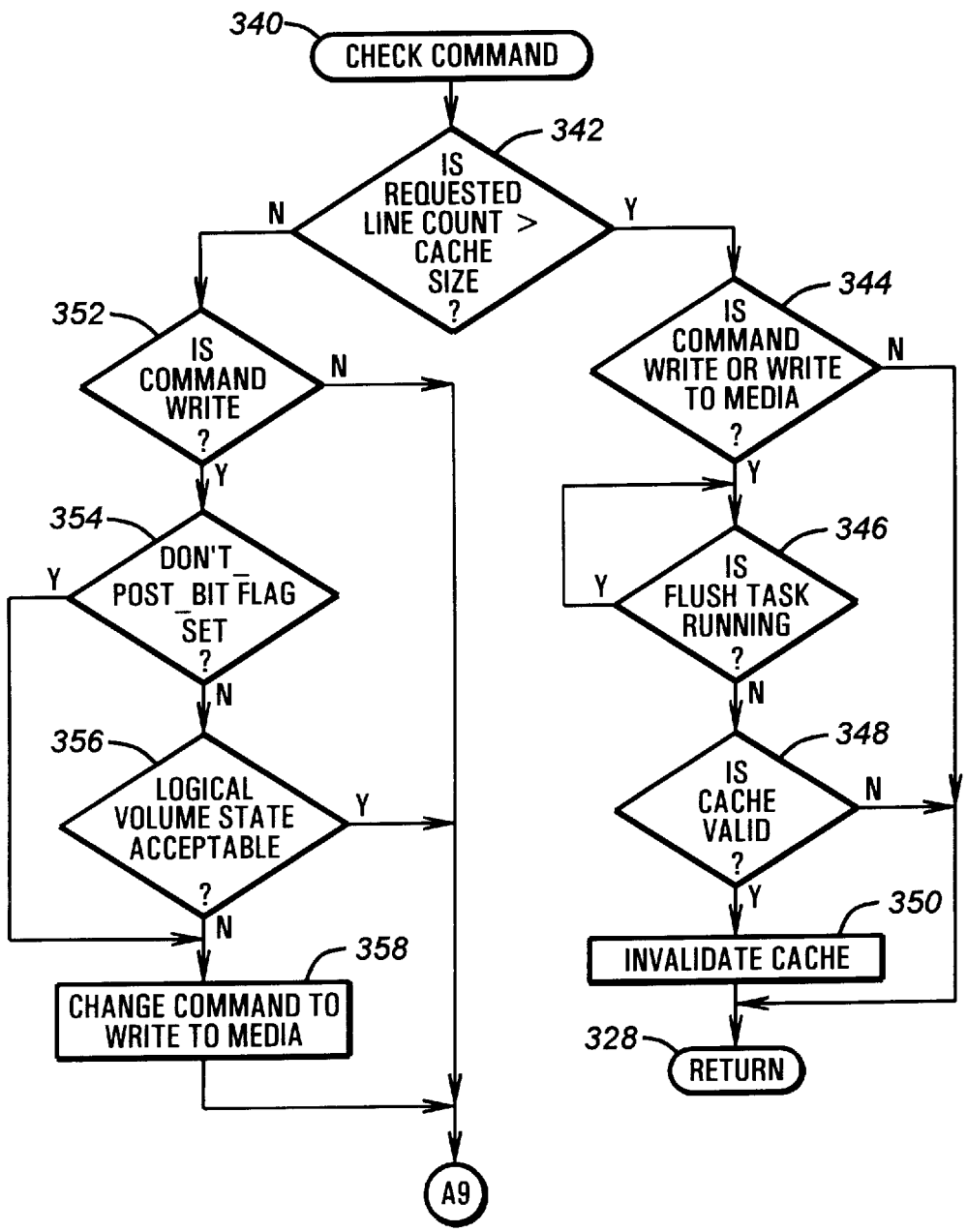
FIGS. 9 and 9A are a continuation of the flowchart of FIG. 8 further disclosing command check processing steps.
Figure 9A:
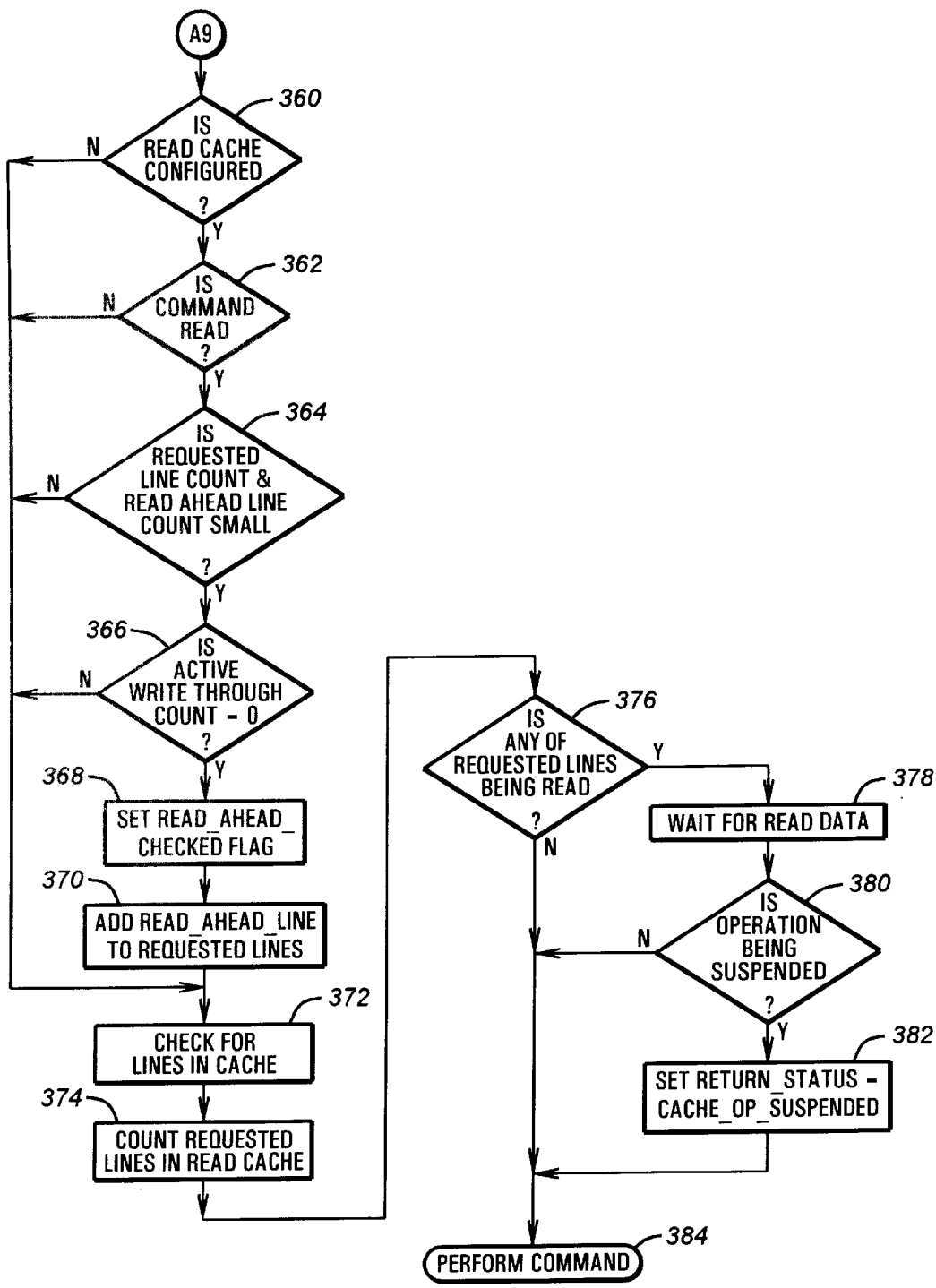

FIGS. 9 and 9A disclose in more detail the check command sequence 340 of FIG. 8. In FIG. 9A, after the command has been retrieved from the logical request, the routine checks to see if the requested line count is greater than the cache line count in step 342. If so, control transfers to step 344 where the command is checked to see if it is a write command, which may be directed to the write cache or to the disk, or a write to media command which specifically directs that the write operation be directed to the disk. In the event that the command is a write command or a write to media command, the routine checks to see if the flush task is running in step 346. If so, the routine waits for the flush task to complete. In the event the flush task is still running, step 346 preferably puts itself to sleep for a predetermined period before rechecking on the flush task. Once the flush task has completed operation, the routine proceeds by first checking to see if the data in the write cache is valid in step 348. If the write cache is valid, it is invalidated in step 350 before the routine exits via return step 328. In step 348, if the cache is already invalid, the routine simply exits via step 328. In this manner, if the request exceeds the capacity of the cache and if the command is a write command, the routine synchronizes its operation with the flush task and invalidates the cache before the request is submitted directly to the disk drives.

In the event that the requested line count is less than the cache size in step 342, the routine checks to see if the command is a write operation in step 352. If the command is a write, the routine checks a DON'T_POST_BIT flag, a flag indicating that the write operation is not to be posted in the write cache, in step 354. If the DON'T_POST_BIT flag is not set, the routine checks to see if the logical volume state is acceptable in step 356. Preferably, the acceptable volume states include a LOGICAL_VOL_OK state, a LOGICAL_VOL_REGENERATION state, a LOGICAL_VOL_REBUILD state, and a LOGICAL_VOL_NEEDS_REBUILD state. In the event that the DON'T_POST_BIT flag is set and the volume state is not acceptable, as previously defined, the command defaults to WRITE_TO_MEDIA in step 358 before control is transferred to step 360. In this manner, the logical volume state is checked against error conditions and in the event that the command issued is a posted write command but the logical volume state is unacceptable due to one or more errors, or if the request is too large, steps 352–358 ensure that the routine does not post the write command.

Steps 360–370 next check to see if read ahead lines are to be added to the lines in the original logical request. In step 360, the read cache is checked to see if it has been configured. If so, the command is checked to see if it is a read request in step 362. If the command is a read, the requested block count is less than a predetermined value, and the active write-through count is zero, eliminating the potential for cache incoherency, in steps 364–366, the READ_AHEAD_CHECKED flag is asserted in step 368. In addition, the requested check line count is added to the read ahead lines in step 370. In this manner, the read ahead mode of operation is enabled whenever the block count of the read request is relatively small.

After step 370, the requests are checked to see if they already exist in the cache in step 372. The details of the process for checking the requested lines of step 372 are discussed in FIG. 22. Additionally, a count of the requested lines in the read cache is performed in step 374. The process for counting the requested lines in the read cache is further disclosed in FIG. 23. Next, the routine checks to see if the requested lines are already read in step 376. If so, in step 378, the routine waits for the completion of the read data process of FIG. 18. If the cache operation is suspended in step 380 due to data unavailability, the routine sets RETURN_STATUS flag to CACHE_OP_SUSPENDED in step 382 before proceeding to a perform command sequence 384 where the command is executed by the routine if the cache operation has not been suspended.

Figure 10:
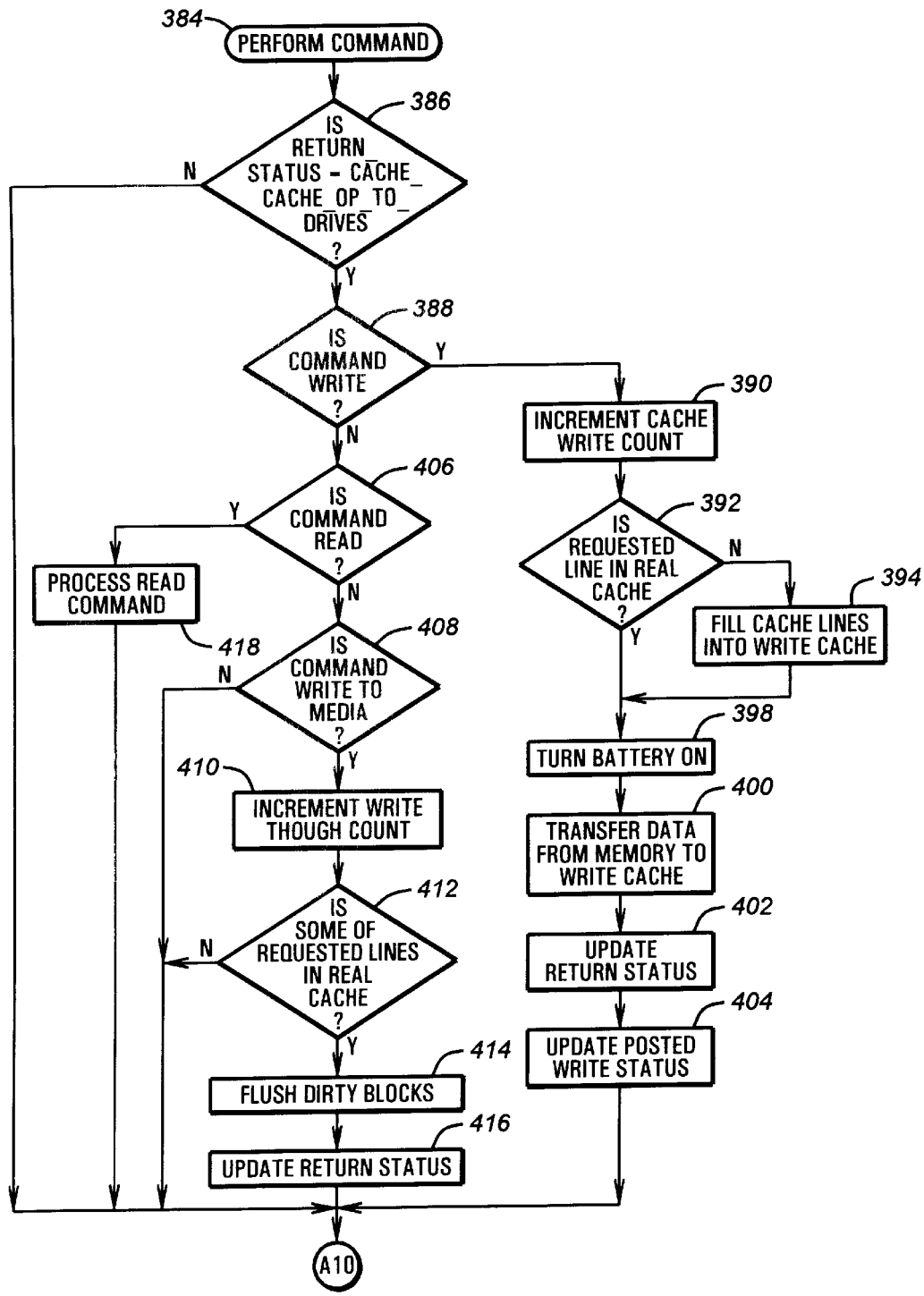
FIG. 10 is a continuation of the flowchart of FIGS. 8, 9 and 9A, further disclosing the process to perform the commands.
Figure 10A:
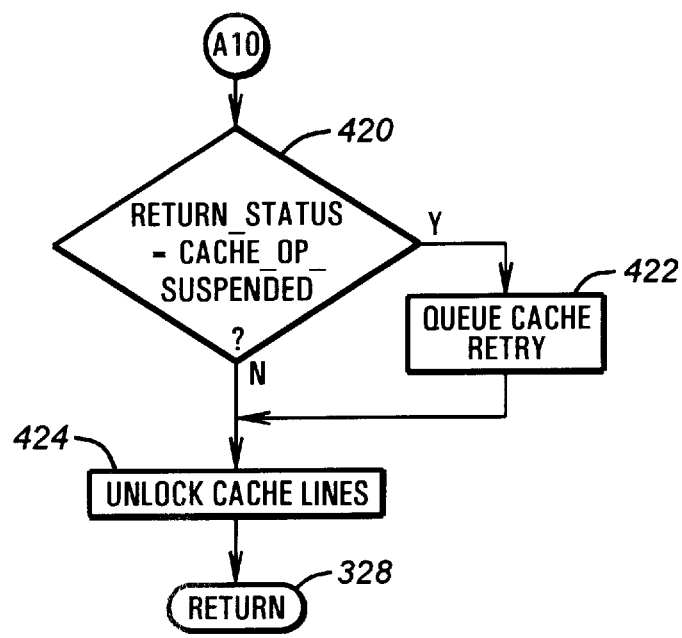

The process to perform the command sequence 384 is further illustrated in FIGS. 10 and 10A. Initially, the routine checks RETURN_STATUS to see if the cache operation should be aborted due to errors from previous processing steps in step 386. If the status is not CACHE_OP_TO_DRIVES in step 386, the routine transfers to step 420. Otherwise, the routine checks to see if the command is a write command in step 388. If the command is write, a cache write count is incremented in step 390. Next, the routine checks to see if the requested line exists in the real cache in step 392. If not, the routine fills the write cache with modified requested lines in step 394. In step 394, a block of space is allocated for the write request. These requests are preferably linked in a table as being in the same logical request for flushing operations.

The routine next posts the write operation by turning the battery on in step 398 to protect the write posting operation against the possibility of power failure. The data is subsequently transferred from the memory to the write cache in step 400. The success or failure of the data transfer is reflected in RETURN_STATUS in step 402. Additionally, the status of the posted write operation is updated in step 404 before control is transferred to step 420.

In step 388, if the command is not a write command, the routine checks to see if the command is a read command in step 406. If so, the routine transfers to the process read command process in step 418 which is disclosed in more detail in FIGS. 11 and 11A. If the command is not a write command, the routine checks to see if the command is a write to media command in step 408. If not, the routine transfers to step 420. Otherwise, the routine increments a write-through count in step 410. Next, the routine checks to see if the requested lines are in the real cache in step 412. If one or more of the requested lines exists in the real cache, the routine flushes dirty blocks in step 414 and updates RETURN_STATUS with the result of the flush operation in step 416 before transferring control to step 420. In step 420, if the return status is CACHE_OP_SUSPENDED, the request is queued for retry at another time. Otherwise, the cache lines are unlocked in step 424 before the routine exits in step 328.

Figure 11:
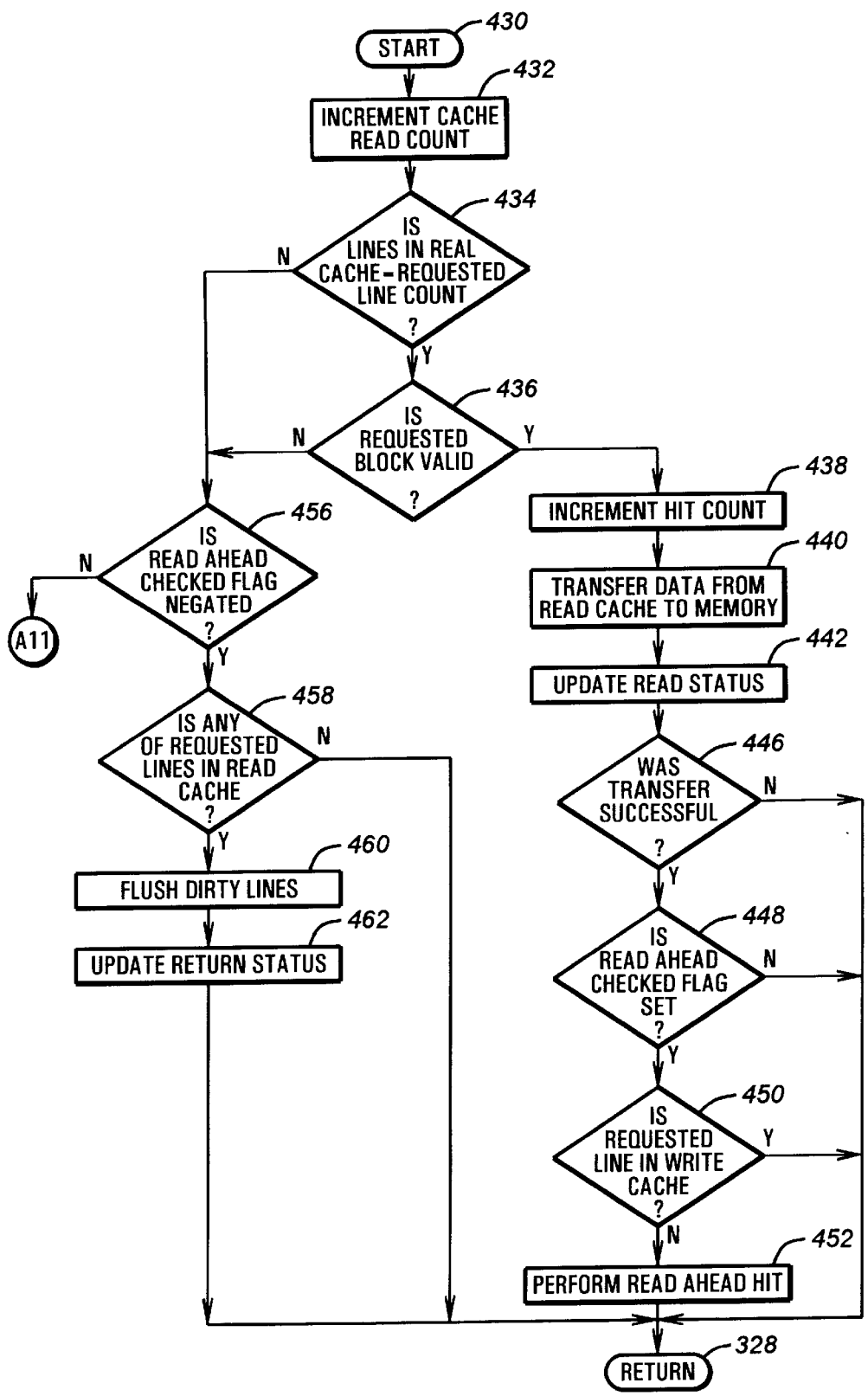
FIGS. 11 and 11A are flow charts disclosing process steps for the read command step of FIG. 10.
Figure 11A:
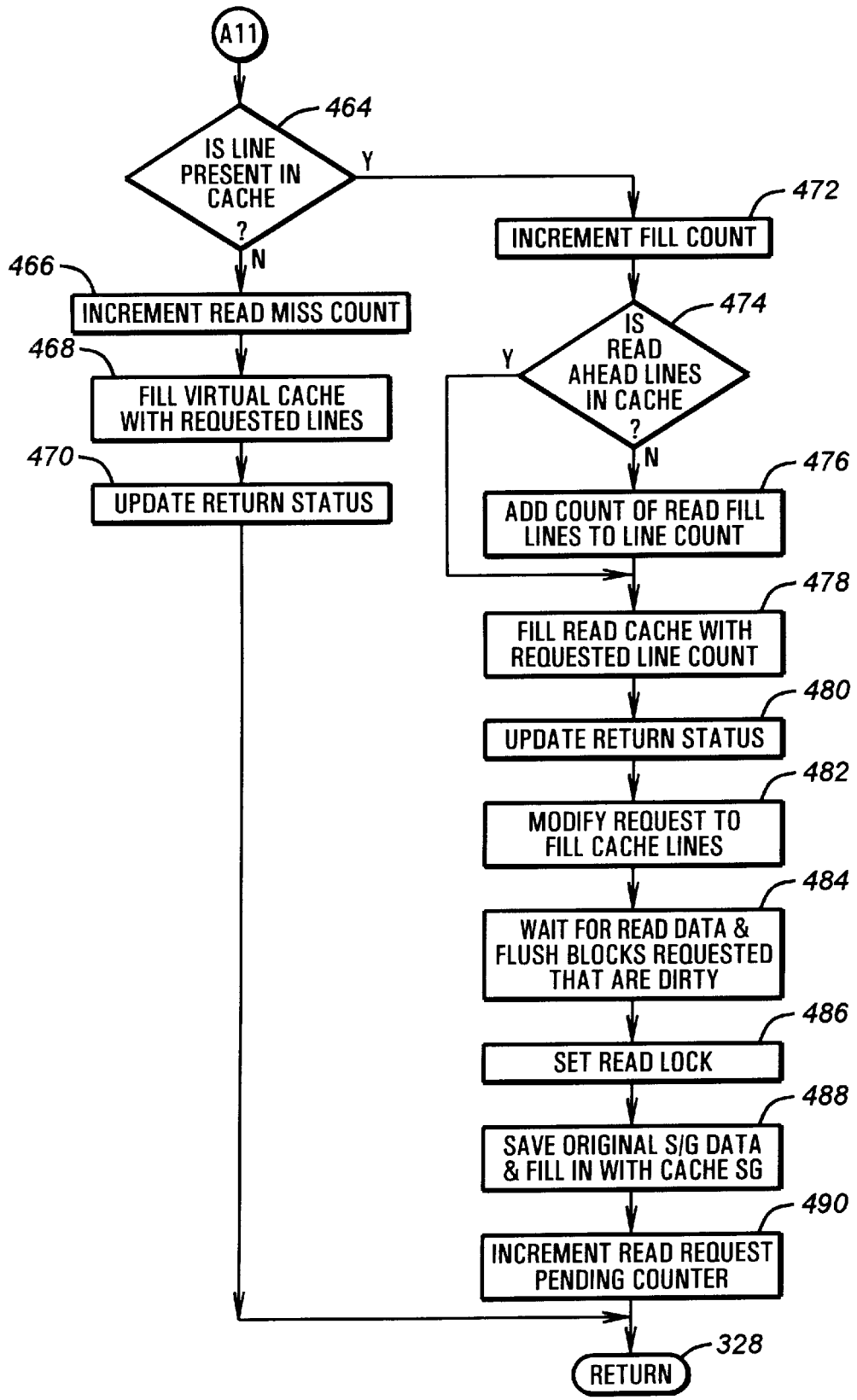

FIGS. 11 and 11A illustrates in more detail the flowchart to process read commands. In FIGS. 11 and 11A, once the command is determined to be a read command, a cache read count is incremented in step 432. In step 434, the routine checks to see if the lines in the real cache equals the requested line count and if the requested block is valid in step 436. If steps 434 and 436 indicate that the requested data is in the real cache and is valid, a read hit condition exists and control is transferred to step 438. After incrementing a hit count in step 438, the data is transferred from the read cache to the host memory in step 440. The result of the data transfer is reflected in RETURN_STATUS in step 442. In step 446, if the transfer was not successful, the routine returns to its caller at step 328 with the attendant error indication. In step 446, if the transfer was successful, the routine checks to see if the READ_AHEAD_CHECKED flag has been set. If not, the routine returns in step 328 without adding read-ahead lines to the current line request. Otherwise, the routine further checks to see if the requested line is in the write cache space. If not, the read ahead operation is performed in step 452, as shown in more detail in FIG. 12. Otherwise, control transfers to step 328 where the routine returns to its caller.

In the event that one of the conditions tested in step 434 or step 436 is false, control transfers to step 456 to handle a read cache miss condition. In step 456, the routine checks to see if the READ_AHEAD_CHECKED flag is negated. If so, the routine checks to see if the requested lines exist in the read cache in step 458. If these lines exist in the read cache, dirty blocks are flushed in step 460 and the status of the flush operation is updated in step 462 before the routine exits via step 328.

If the result of step 456 indicates that the READ_AHEAD_CHECKED flag has been set, the routine may perform a read fill operation wherein data is brought into the read cache because the system predicts that the bus master is requesting data in a sequential access mode. The read fill operation is performed, depending on whether the same lines were in virtual cache or not, as checked in step 464. If the requested lines cannot be found in the cache, a read ahead miss condition is detected and a read miss count is incremented in step 466. Next, the address of the requested lines and the lines checked for read ahead is added to the virtual cache address buffer in step 468. The RETURN_STATUS flag is appropriately updated in step 470 before the read request is passed on to the drives in step 328. In this manner, steps 466–470 records in the virtual cache the history of data accesses which is used subsequently to adaptively cache the data requests.

If the result of step 464 indicates that the lines exist in the virtual cache but not the read cache, the routine transfers to step 472 wherein a fill count is incremented. At this point, one or more of the requested or read ahead lines exists in the virtual cache. The routine can perform either a read cache fill appended with read ahead lines or a read cache fill of only the requested lines.

The routine next checks to see which of the appended lines are already in the cache and fills those that are not. The line count is incremented by a predetermined read-fill line count in step 476, wherein the read-fill line size is preferably three (3). At this point, the read cache is filled with the requested line count in step 478 to ensure that all lines are placed in the read cache. The RETURN STATUS flag is updated in step 480. Next, the routine modifies the requested line count in the request to reflect the added read-ahead lines in step 482.

The fill logical request is then updated with stripe, block count, offset, and line count information. Further, the fill logical request is verified to ensure that the request does not cause a read past the end of the volume. Hence, if the attempted read ahead causes a read past the end of the volume, the read ahead operation is simply abandoned. Next, the routine ensures that the read-ahead blocks requested that are dirty are flushed since the entire request will be sent to get data from the drives in step 484. In addition to waiting for read data and flushing blocks requested that are dirty, step 484 also checks the return value and sets RETURN_STATUS in accordance with the success or failure of the operation. Next, the routine sets the read lock on all lines in the logical request in step 486. It then saves the original scatter-gather (SG) data structure, marks it as a cache request, and causes the SG structure to be filled with the cache destination address information in step 488. The routine then increments the read request pending counter in step 490 before it returns in step 328. In sum, steps 472–490 cause the data which had been previously tracked as accessed by the virtual cache address buffer to be brought into the read cache data buffer. Further, steps 472–490 ensure that, in a random access mode of operation, the data is provided directly to the requesting bus master and that the read cache is bypassed in the process.

Figure 12:
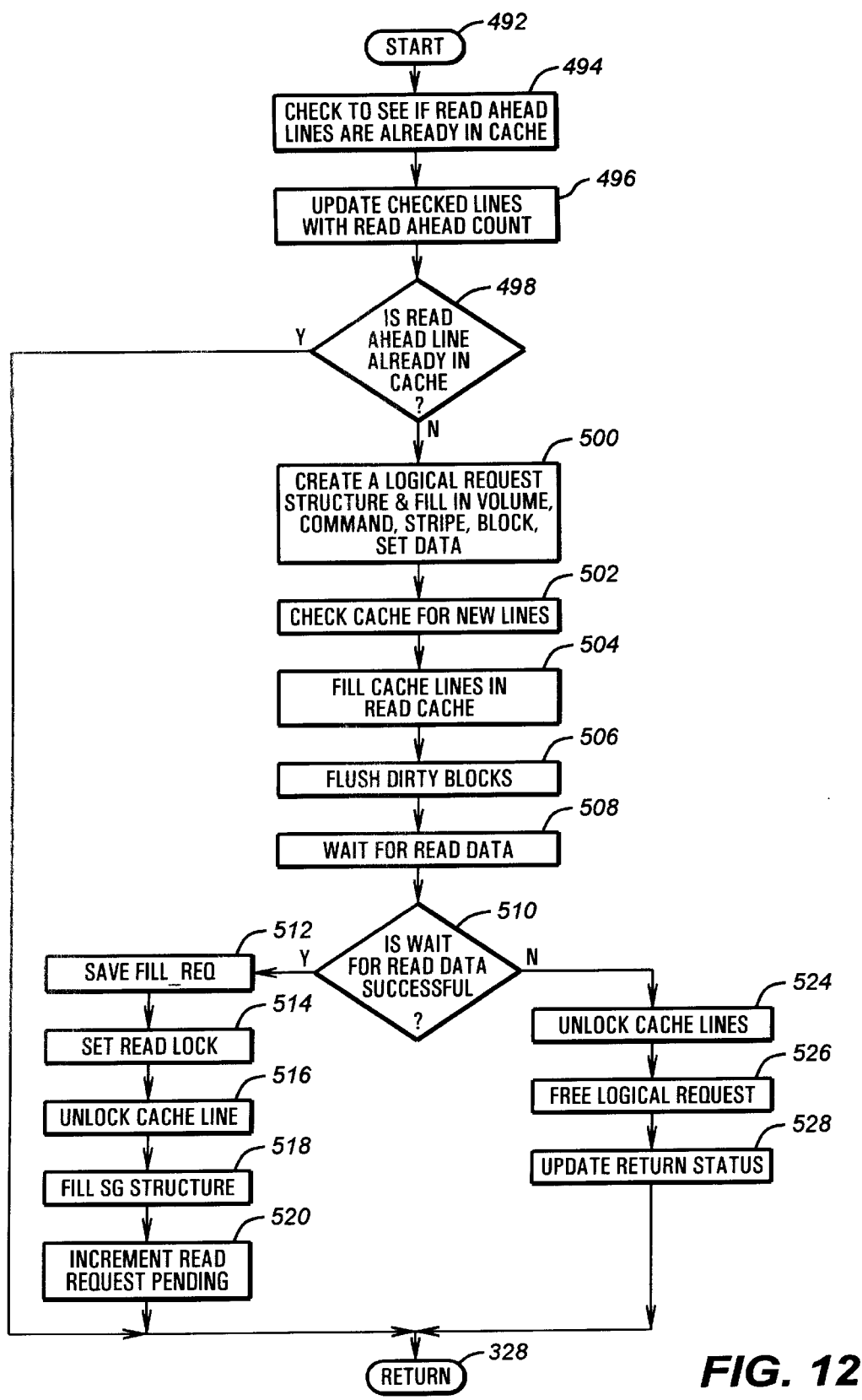
FIG. 12 is a flowchart showing the steps of the read ahead hit block of FIGS. 11 and 11A.

The operation of the read ahead hit block 452 is shown in more detail in FIG. 12. Once the routine determines that the read ahead operation is to be performed on a read hit, the routine first checks to see if the appended read ahead lines already exist in the cache in step 494. The check line count is incremented with the read ahead line count, which is preferably two (2) in step 496. In step 498, if the read ahead lines already exist in the cache, the routine simply returns to the caller in step 328. Otherwise, the routine prefetches the read ahead lines while lines in the read cache data buffer corresponding to the hit entry are provided to the requesting bus master in response to the request. In step 500, the routine creates a logical request structure and fills in the volume command, stripe, block and set information. In step 502, the routine checks to see if any of the new lines, such as the read ahead lines, that have been added to the request are already in the real cache before filling the cache lines in the read cache data buffer in step 504. If the fill operation was successful, the routine next flushes dirty blocks in step 506 and, assuming that the flush operation was successful, waits for any read data corresponding to the new lines in step 508.

The routine next checks to see if the read data operation was successful in step 510. If the operation was successful, the filled logical request structure is saved in step 512. Next, the read lock flags are set in step 514 and the cache lines are unlocked in step 516. The SG structure is filled in step 518 using the logical request information. Next, the read request pending count is incremented in step 520 before the routine exits in step 328. Alternatively, if the wait for the read data operation failed in step 510, the routine unlocks cache lines in step 524, frees the logical request in step 526 and appropriately updates RETURN_STATUS in step 528 to indicate that the fill request has been discarded. In this manner, the process of FIG. 12 enables read ahead lines to be fetched in advance of an actual request for the read ahead line while the read cache provides the result of the read hit to the bus master.

Figure 13A:
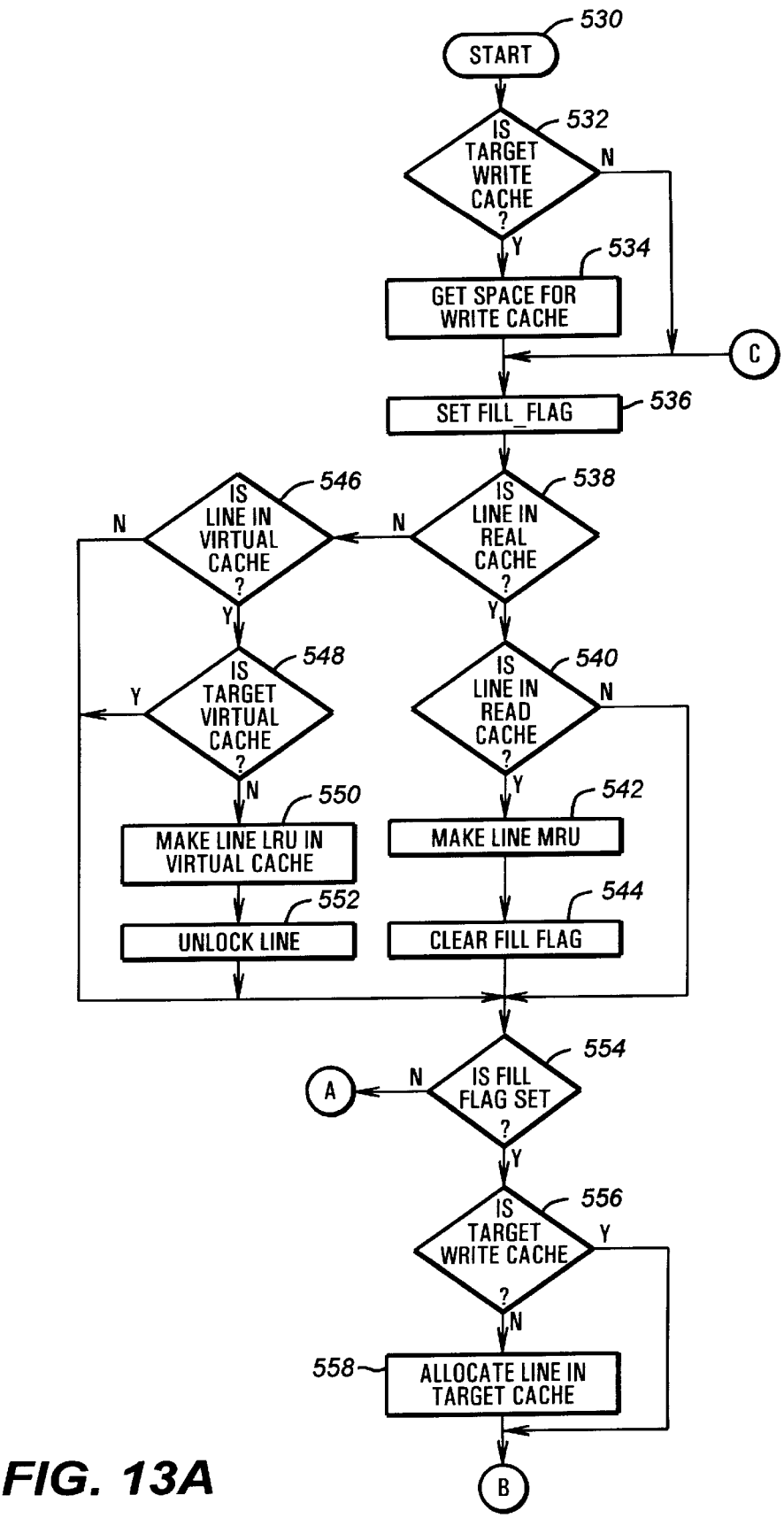
FIGS. 13A and 13B are flowcharts disclosing the process to fill the cache lines.
Figure 13B:
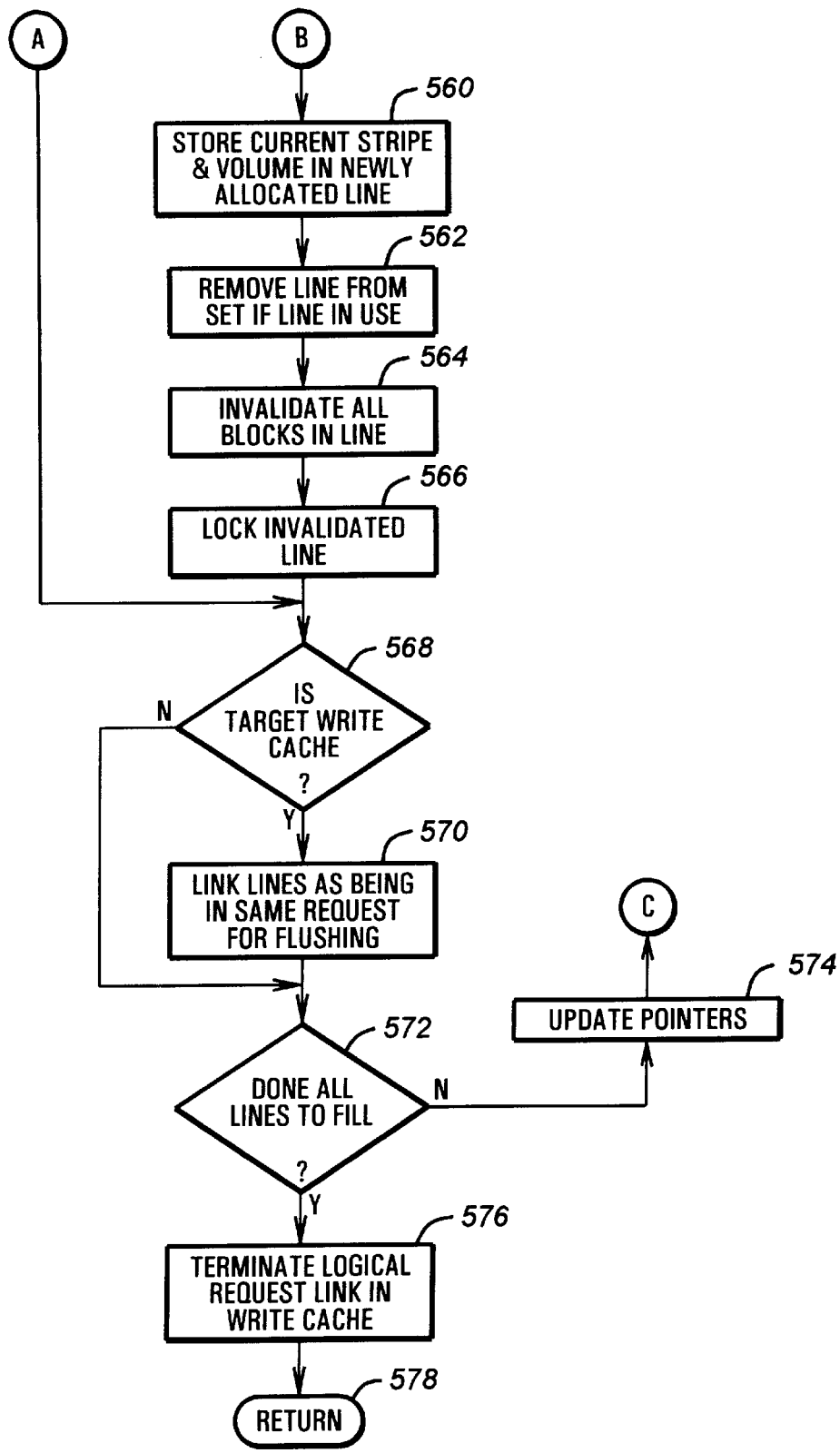

Turning now to FIGS. 13A–13B, the fill cache line routine is disclosed in more detail. This routine obtains cache lines for new entries and fills in the necessary data fields for the new lines. In step 532, the routine checks to see if the target of the fill operation is the write cache. If so, it allocates space from the write cache in step 534. For cache writes, the routine allocates all requested lines from a contiguous area if possible. On the other hand, a line by line allocation method is used for read and read ahead operations.

If the target is not the write cache in step 532 or after step 534, the routine transfers to step 536 where it sets a FILL flag. In step 538, the routine checks to see if the line exists in the real cache or not. If the line is in the real cache, the routine further checks to see if the line is in the read cache in step 540. If the line request is in the read cache, steps 542 makes the line the new MRU line in the status buffer of the real cache in step 542. Further, the FILL flag is cleared in step 544 because the line is already in the read cache and need not be updated.

If the line is not present in the read cache in step 538, the routine checks to see if the line is present in the virtual cache address buffer in step 546. If the line exists in the virtual cache address buffer, the routine further checks to see whether or not the target of the operation is the virtual cache in step 548. If not, the line in the virtual cache is cleared and reassigned as the LRU line in the virtual cache status buffer in step 550. In step 550–552, the current line in the virtual cache status buffer is unlocked to allow others access to the line. As discussed shortly below, the line just released from the virtual cache in step 550 and marked as the virtual cache LRU line in the virtual cache status buffer will be immediately used in the subsequent line allocation operation.

From steps 540, 544, 546, 548 or 552, control transfers to step 554 where the routine checks to see if the FILL flag is still set. If the current line is not in the cache at all, it will be brought into the cache. In step 556, the routine checks to see if the target is the write cache area. If not, the routine allocates lines in the target cache from either the read cache, the virtual cache, or both, in step 558. Once the line has been allocated in step 558, the routine stores the current stripe and the volume information in the newly allocated line in step 560 of FIG. 13B via connector B.

Turning now to FIG. 13B, in steps 562–566, set management on the newly invalidated line is performed. In step 562, if the line is currently in use, it must be removed from its set. Further, all blocks in the line invalidated must be invalidated in step 564, and the invalidated line is locked in step 566.

From step 554 (via connector A) or step 566, the routine checks to see if the target is the write cache or not in step 568. If the target is the write cache, the write lines are linked as the same logical request for flushing purposes in step 570. In step 572, the routine checks to see if all lines have been filled. If not, the appropriate pointers are updated in step 574 before the routine loops back to step 536 of FIG. 13A via connector C to check the next line in the request. If all the lines have been processed, the routine terminates the logical request links in the write cache in step 576 before returning to the caller in step 578.

Figure 14:
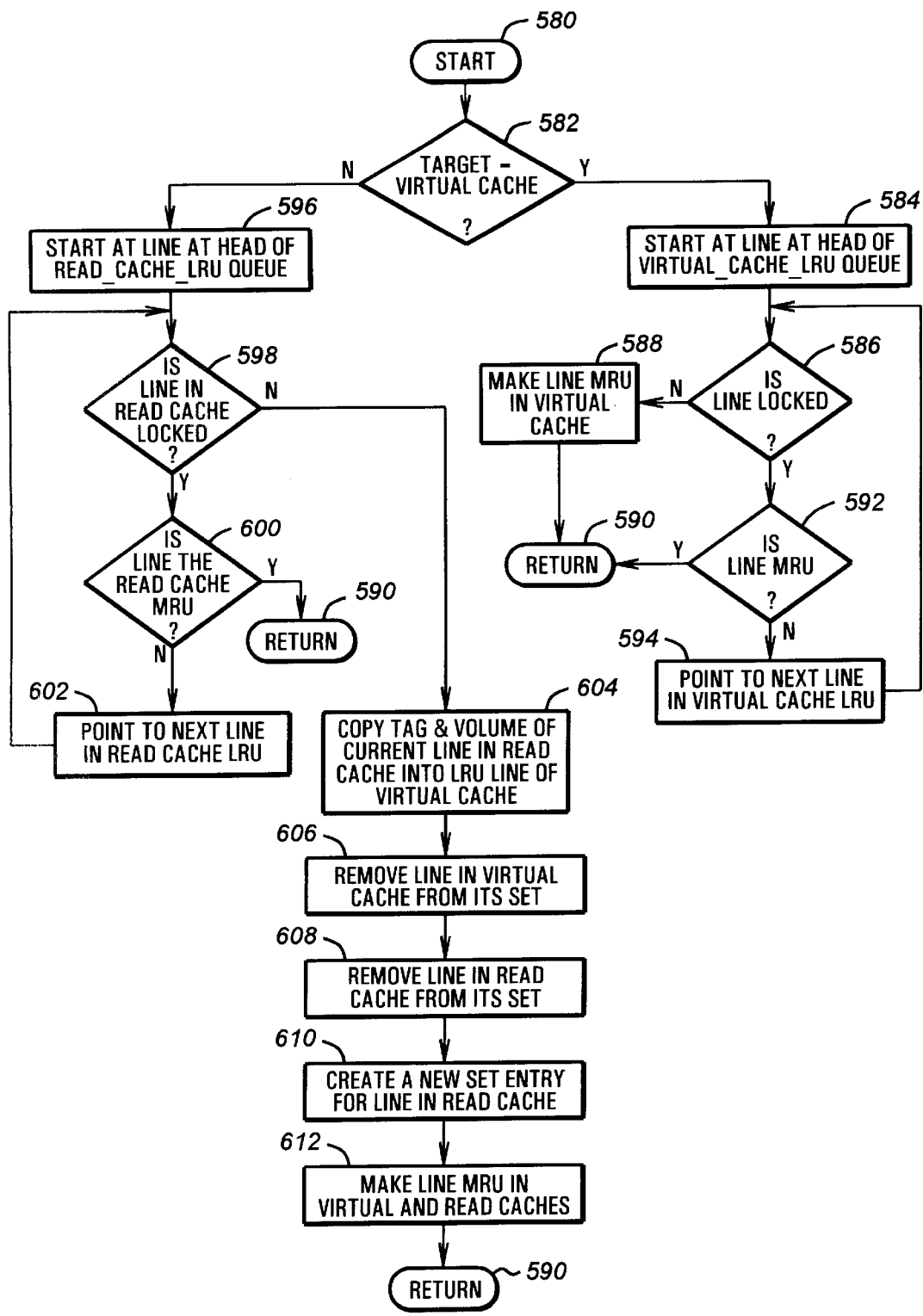
FIG. 14 is a flowchart disclosing the process to allocate lines in the read cache.

Turning now to FIG. 14, the routine to allocate the next available space in the read cache is discussed in greater detail. In step 582, the routine checks to see if the target of the operation is the virtual cache. If so, the routine starts the search at the head of the VIRTUAL_CACHE_LRU queue in step 584. In step 586, the routine checks to see if the line is locked and thus unavailable for use. If not, the line is selected as the MRU in the virtual cache status buffer in step 588 before the routine returns to its caller via step 590. If the line is locked in step 586, the routine next checks to see if the line is the MRU line in step 592. If so, the virtual cache cannot provide space at the moment and the routine returns to its caller in step 590 with the indication that the cache is full. If the line is not the MRU line in step 592, the routine increments its line pointer in step 594 to point to the next line before it loops back to step 586. In this manner, the least recently used line that is still available is selected as the next candidate for virtual cache line allocation purposes.

If the target is not the virtual cache in step 582, the target is the read cache. In step 596, the routine starts its search at the head of the READ_CACHE_LRU queue, as stored by the virtual cache status buffer. Similar to the search process performed for the virtual cache LRU, the routine checks to see if the line in the read cache LRU is locked or not in step 598. If it is locked and thus unavailable, the routine checks to see if the line is the read cache MRU in step 600. If so, the routine returns to its caller in step 590 with an indication that space is unavailable at the current time and preferably causes the caller to suspend operation temporarily until space becomes available. Alternatively, if the line is not the read cache MRU, the routine points to the next line in the read cache LRU in step 602 before it loops back to step 598.

Eventually, once an available LRU line in the read cache status buffer has been located, the tag and the volume of the current line in the read cache LRU is copied into the current LRU line of the virtual cache in step 604. Thus, whenever a line in the read cache is allocated, a corresponding line in the virtual cache is also allocated. Further, in the event that the newly allocated line currently belongs to a set, or a related group of lines mapped to the disk addresses, the line needs to be removed from the corresponding sets in the virtual cache and the read cache in steps 606–608. Additionally, the newly allocated line is entered as the first entry in its appropriate set in step 610. Finally, the routine elevates the status of the lines to MRU in both the virtual and the read cache status buffer in step 612 before exiting in step 590.

Figure 15:
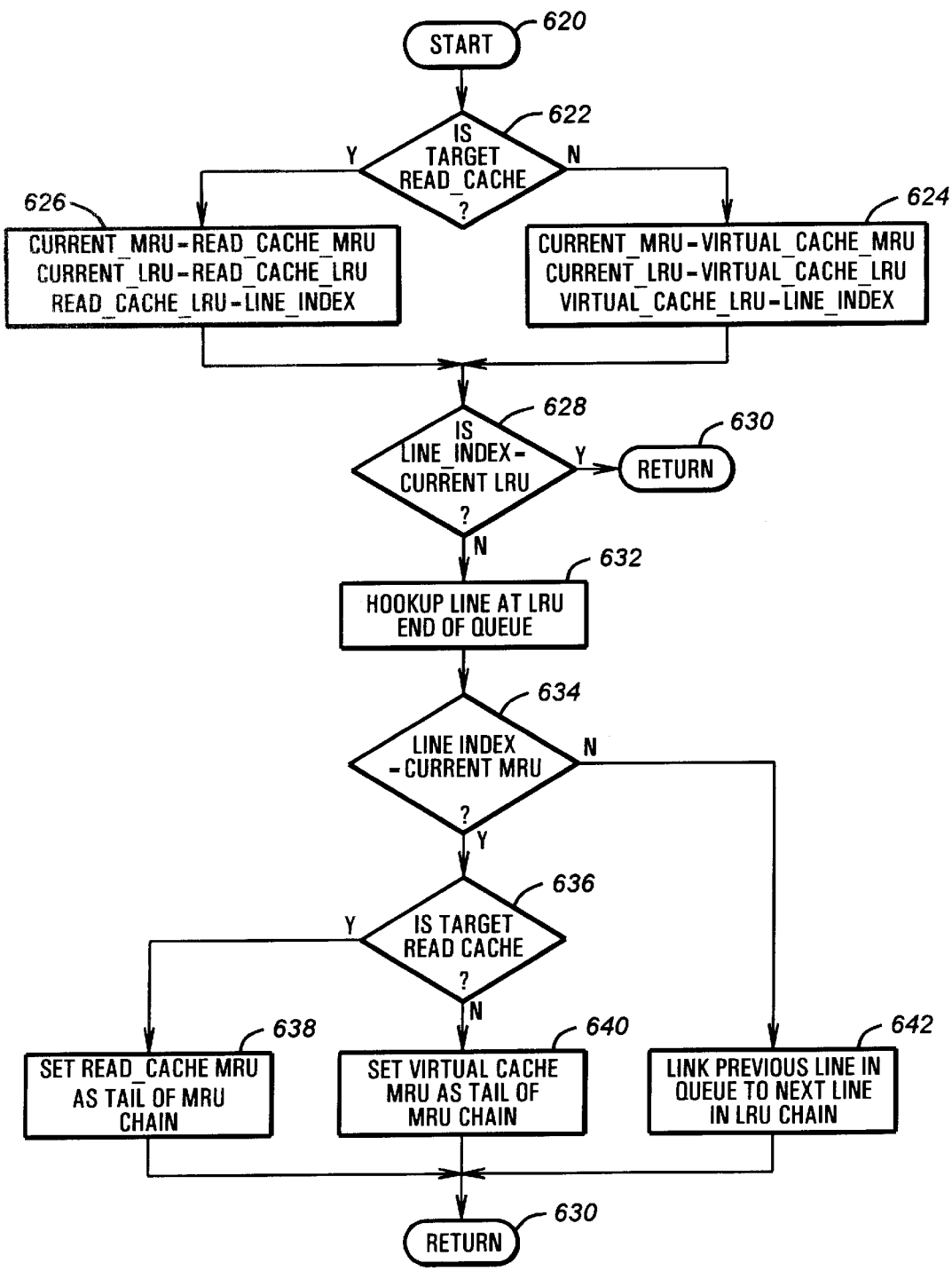
FIG. 15 is a flowchart disclosing the steps to convert a line to a least recently used (MRU) line.

Turning to FIG. 15, the routine to change the LRU status of a line in the status buffer is disclosed. This routine removes a specified cache line from the read cache or virtual cache status buffer's LRU linked list and places the line at the end of the LRU linking list. After entering the routine in step 620, the routine checks to see if the target is the read cache in step 622. If not, the target is the virtual cache and the routine sets the current MRU as the virtual cache MRU, the current IRU as the virtual cache LRU and the virtual cache LRU as the current line index in step 624. The line index is the offset into the cache array. Alternatively, in step 626, if the target is the read cache, the current MRU and LRU is equated to the read cache MRU and IRU respectively. Further, the read cache LRU is set to the line index in step 626. Next, in step 628, the routine checks to see if the line index equals the current LRU. If so, the routine returns to its caller in step 630 because the selected line is already the LRU line in the status buffer. If not, the routine hooks up the line at the LRU position of the queue in step 632. Next, the routine appropriately reorders the links of the queue in steps 634–642. In step 634, the routine tests if the line index equals the current MRU. If so, the routine further checks to see if the target is the read cache in step 636. If so, the routine sets the read cache MRU at the tail end of the MRU chain in step 638. If the target is not the read cache, the routine sets the virtual cache status buffer's MRU at the tail of the MRU chain in step 640. Alternatively, if the line index is not equal to the current MRU in step 634, the routine links the previous line in the queue to the next line in the LRU chain in step 642 before it returns in step 630. In this manner, the links to and from the chain of MRU lines are appropriately updated so that the line to be identified as the MRU line is positioned at the top of the MRU chain and the remaining links are correctly repositioned in the cache status buffer.

Figure 16:
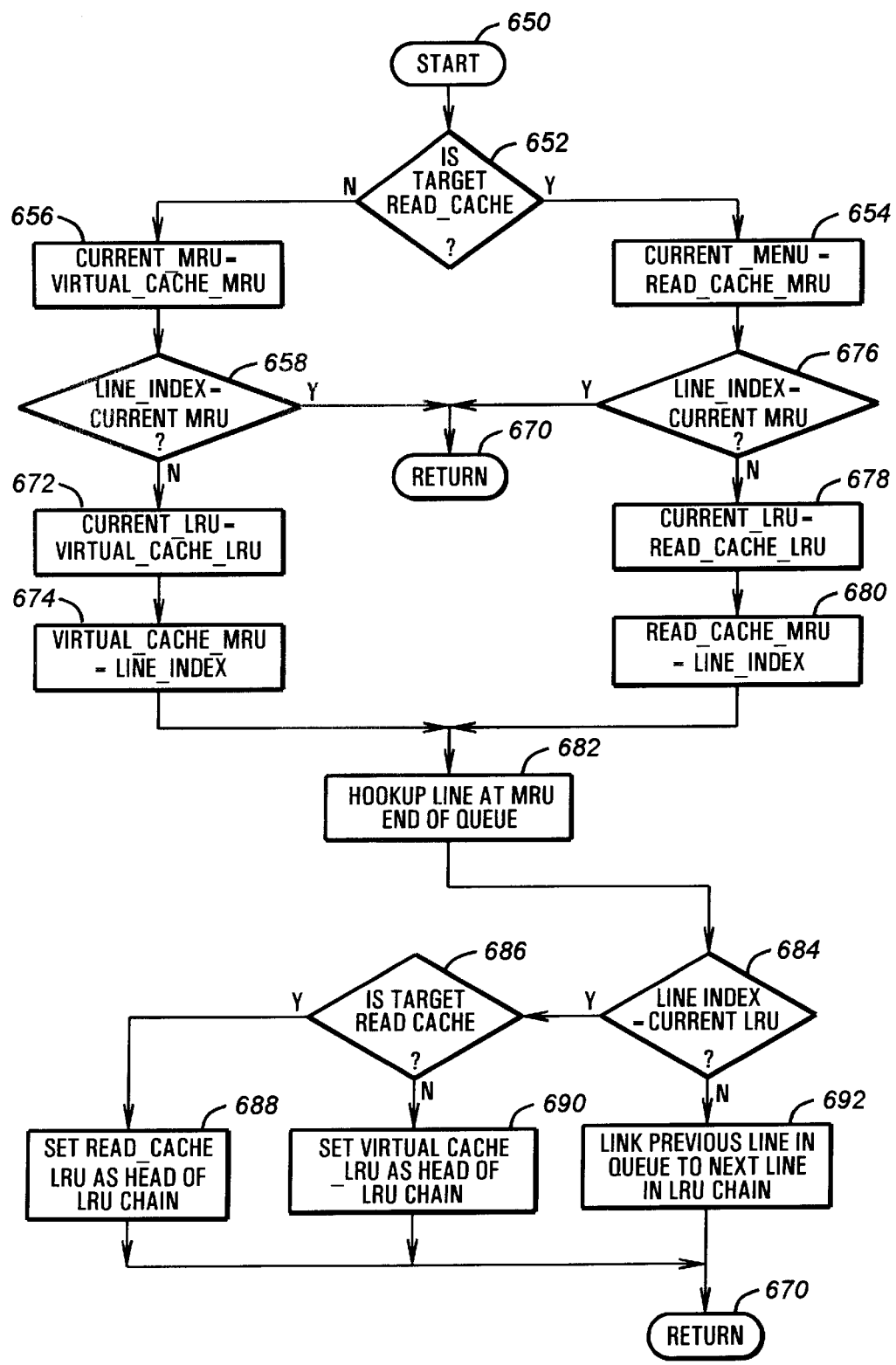
FIG. 16 is a flowchart disclosing the steps to convert a line to a most recently used (MRU) line.

Turning now to FIG. 16, the corresponding routine to make a particular line the most recently used (MRU) line in the cache status buffer is disclosed. Upon entry in step 650, the routine checks whether or not the target is the read cache in step 652. If the target is the read cache, the routine equates the current MRU to the read cache MRU in step 654.

Alternatively, the routine sets the current MRU to be the virtual cache MRU in step 656.

Next, if the line index equals the current MRU in step 658, the routine returns to its caller in step 670 as the line is already the MRU. Alternatively, if the line index is not equal to the current MRU in step 658, the routine sets the current IRU to be the virtual cache LRU in step 672. Further, the virtual cache MRU is equated with the line index in step 674.

Similarly, if the target is the read cache in step 652, the routine assigns the current MRU to be the read cache MRU in step 654. After step 654, step 676 checks to see if the line index equals the current MRU. If so, the line is already the MRU line and the routine simply returns to the caller in step 670. If the line index is not the MRU line, the routine sets the current LRU to be the read cache LRU in step 678 and the read cache MRU is set to the line index in step 680. From steps 674 and 680, the routine hooks the line up at the MRU end of the queue in step 682 to make the line the MRU line in the status buffer.

Because the preferred embodiment implements the pointers to the virtual and read cache as queues, step 682–692 relinks the LRU and MRU connection chains after the elements have been reordered in the chains. In step 684, the routine checks to see if the line index equals the current LRU or not. If the line index equals the current LRU, the routine further checks the target of the operation in step 686. In the event that the target is the read cache, the routine sets the read cache LRU at the head of the LRU chain in step 688. Alternatively, in the event that the target is the virtual cache, the routine sets the virtual cache IRU at the head of the IRU chain in step 690. Further, in the event that the line index is not the current LRU, the routine simply links the previous line in the queue to the next line of the IRU chain before it returns in step 670. In this manner, the routine of FIG. 16 removes specified cache lines from the LRU chain, places it in the MRU position, and repairs the link in the MRU chain of the virtual and real cache's status buffers.

Figure 17:
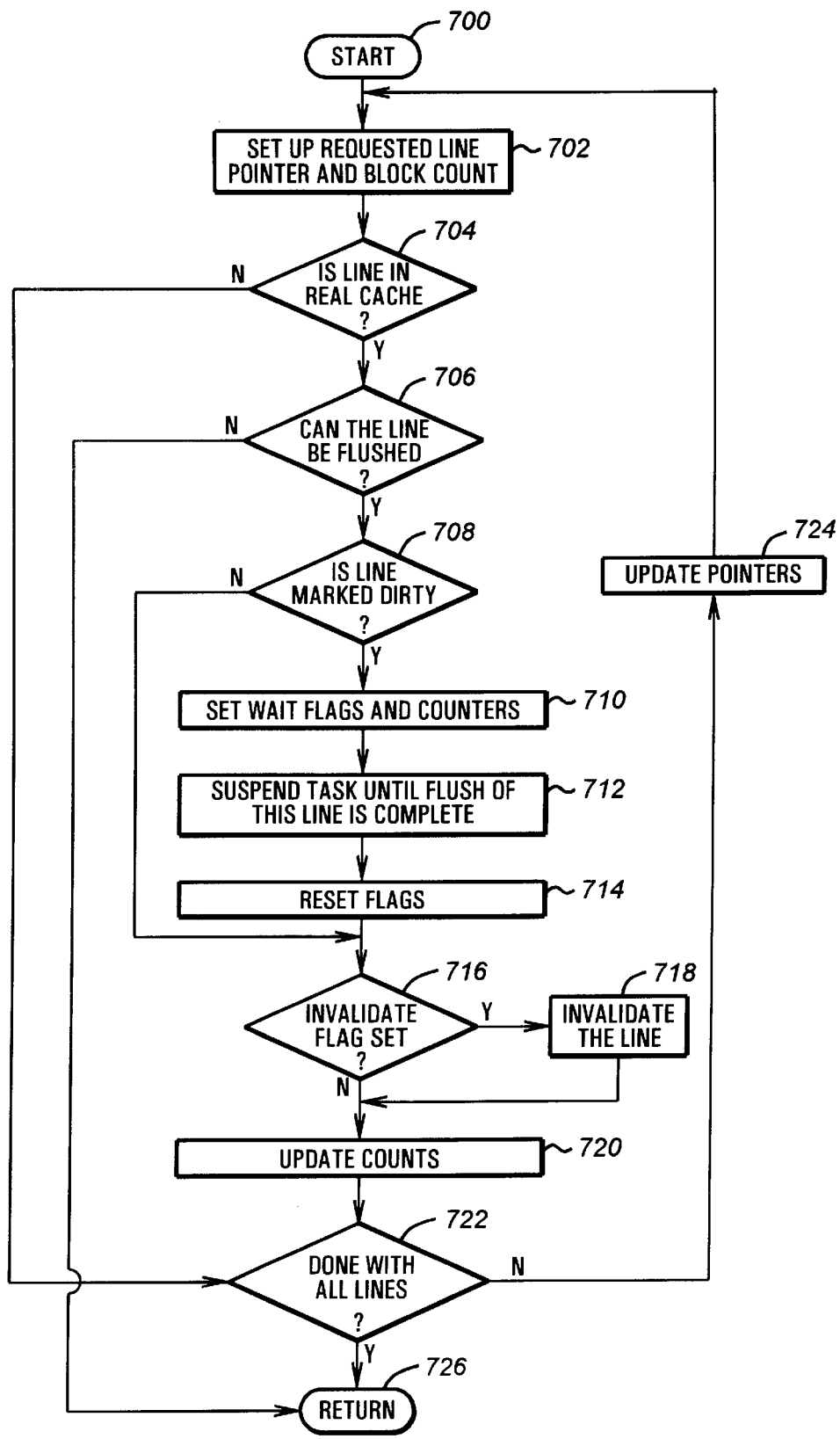
FIG. 17 is a flowchart disclosing the steps to flush dirty blocks from the cache.

Turning to FIG. 17, the process to flush dirty blocks is disclosed in more detail. This routine sequences through each line in a logical request to be flushed and waits until each line has been flushed before proceeding to the next line. Upon entry to the routine in step 700, the routine sets up the requested line pointer and block count in step 702. It then checks to see if the line has an entry in the real cache in step 704. If the line is not in the real cache, the routine moves on to the next line in step 722. Alternatively, if the line is in the real cache, the routine checks to see if the line can be flushed in step 706. If the line status from the status buffer indicates that it cannot be flushed, the routine returns to the calling routine with an indicator that the operation has failed in step 726. Alternatively, if the line can be flushed in step 706, the routine checks to see if the line has been marked dirty in step 708. If so, the wait flag and the appropriate counters are set in step 710 and the task is suspended until the line is flushed in step 712. After the routine comes out of hibernation in step 712, wait flags and counters are reset in step 714. Alternatively, if the line is not dirty in step 708, the routine checks to see if the invalidate flag has been set in step 716. If so, the line is invalidated in step 718. Alternatively, the appropriate counts are updated in step 720 to complete the processing for that particular line. In step 722, the routine checks to see if it has processed all lines. If not, the line pointers are appropriately updated in step 724 and the routine loops back to step 702 to continue processing of the next line. If all dirty lines in the request have been flushed in step 722, the routine returns to its caller in step 726.

Figure 18:
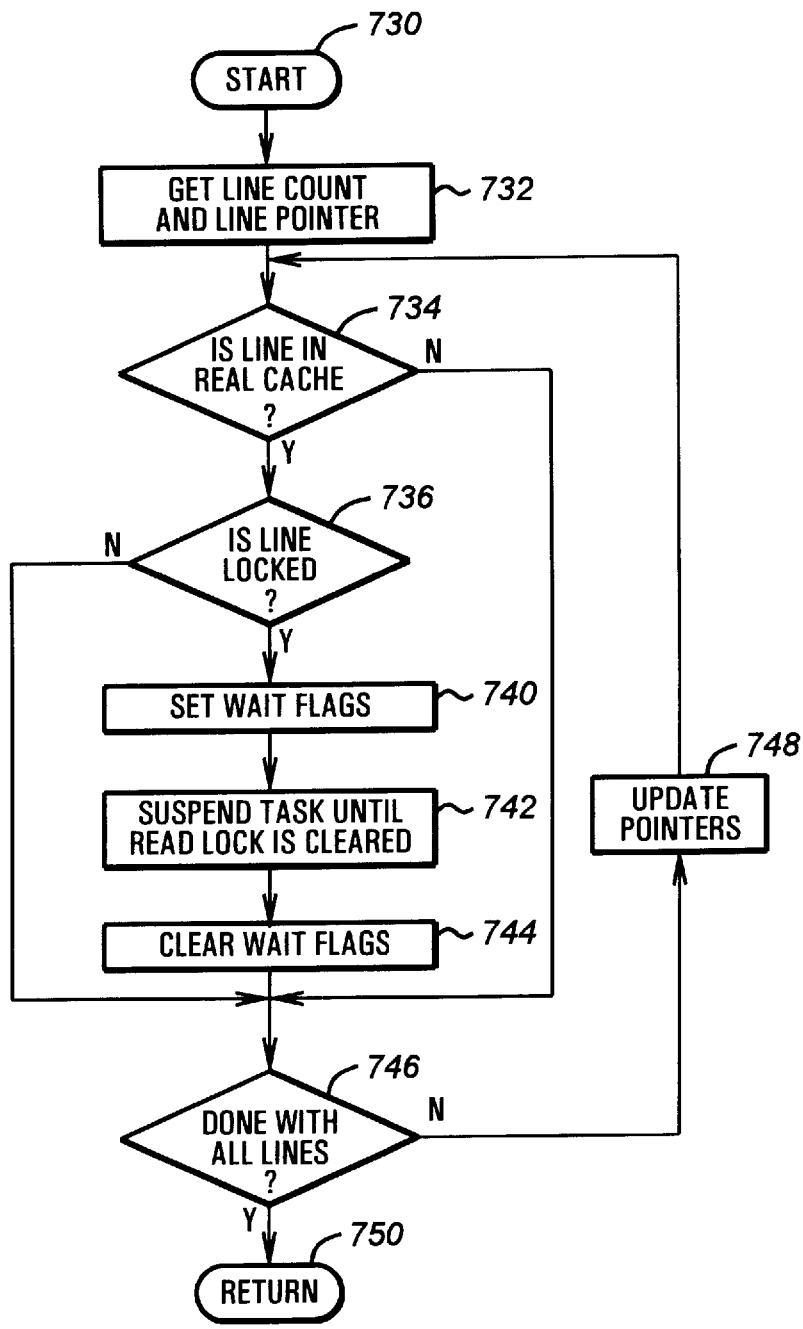
FIG. 18 is a flowchart disclosing the steps to wait until read data becomes available.

Turning to FIG. 18, the routine to wait for the read data is disclosed. This routine ensures that the pending reads on the cache lines are completed before allowing further operations. Upon entry to the routine in step 730, the routine extracts a line count and the line pointer in step 732. It then checks to see if the line is in the real cache or not in step 734. If not, the routine transfers to step 746 to process the next line. Alternatively, if the line is in the real cache, the routine checks to see if the line is locked in step 736. If not, the routine transfers to step 746 to check the next line. Alternatively, if the line is locked in step 736, the routine sets the wait flag in step 740 and then suspends the task until the read lock is cleared in step 742. Upon coming out of the hibernation from step 742, the routine clears wait flags in step 744. It then tests to see if all lines have been checked in step 746. If not, the routine simply updates the pointer to the next line for processing in step 748 and loops back to step 734 to examine the next line. On the other hand, if all lines have been processed, the routine exits in step 750.

Figure 19:
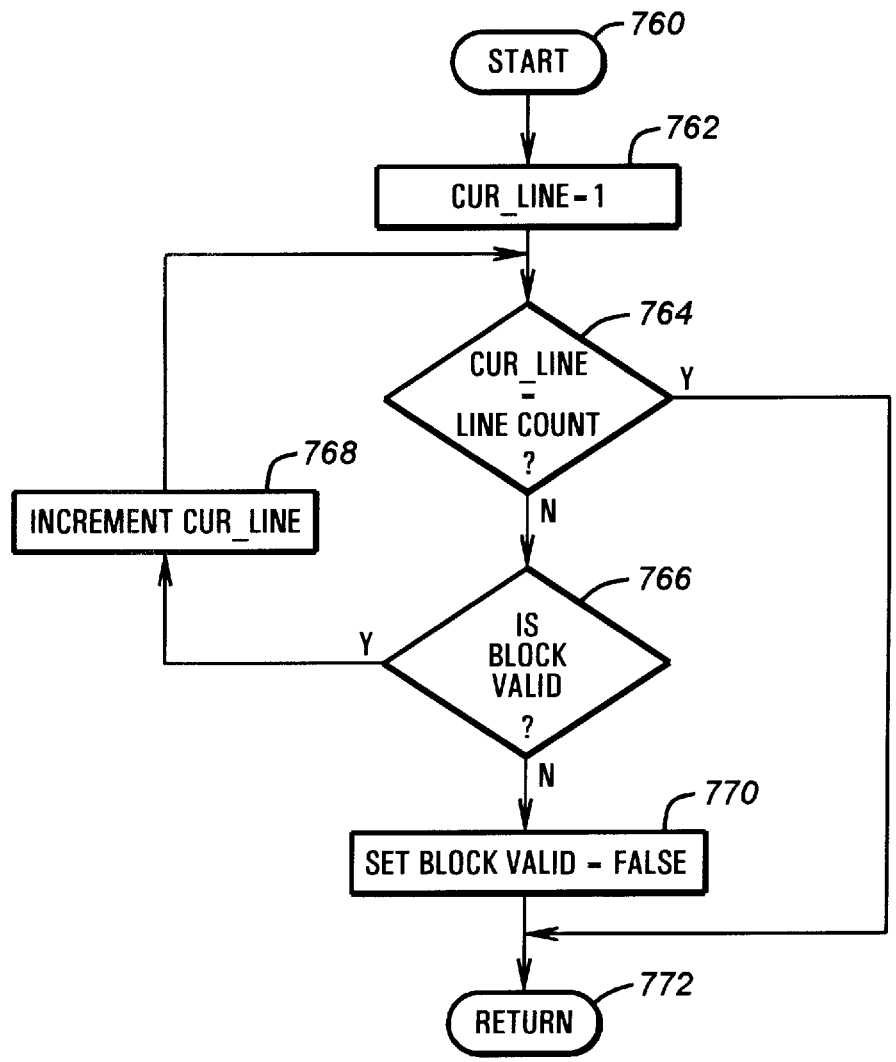
FIG. 19 is a flowchart disclosing the process to check the validity of all blocks in a requested line.

Turning to FIG. 19, the routine to check the validity of all blocks in a logical request is disclosed. This routine sequentially steps through each block of a line to see if a valid flag has been set in each block. In step 762, the current line is set to one. In step 764, the current line is compared against the maximum number of lines to be checked. If the current line is less than the line count, the routine checks the validity of the block associated with the current line in step 766. If the block is not valid, the routine negates the block valid flag in step 760 and returns to the caller routine in step 772. If the block is valid in step 766, the routine increments the current line counter in step 768 and loops back to step 764 to check the next line. Eventually, when current line equals the line count, the routine return to its caller in step 772. After stepping through all lines, if the block valid flag has not been negated, the routine returns in step 772 with an indication that all of the blocks in the requested line count are valid.

Figure 20:
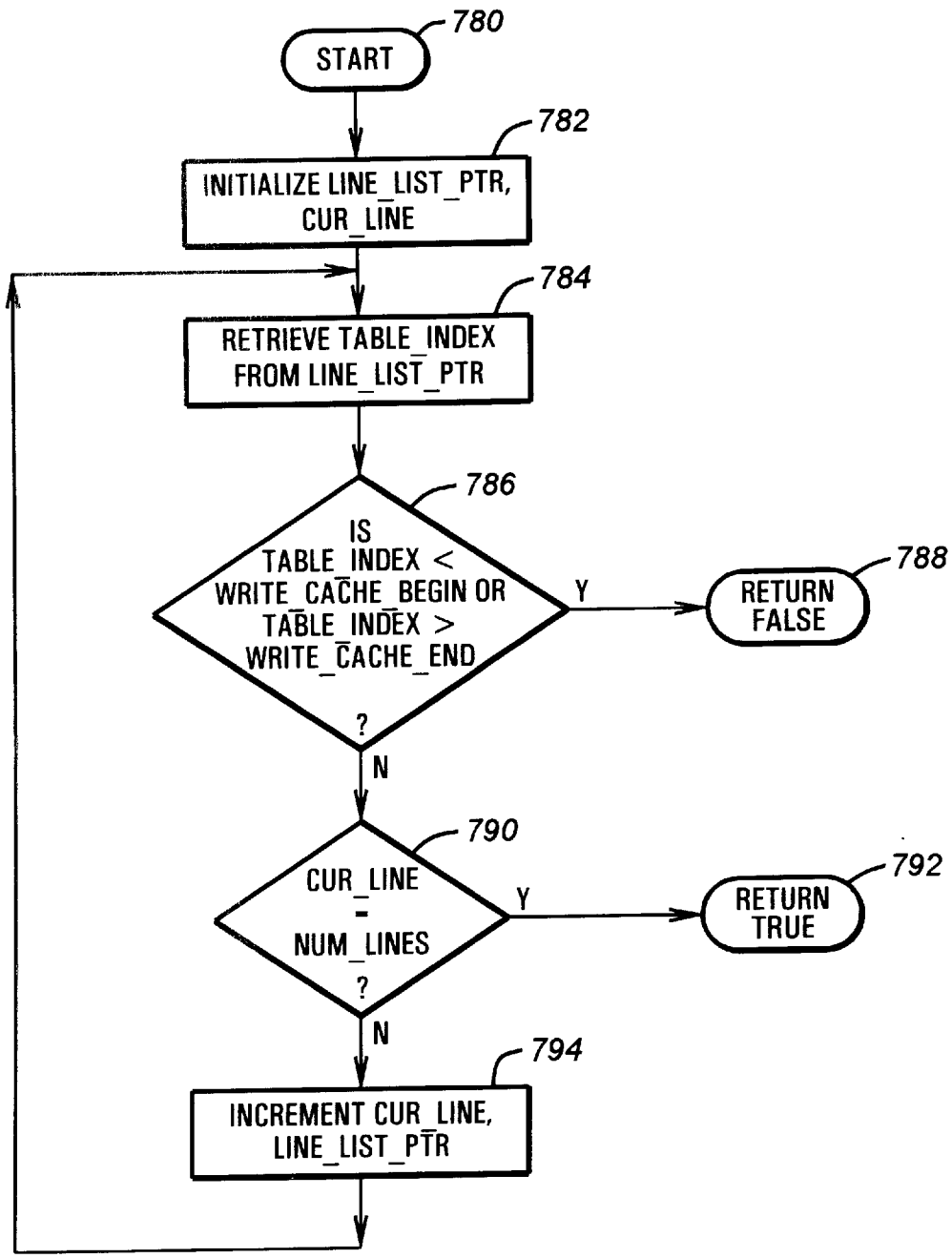
FIG. 20 is a flowchart disclosing the process to check for the presence of requested lines in the write cache.

FIG. 20 discloses the routine for determining if all cache lines in a logical request are in the write cache space. Upon entry to the routine in step 780, a line list pointer LINE__LIST__PTR and a current line count CUR__LINE are initialized in step 782. In step 784, the routine retrieves the table index from the line list pointer. In step 786, the routine checks to see if the line pointed to by the table index is within the write cache space. Thus, if the table index is less than a write cache begin marker or if the table index is greater than a write cache end marker, the routine returns to its caller in step 788 with an indication that the requested line is not in the write cache. Alternatively, in step 786, if the table index pointer selects a line within the write cache space, the routine checks to see if all lines have been checked in step 790. If so, the routine returns to the caller in step 792 with a flag indicating that all lines are indeed in the write cache. If the current line CUR__LINE is not equal to the number of lines to be checked, the routine increments the current line and the line list pointer LINE__LIST__PTR in step 794 before looping back to step 784 to check the next line in the write cache.

Figure 21:
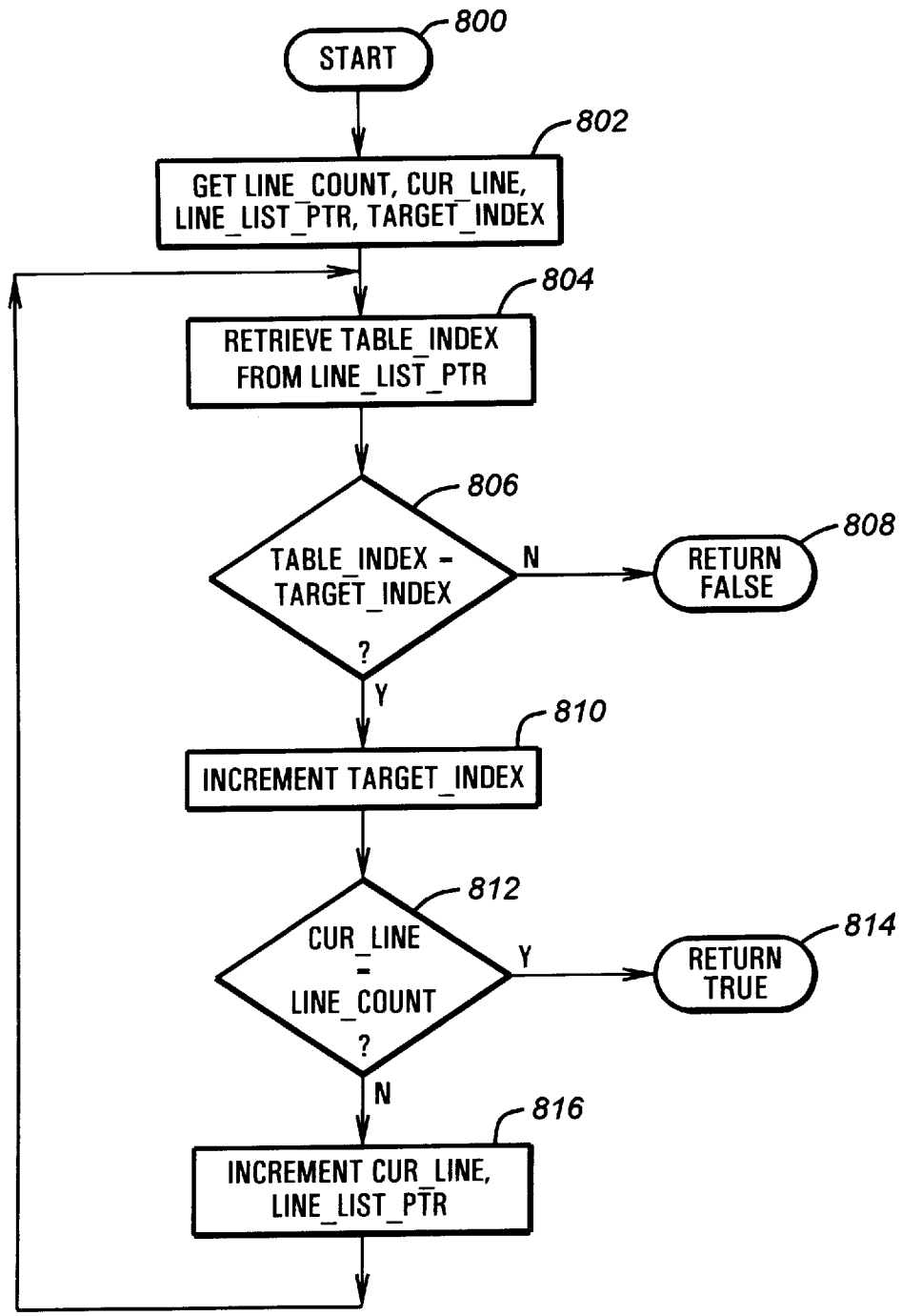
FIG. 21 is a flowchart disclosing the steps to check for a contiguous block of lines.

FIG. 21 discloses the routine to check whether or not a group of lines is contiguous. Upon entry to the routine in step 800, a line count, a current line, a line list pointer and a target index are initialized in step 802. The routine next retrieves a table index from the line list pointer in step 804. If the table index equals the target index, the target index is incremented in step 810. Alternatively, if the table index is not equal to the target index, a contiguous flag is negated and the routine returns in step 808 to indicate that the selected lines are not contiguous. In step 812, the routine checks to see if the current line equals to the line count. If so, all lines have been checked and the routine returns to its caller in step 814 with an indication that the lines are contiguous. Alternatively, if all lines have not been checked, the current line is incremented and the line list pointer is pointed to the next location in step 816 before the routine loops back into step 804 to check the next line. In this manner, all lines in the logical requests are checked to see if they belong in one contiguous block.

Figure 22:
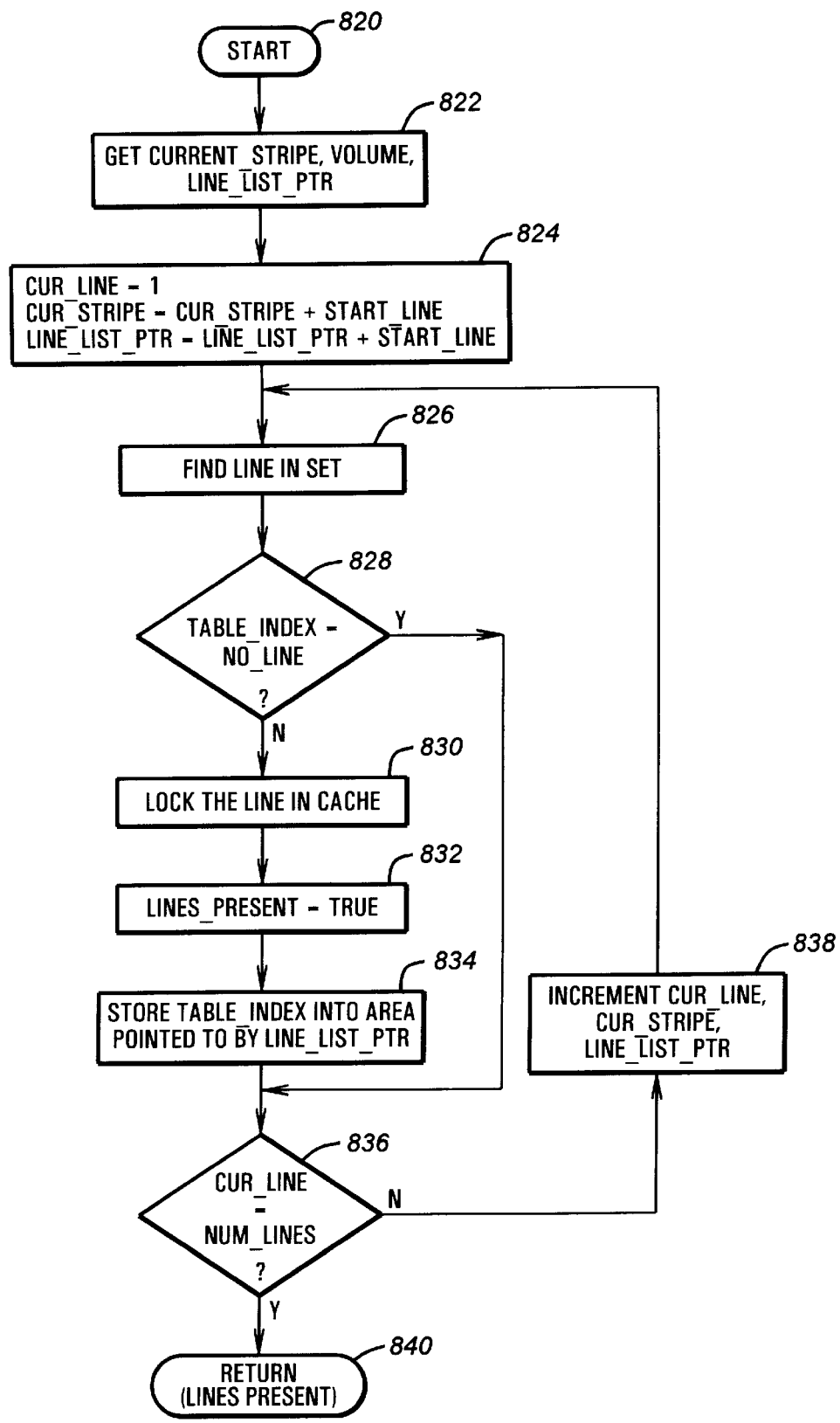
FIG. 22 is a flowchart disclosing the steps to check for the presence of lines in a cache.

Turning to FIG. 22, the routine to check for the existence of a logical request entry in the cache is disclosed. At the beginning of the routine in step 820, the routine retrieves a current stripe, a volume, and a line list pointer from the logical request in step 822. In step 824, variables such as current line, current stripe, and line list pointer are initialized. In step 826, the routine FIND_LINE_IN_SET is called to see if the line has an entry in the cache set. The routine FIND_LINE_IN_SET is disclosed in more detail in FIG. 26. The result of FIND_LINE_IN-SET is stored in the table index pointer. In step 828, if the table index pointer equals NO_LINE, the routine transitions to step 836. Alternatively, if an entry for the line exists, the line is locked in step 830 so that it cannot be subsequently allocated. Further, a LINES_PRESENT flag is asserted in step 832. In step 834, the table index is stored in an area pointed to by the line list pointer before the routines moves on to the next line. In step 836, if the current line is less than the number of lines requested to be checked, the routine increments the current line, the current stripe and line list pointer in step 838 before it loops back to step 826 to process the next line. Alternatively, if all lines have been processed, the routine returns to its caller in step.

Figure 23:
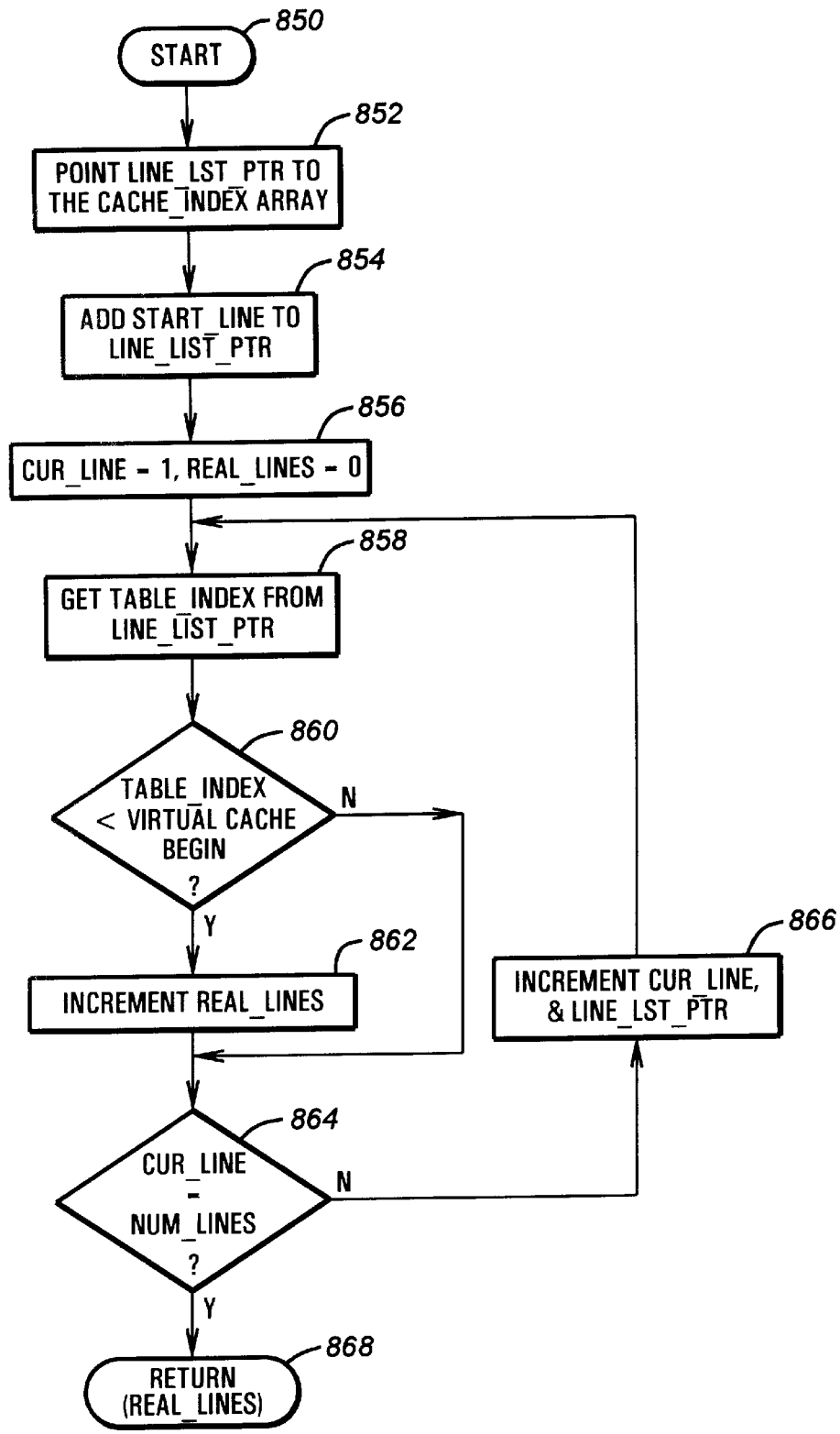
FIG. 23 is a flowchart disclosing the steps to count the number of requested lines in the real cache.

Turning now to FIG. 23, the routine to count the number of lines having corresponding entries in the real cache is disclosed. Upon entry to the routine in step 850, the pointer to the line list LINE_LIST_PTR is set to the cache index array in step 852. In step 854, the routine moves the line list pointer to the start of the requested block. In step 856, the routine initializes a current line CUR_LINE and a real line count REAL_LINES. In step 858, the routine retrieves a table index based on the line list pointer. In step 860, because the read cache is physically positioned below the virtual cache, if the table index is less than the beginning of the virtual cache, the routine increments the real line count REAL_LINES in step 862. Alternatively, if the table index is greater than or equal to the beginning of the virtual cache, the routine skips to step 864 without incrementing the real line counter REAL_LINES because the line is not present in the real cache. In step 864, if the current line CUR_LINE equals the number of lines requested to be checked, the routine returns with the real line count REAL_LINES in step 868. Otherwise, if all lines have not been reviewed, the routine increments the current line CUR_LINE and the line list pointer LINE_LIST_PTR in step 866 and loops back to check for the next line in step 858. In this manner, the routine counts the number of lines in the read cache within a block of lines.

Figure 24:
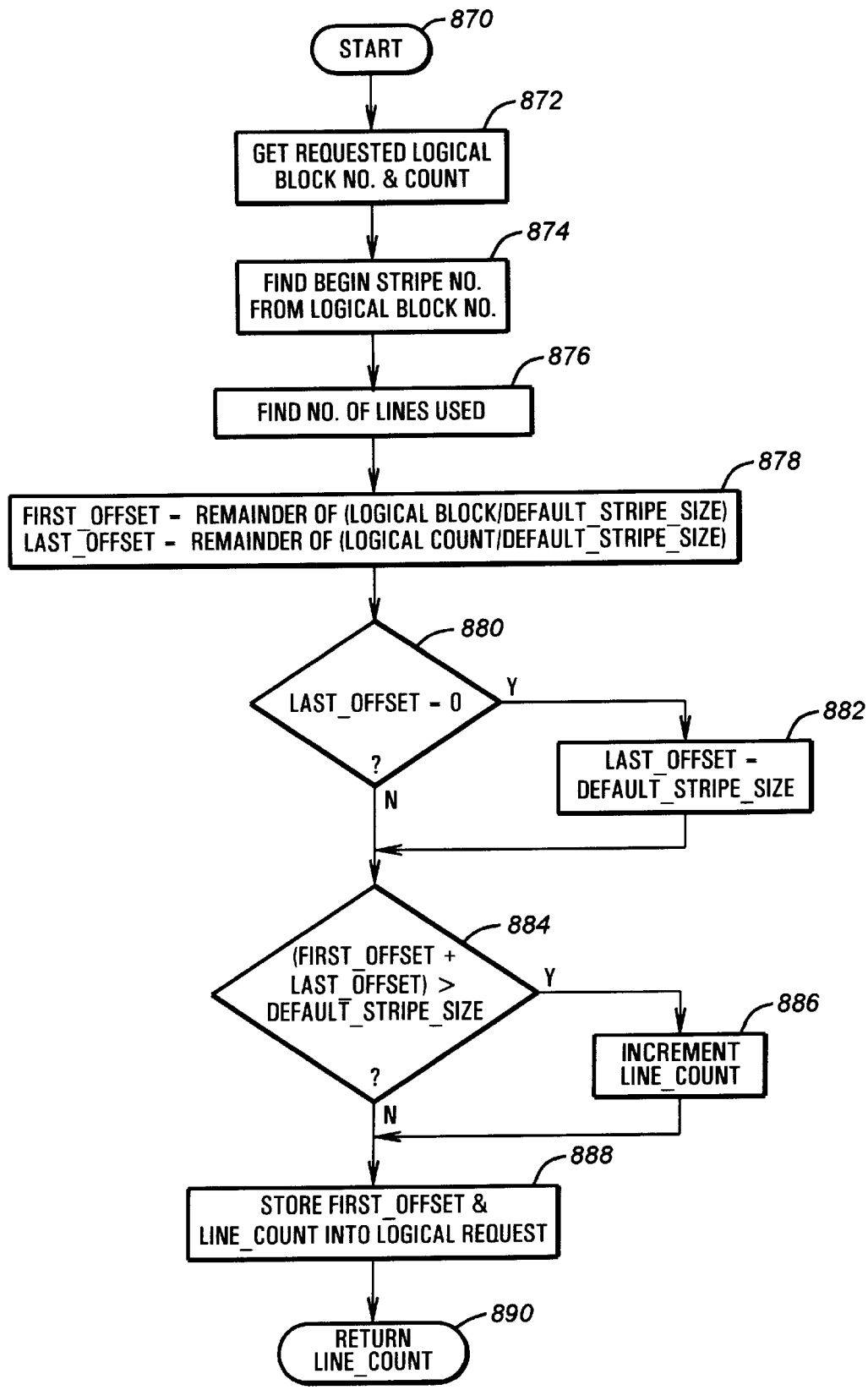
FIG. 24 is a flowchart disclosing the steps to fill a logical request with cache information.

Turning to FIG. 24, the process to fill logical request fields associated with a request is disclosed. Upon entry to the routine in step 870, the routine retrieves a logical block number and a block count in step 872. Based on the logical block number, the routine extracts a beginning stripe number in step 874 and also the number of line used in step 876. The routine computes a first offset as a function of the logical block and the default stripe size as well as a last offset as a function of the logical count and the default stripe size in step 878. In this manner, the routine determines locations of the start and the end of the request within their respective cache lines. In step 880, the routine checks if the last offset equals zero to handle the condition wherein the bus master requests an even multiple of stripes. If so, the last offset is simply the default stripe size in step 882. Next, in step 884, if the sum of the offset is greater than the stripe size in step 884, the line count is incremented in step 886 because the request affects an additional line. Alternatively, if the first offset and the last offset are less than or equal to the stripe size, the first offset and the line count is stored into the logical request in step 888 and the routine returns to its caller in step 890. In this manner, the logical request fields are filled with the first offset and the line count.

Figure 25:
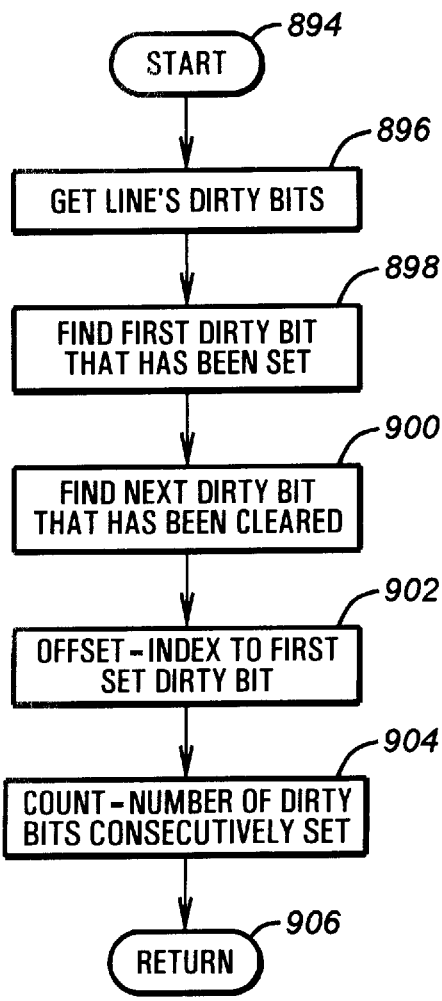
FIG. 25 is a flowchart disclosing the steps to find dirty blocks in the cache.

FIG. 25 discloses in more detail the routine to find a contiguous block of dirty bits in a line. Upon entry to routine in step 894, the routine obtains the line's dirty bits in step 896. In step 898, the routine locates the first dirty bit that has been set in the retrieved dirty bit array. In step 900, the routine finds the next dirty bit that has been cleared. In step 902, the routine computes an offset as the index to the first dirty bit that has been set. Further in step 904, the routine computes a count as the number of dirty bits that has been consecutively set. The count is provided to the caller upon exiting the routine at step 906.

Figure 26:
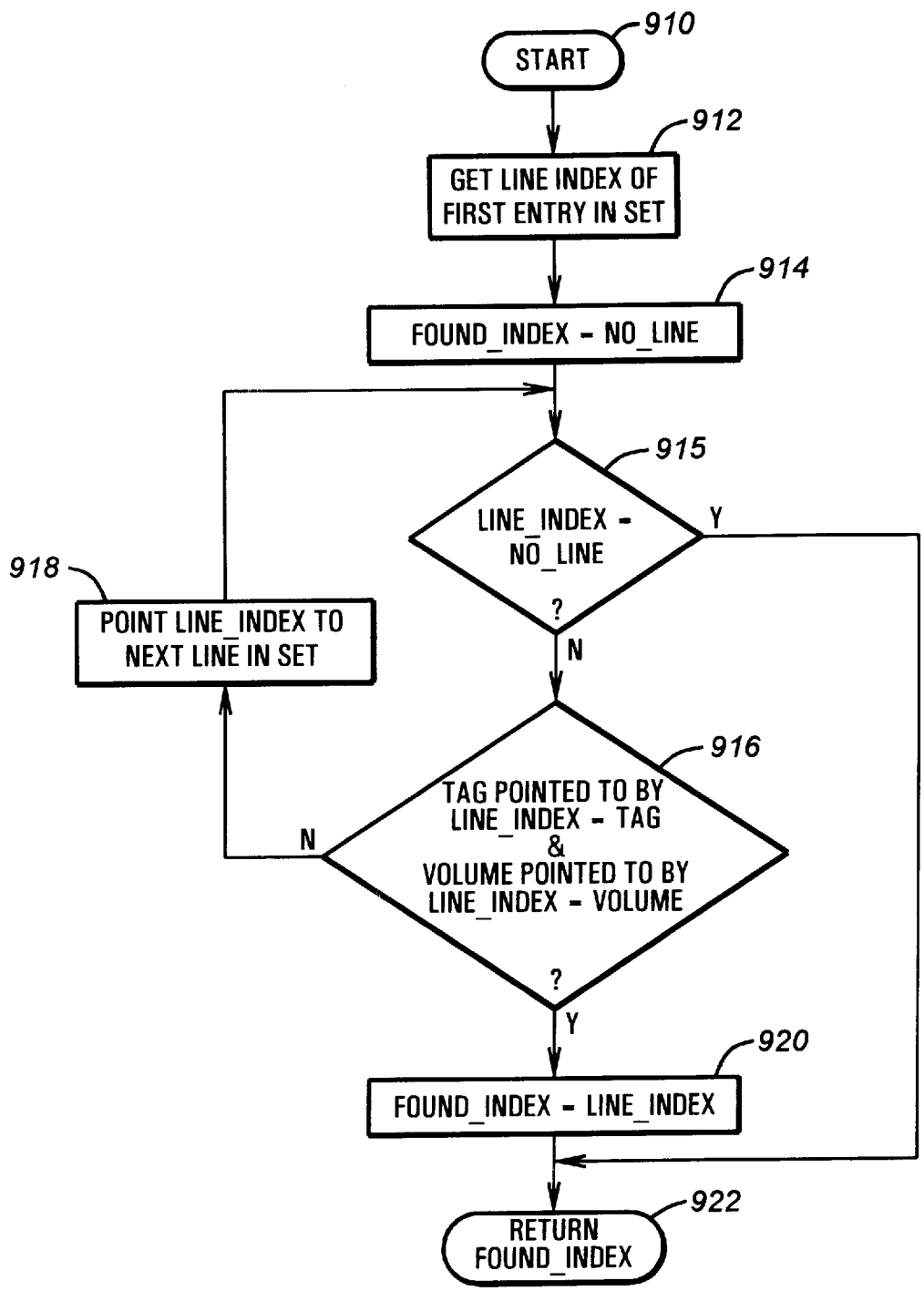
FIG. 26 is a flowchart disclosing the steps to locate a line in a particular set.

Turning to FIG. 26, the routine to check whether or not the line has an entry in a cache set is disclosed. After entry to the routine in step 910, the routine obtains a LINE_INDEX of the first entry in the set in step 912. A FOUND_INDEX is initialized to NO_LINE in step 914. In step 915, if LINE_INDEX equals NO_LINE, the routine returns to its caller in step 922. Otherwise, in step 916, if an address tag pointed to by LINE_INDEX equals the address tag of the line being searched, and the volume pointed to by LINE_INDEX equals the volume of the line being searched, FOUND_INDEX is set to LINE_INDEX in step 920 before returning to the caller in step 922 along with LINE_INDEX. Alternatively, if the address tags and the volumes do not match in step 916, the routine points to the next line in the set in step 918 and loops back to step 915 to test the next line. In this manner, the routine returns the index in cache table entry to the caller if the line is present in the set.

Figure 27:
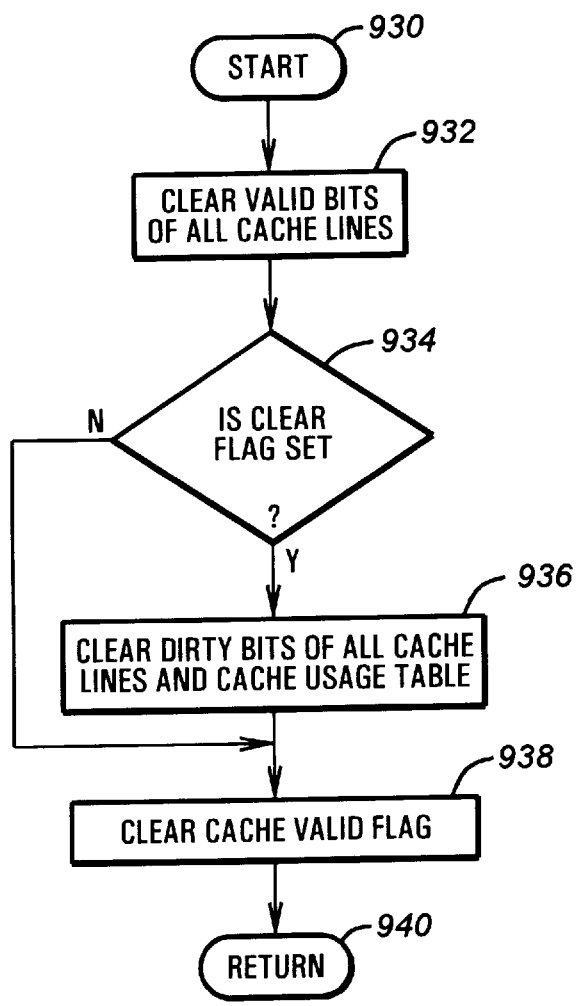
FIG. 27 is a flowchart disclosing the steps to invalidate a cache.

Turning to FIG. 27, the routine to invalidate the cache is disclosed. Upon entry to the routine in step 930, the routine clears all valid bits of all cache lines in step 932. Next, if a clean flag is set in step 934, the dirty bits of all cache lines and the cache usage table are cleared in step 936. If the clean flag is not set in step 934, the routine transfers to step 938 where a cache valid flag is cleared. Next, the routine returns to its caller in step 940 after the cache has been invalidated.

Figure 28:
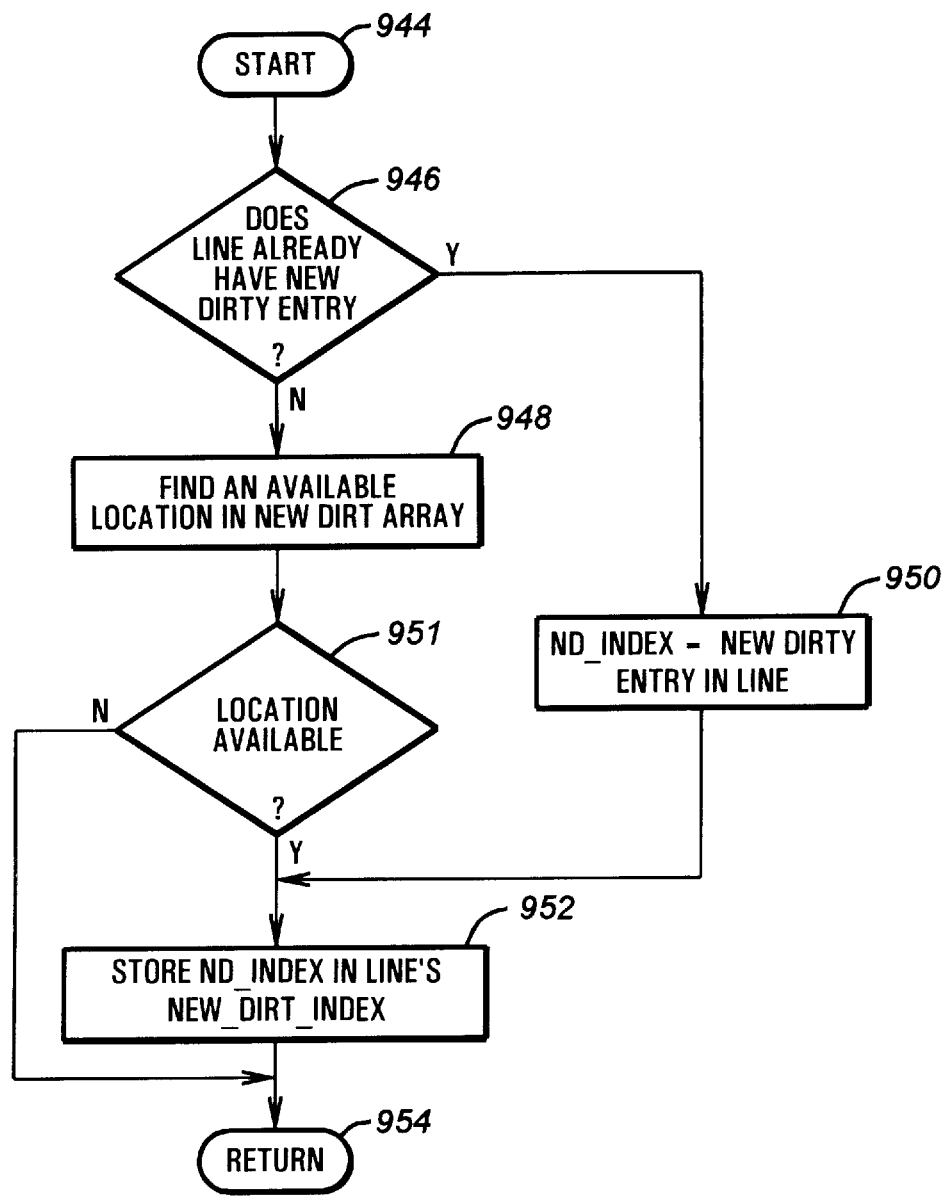
FIG. 28 is a flowchart disclosing the steps to post cache dirty entries.

Turning to FIG. 28, the routine to post new dirty bits for a cache line being flushed is disclosed. Upon entry to the routine in step 944, the routine checks to see if the line already has a new dirty entry in step 946. If so, the new dirty index is set to the new dirty entry in the line in step 950. If not, the routine locates an available location in a new dirty array in step 948. If an entry cannot be located in the dirty array, the routine exits with a failure flag in step 954. Alternatively, the routine stores ND_INDEX in the line's NEW_DIRTY_INDEX in step 952 and returns to the caller in step 954 with a flag indicating success.

Figure 29:
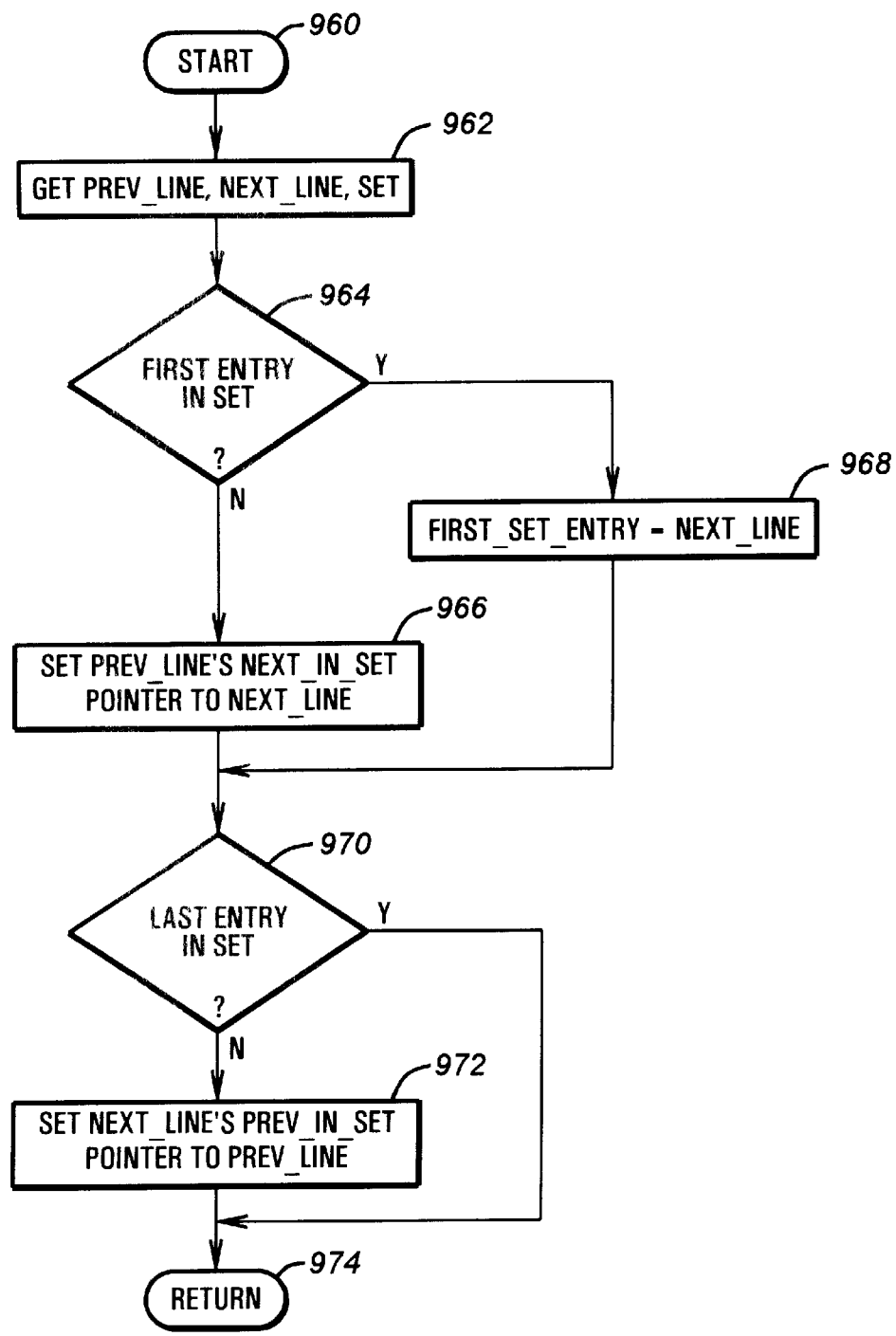
FIG. 29 is a flowchart disclosing the steps to remove a line from a set.

FIG. 29 discloses in more detail the process to remove a line from a set. Upon entry to the routine in step 960, a previous line, a next line, and a set information are initialized in step 962. If the entry is the first in a set in step 964, the routine sets FIRST_SET_ENTRY to the next line in step 968. Alternatively, if the line is not the first entry in the set, the routine sets the previous line's NEXT_IN_SET pointer to the next line. In step 970, if the line is not the last entry in this set, the routine sets the next line's PREV_IN_SET pointer to the previous line in step 972. If the line is the last entry in this set, the routine returns to the caller in step 974. In this manner, the queue tracking the members of the set is properly relinked to the next line and the previous line when one line is removed from the queue.

Figure 30:
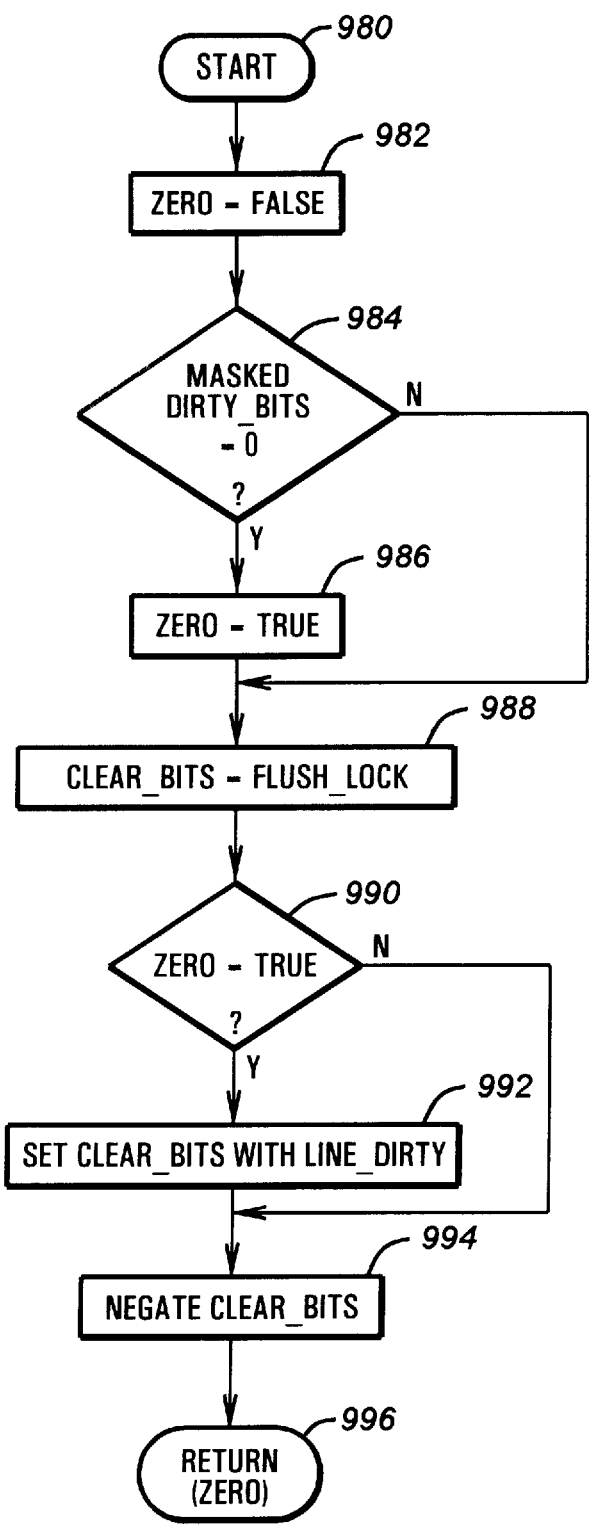
FIG. 30 is a flowchart disclosing the steps to determine that a cache block is clean.

Turning to FIG. 30, the process to mark blocks in a disk request as being clean in the cache is disclosed. After entry of the routine in step 980, a ZERO flag is cleared in step 982. Next, in step 984, if the masked dirty bits equals zero in step 984, ZERO is set to true in step 986. In step 988, a clear bit CLEAR_BIT is set to FLUSH_LOCK. Further, if the zero flag ZERO is true in step 990, the clear bits is OR'd with a LINE_DIRTY in step 992. Otherwise, if ZERO is not true in step 990, the routine negates the clear bits CLEAR_BIT in step 994 before returning to the caller in step 996 with the ZERO flag. In this way, the routine marks the blocks in a disk request as being clean in the cache.

Figure 31:
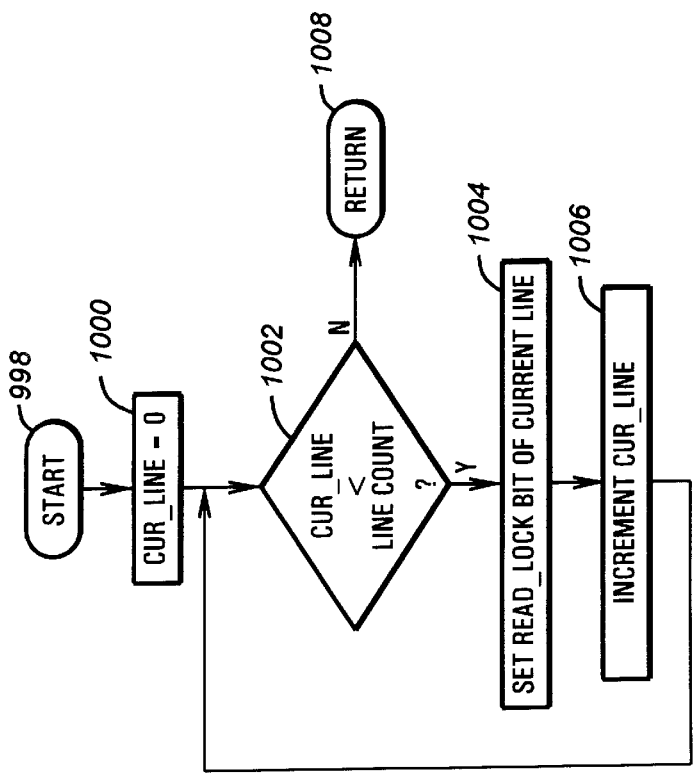
FIG. 31 is a flowchart disclosing the process to lock read cache lines.

Turning to FIG. 31, the process to set a read lock for all cache lines referenced by a logical request is disclosed. Upon entry to a routine in step 998, the routine initializes the current line count CUR_LINE to zero in step 1000. In step 1002, while the current line CUR_LINE is less than the line count of the logical request, the routine sets a read lock bit READ_LOCK of the current line in step 1004 and increments the current line count CUR_LINE in step 1006 before it loops back to step 1002 to process the next line. Once all the lines have been processed in step 1002, the routine exits in step 1008. Thus, the lines referenced by the request are locked.

Figure 32:
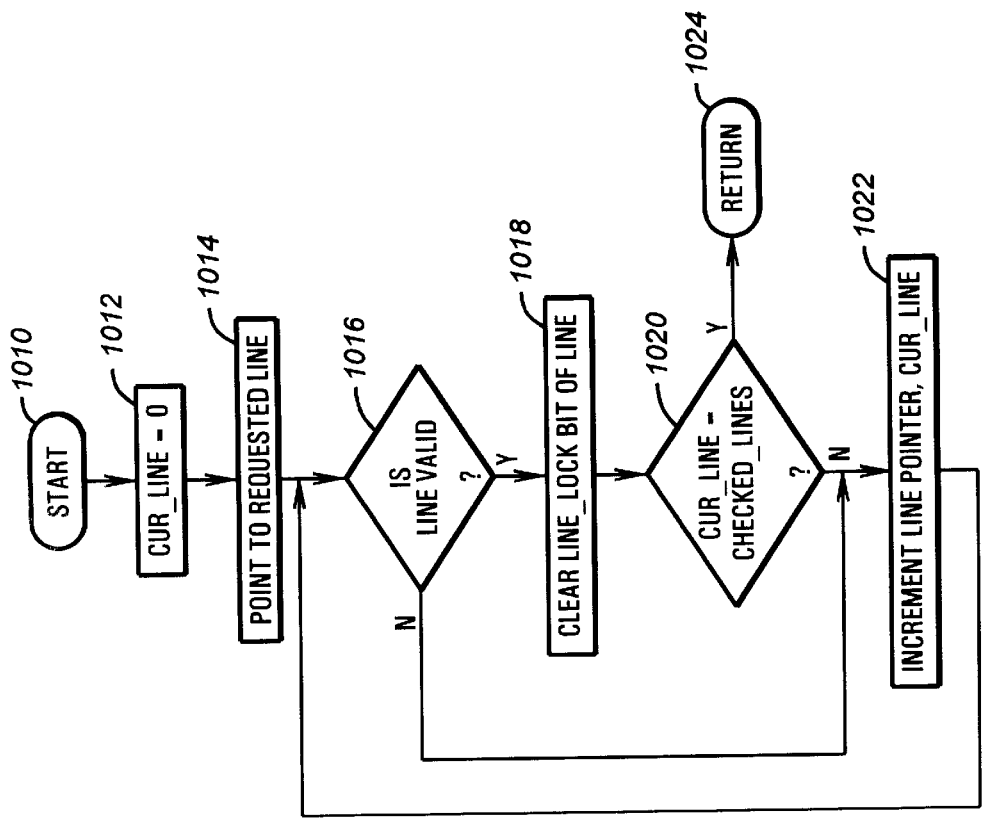
FIG. 32 is a flowchart disclosing the steps to unlock cache lines.

Turning to FIG. 32, the routine to unlock the cache lines is disclosed. Upon entry to the routine in step 1010, the routine initializes the variables in step 1012–1014 by setting the current line count CUR_LINE to zero and the pointer to the requested line. In step 1016, if the line is valid, the routine clears a LINE_LOCK bit of the current line in step 1018. Next, if the current line equals the number of lines to be checked, the routine returns in step 1024. Otherwise, the routine transitions from step 1020 to step 1022 where the line pointer and the current line count are incremented before the routine loops back to step 1016 to process the next line. In this manner, all the lines requested to be unlocked are processed.

Figure 33:
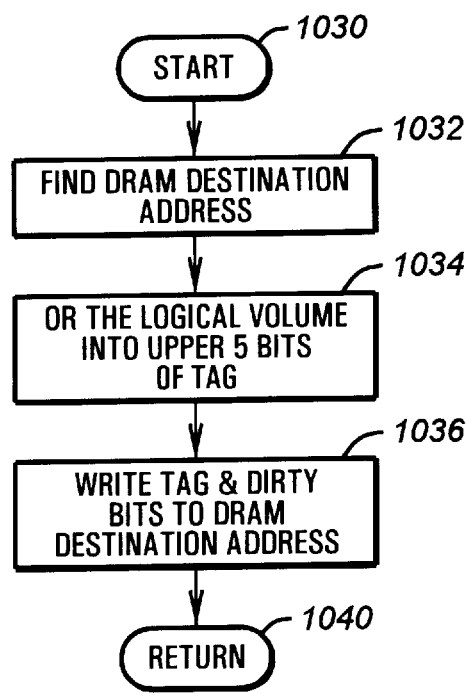
FIG. 33 is a flowchart disclosing the process to update the status of a line.

Turning to FIG. 33, the process to update the line status of the cache is disclosed. After entering the routine in step 1030, a DRAM destination address is computed in step 1032 based on a table index which is passed to the routine. Next, in step 1034, the logical volume is OR'd and encoded into the upper five bits of the tag. Next, the tag and the dirty bits are written to the DRAM in step 1036 before the routine returns to the caller in step 1040.

Figure 34:
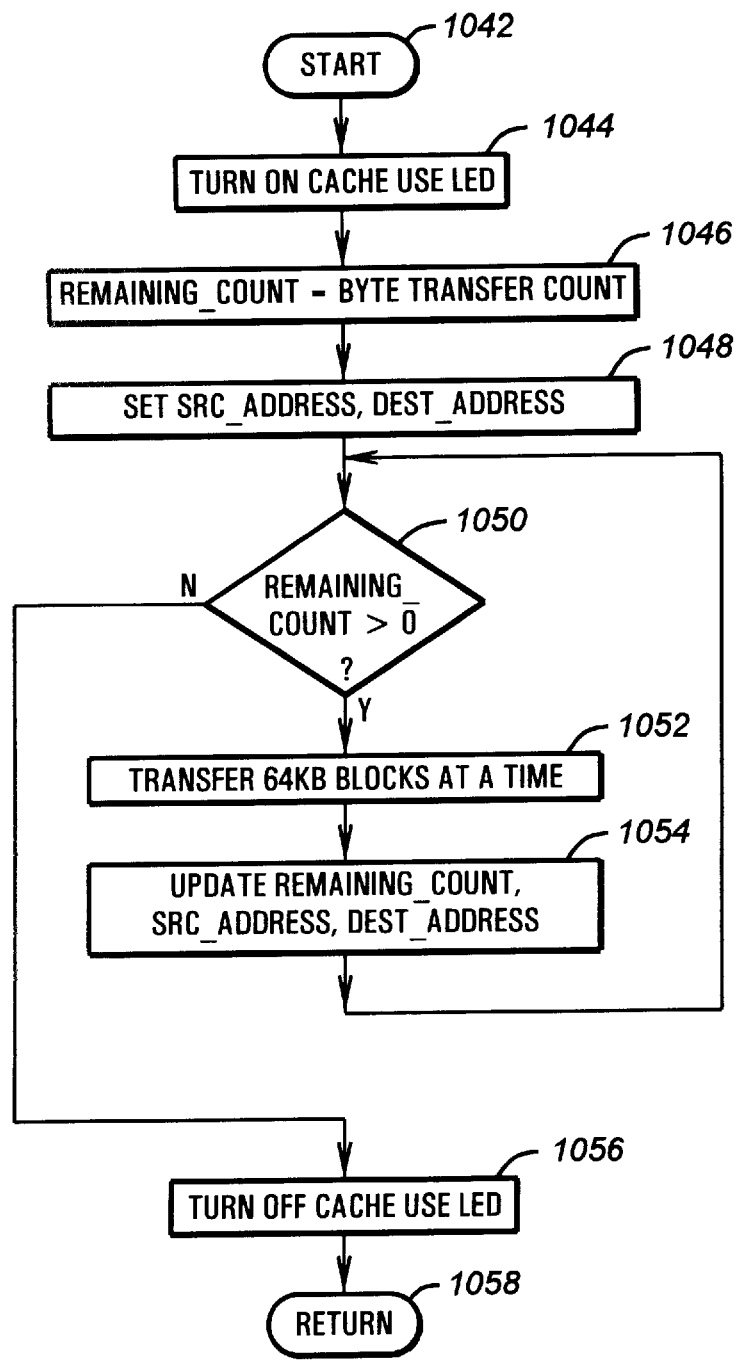
FIG. 34 is a flowchart disclosing the process to perform a block transfer of data to and from the cache.

Turning to FIG. 34, the process to transfer data to and from the read-ahead cache is disclosed. Upon entry to the routine in step 1042, the routine turns on a cache use LED in step 1044 to signal users that the cache is being utilized. Next, in step 1046, a remaining count is set to a byte transfer count. In step 1048, a source address and a destination address are set based on the direction of the transfer from or to the cache. Next, steps 1050–1054 perform the data transfer in groups of 64 kilobytes at a time. In step 1050, if the remaining count is positive, indicating that more data needs to be transferred, the routine continues to transfer 64 kilobytes of data at a time to the DRAM 116. After each block transfer, the routine updates the remaining count, the source address and the destination address in step 1054 before it loops back to step 1050 to see if additional blocks need to be transferred. If the remaining count equals zero, the routine turns off the cache use LED in step 1056 before it returns to the caller routine in step 1058 with the transfer count. In this way, the data is transferred to or from the host cache as required by any cache operation to take advantage of the block transfer capability of the DRAM interface 118.

Figure 35:
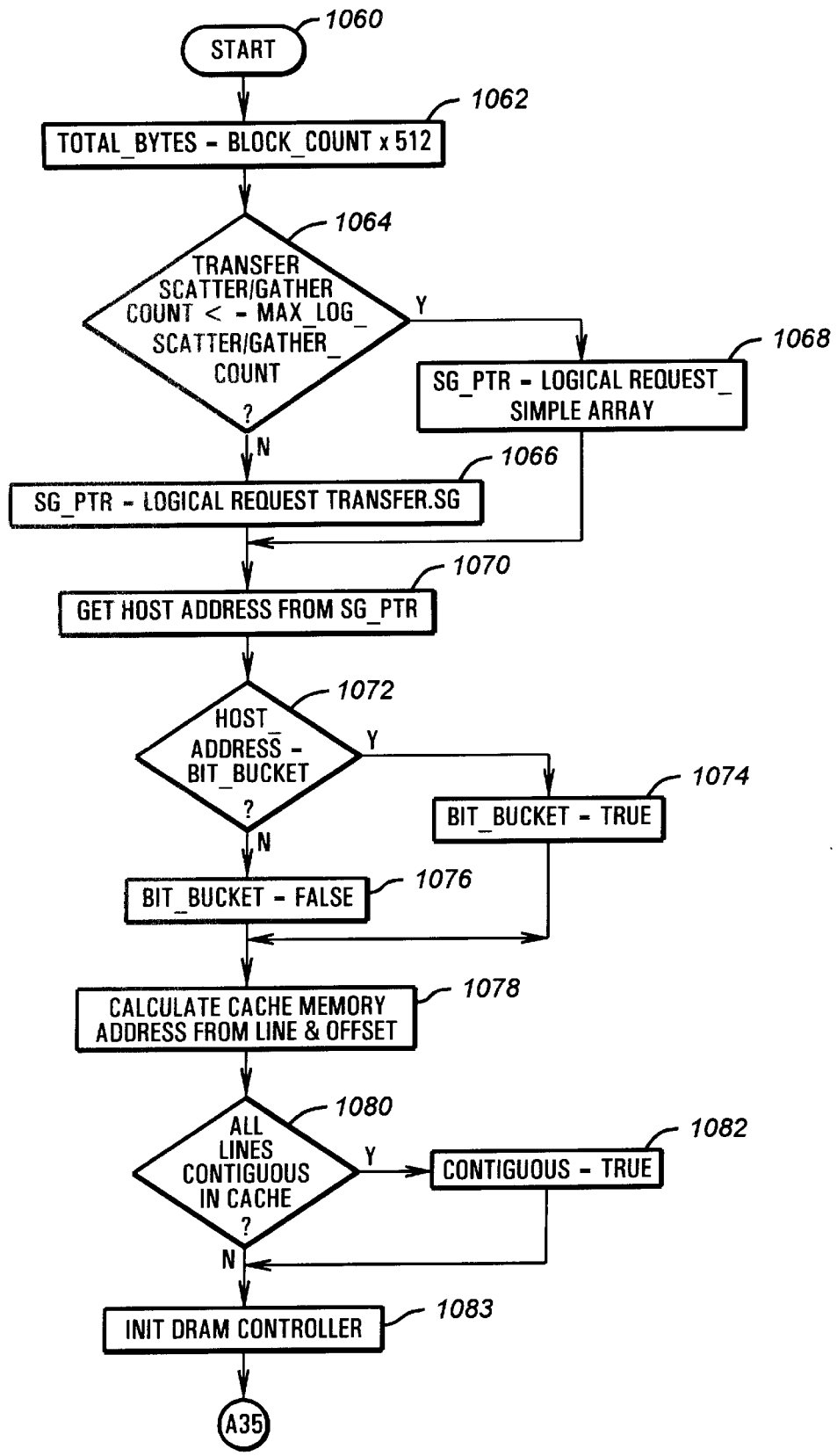
FIGS. 35 and 35A are flowcharts disclosing in more detail the steps to transfer data to and from the cache.
Figure 35A:
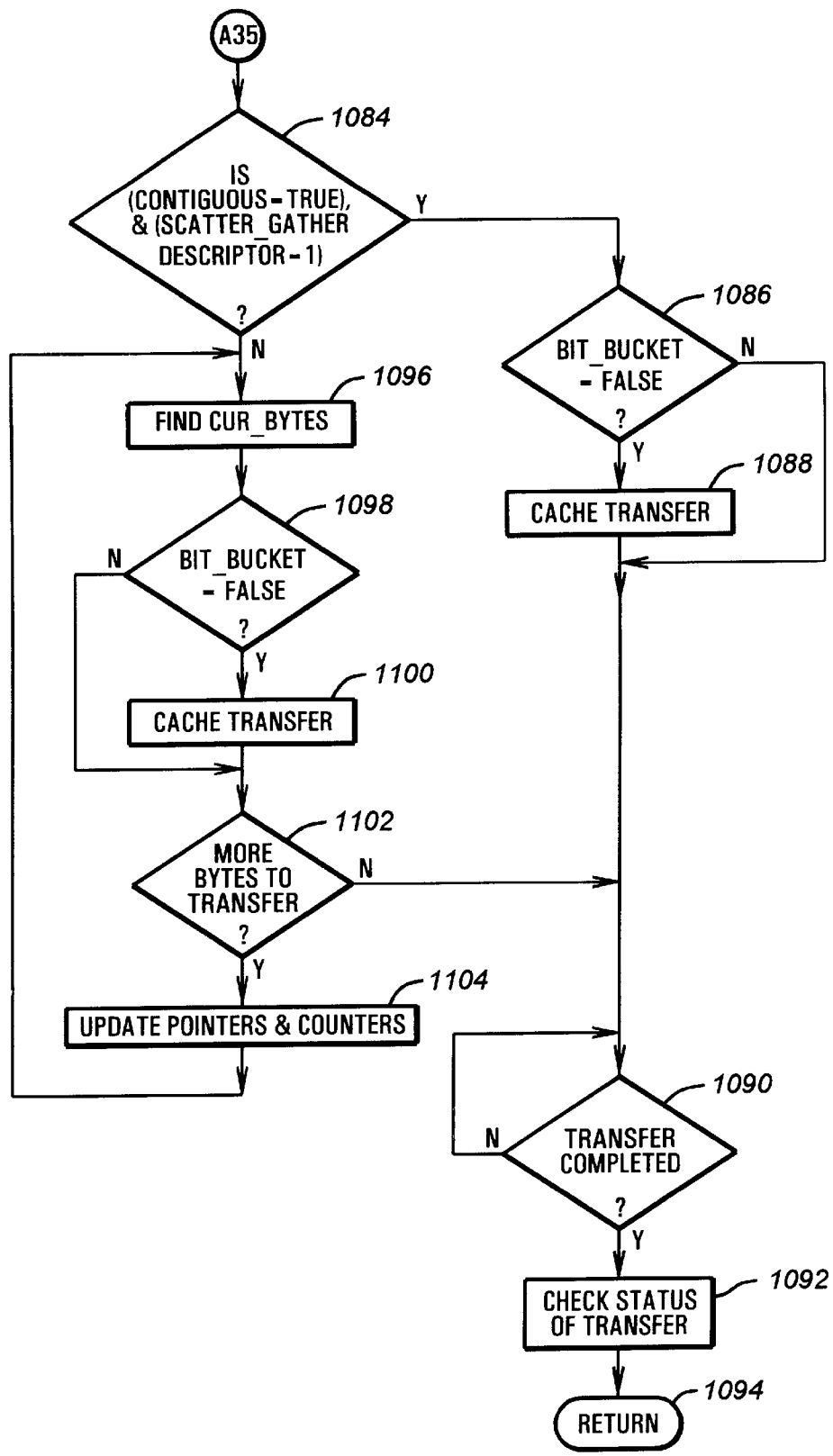

Turning to FIGS. 35 and 35A, the process to perform data transfers for cache requests is disclosed. After entering the routine from step 1060, a total byte count is computed as a function of the block count in step 1062 preferably by multiplying the block count by 512. In step 1064, if the transfer scatter/gather count is less than or equal to a maximum logical scatter/gather count, the transfer pointer is selected to be a simple array in step 1068. Alternatively, if the transfer scatter/gather count is greater than the maximum logical scatter gather count, the scatter/gather pointer is set to the appropriate scatter/gather block in step 1066. The scatter/gather description count is used to designate the number of scatter/gather descriptors which are utilized in a particular request. In step 1070, the host address is retrieved from the scatter/gather pointer. If the host address equal BIT_BUCKET, a value indicating that the data is to be disposed of, a bit bucket flag BIT_BUCKET is asserted in step 1074. Otherwise, the bit bucket flag BIT_BUCKET is negated in step 1076. In step 1078, a cache memory address is computed based on the line and the offset information. Next, the routine checks in step 1080 for a contiguous block of cache lines. If so, the routine sets a contiguous flag CONTIGUOUS to true in step 1082 to support block transfer. In step 1083, the DRAM controller is initialized. Control then transfers to step 1084 of FIG. 35A via off-page connector A35.

Turning now to FIG. 35A, after initializing the DRAM controller status counter with the total transfer count, the routine performs the transfer, and then decrements the target counter by the number of transfers done. Thus, in step 1084, the routine checks to see if the contiguous flag CONTIGUOUS is asserted and if the scatter/gather count is one. If so, the routine checks to see if the bit bucket flag BIT_BUCKET is negated in step 1086. If the bit bucket flag BIT_BUCKET is asserted, the data associated with the bit bucket is simply disposed of as it is not needed. Alternatively, if the bit bucket flag is negated, the routine calls the cache transfer routine of FIG. 30 in step 1088.

From step 1084, if the contiguous flag CONTIGUOUS is negated or the transfer scatter/gather count is not equal to one, the routine computes a current byte count in step 1096. Next, the routine checks the bit bucket flag BIT_BUCKET to see if it is false. If so, the routine transfers the data via the cache transfer routine of FIG. 34 in step 1100. The routine then checks for remaining data that needs to be transferred in step 1102. Further, the routine updates the pointers and counters in step 1104 before looping back to step 1096 to process the next scatter/gather descriptor. Additionally, if all data has been transferred in step 1102, the routine transfers to step 1090 where it waits for all transfers to complete. The routine then checks the status of the transfer in step 1092 before it returns to the caller in step 1094 with a flag indicating success or failure.

As discussed above, the present invention provides an adaptive read ahead cache using a real cache and a virtual cache. The virtual cache only stores the tag addresses that are most recently requested by a host bus master. In the event of a hit in the real cache, data is provided directly from the read cache to the host. If the request generates a miss in both the read and the virtual cache, data is transferred directly from the disk resource to the host. The real cache is not updated, but the virtual cache is updated with the address of the request causing the miss. If the request generates a miss in the real cache but a hit in the virtual cache, the invention predicts that sequential accesses are occurring and updates the real cache with the disk request. The invention thus loads data into the cache only when sequential accesses are occurring and minimizes the overhead of filling the cache when the host is accessing data in a random access mode.

The invention further reads ahead data based on the size of the request. In the event of a hit in the real cache and the request is small, read ahead data is prefetched while the requested hit data is provided from the real cache to the host. Further, when the request generates a miss in the real cache but a hit in the virtual cache resulting in a read fill condition, if the request is relatively small, the request is modified so as to contain one or more read ahead lines before the request is submitted to the disk drives.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A method for buffering read requests from a bus master to a data storage device using a cache system, said bus master having a bus master address output for requesting data and a bus master data input for receiving data corresponding to said bus master address output, said data storage device having a data storage device address input for receiving a data storage device address and a data storage device data output for providing data corresponding to said data storage device address input, said cache system having a bus master address input coupled to said bus master address output, a bus master data output coupled to said bus master data input, a data storage device address output coupled to said data storage address input, and a data storage device data input coupled to said data storage device data output, said cache system having a real cache with a real cache data buffer, a real cache address buffer and a real cache status buffer, the read cache address buffer having a plurality of entries for storing real cache addresses, said cache system having a virtual cache with only a virtual cache address buffer and a virtual cache status buffer, said cache system buffering data associated with said bus master address, said method comprising the steps of:

storing said bus master address output in only said virtual cache address buffer if said bus master address output is not found in either of said real cache address buffer and said virtual cache address buffer;

filling said real cache data buffer with data responsive to said bus master address from said data storage device if said bus master address is found only in said virtual cache address buffer;

providing data responsive to sad bus master address directly from said bus master to said data storage device without placing said data in said real cache data buffer if said address is not found in said real cache address buffer or said virtual cache address buffer;

updating said real cache address buffer and said real cache status buffer if said bus master address is found only in said virtual cache address buffer;

detecting a hit in one of sad real cache address buffer entres if said bus master address output matches a real cache address; and providing data from said real cache data buffer associated with said bit to said bus master.

2. The method of claim 1, wherein said real cache status buffer stores cache invalidation information, further comprising the step of updating said real cache status buffer with cache invalidation bits.

3. The method of claim 1, wherein each of said real cache status buffer and virtual cache status buffer stores usage history information, further comprising the step of updating each of said real cache status buffer and said virtual cache status buffer with usage history statistics.

4. The method of claim 1, wherein said real cache address buffer has a plurality of address entries and said real cache data buffer has a plurality of buffer entries, one buffer entry corresponding to each of said address entries, said filling step flier comprises the steps of:

identifying one of said address entries in said real cache address buffer as a replacement entry;

copying said bus master address output into said replacement entry; and copying said data responsive to said address into said real cache data buffer entry associated with said replacement entry.

5. The method of claim 4, wherein said identifying step further comprises the step of selecting a least recently used entry from said real cache address buffer.

6. The method of claim 4, further comprising the step of moving the address stored in said replacement entry to said virtual cache address buffer before copying said address from said bus master into said replacement entry.

7. The method of claim 6, wherein said moving step further comprises the step of identifying a most recently used entry from said virtual cache address buffer to store said replacement entry.

8. The method of claim 4, wherein said real cache status buffer has a plurality of entries corresponding to said real cache address buffer entries, said method further comprising the step of marking said real cache status buffer entry corresponding to said hit as a most recently used entry.

9. The method of claim 1, further comprising the step of providing data responsive to said address from said real cache data buffer to said bus master if said address is found in said real cache address buffer.

10. The method of claim 1, further comprising the step of adding one or more read ahead addresses to said read requests from said bus master if said bus master address output is not found in either of said real cache address buffer and said virtual cache address buffer.

11. The method of claim 1, wherein said virtual cache address buffer has a plurality of entries, said storing step further comprises the steps of:

identifying one of said entries as a replacement entry; and copying said bus master address into said replacement entry.

12. The method of claim 11, wherein said identifying step further comprises the step of searching said virtual cache status buffer for a replacement entry.

13. The method of claim 11, wherein said identifying step selects said replacement entry using a least recently used replacement algorithm.

14. The method of claim 13, wherein said replacement entry is marked as the most recently used entry to update said virtual cast status buffer.

15. The method of claim 13, wherein said least recently used replacement algorithm uses a queue.

16. The method of claim 1, further comprising the step of adding one or more read ahead addresses to said read requests from said bus master if said bus master address output is not found in either of said real cache address buffer and said virual cache address buffer.

17. The method of claim 16, wherein said adding step adds a small number of said read ahead addresses to said read requests.

18. A disk caching system for buffering read requests comprising:
    a bus master having a bus master address output for requesting data and a bus master data input for receiving data corresponding to said bus master address;
    a data storage device having a data storage device address input for receiving a data storage device address and a data storage device data output for providing data corresponding to said data storage device address; and
    a cache having a bus master address input coupled to said bus master address output, a bus master data output coupled to said bus master data input, a data storage device address output coupled to said data storage device address input, and a data storage device data input coupled to said data storage device data output, said cache system having a real cache with a real cache data buffer, a real cache address buffer and a real cache status buffer, the real cache address buffer having a plurality of entries for storing real cache addresses, said cache system having a virtul cache with only a virtual cache address buffer and a virtual cache status buffer, said cache system buffering data associated with said bus master address, said cache system including:
        means for storing said bus master address in only said virtual cache address buffer if said bus master address is not found in either of said real cache address buffer and said virtual cache address buffer;
        means for filling said real cache data buffer with data responsive to said bus master address from said data storage device if said bus master address is found only in said virtual cache address buffer;
        a means for providing data responsive to said address from said real cache data buffer to said data storage device if said address is found in said real cache address buffer; and
        a means for updating said real cache address buffer and said real cache status buffer if said bus master address is found only in said virtual cache address buffer;
        a means for providing data responsive to said address directly from said bus master to said data storage device without placing said data in said real cache buffer if said address is not found in said real cache buffer or said virtual cache address buffer;
        a means for detecting a hit in one of said real cache buffer entries if said bus master address matches a real cache address; and
        a means for providing data from said real cache data buffer associated with said hit to said bus mater.

19. The disk caching system of claim 18, wherein said real cache status buffer stores cache invalidation information, further comprising a means for updating said real cache status buffer with cache invalidation bits.

20. The disk caching system of claim 18, wherein each of said real cache status buffer and virtual cache status buffer stores usage history information, further comprising a means for updating each of said real cache status buffer and said virtual cache status buffer with usage history statistics.

21. The disk caching system of claim 18, wherein said real cache address buffer has a plurality of address entries and said real cache data buffer has a plurality of buffer entries, one buffer entry corresponding to each of said address entries, said means for filling further comprising:
    means for identifying one of said address entries in said real cache address buffer as a replacement entry;
    means for copying said bus master address into said replacement entry; and
    means for copying said data responsive to said address into said real cache data buffer entry associated with said replacement entry.

22. The disk caching system of claim 21, wherein said identifying means further comprises a means for selecting a least recently used entry from said real cache address buffer.

23. The disk caching system of claim 21, further comprising a means for moving the address stored in said replacement entry to said virtual cache address buffer before copying said address from said bus master into said replacement entry.

24. The disk caching system of claim 23, wherein said moving means further comprises a means for identifying a most recently used entry from said virtual cache address buffer to store said replacement entry.

25. The disk caching system of claim 21, wherein said real cache status buffer has a plurality of entries corresponding to said real cache address buffer entries, said disk caching system further comprising a means for marking said real cache status buffer entry corresponding to said hit as a most recently used entry.

26. The disk caching system of claim 18, further comprising a means for providing data responsive to said address from said real cache data buffer to said bus master if said address is found in said real cache address buffer.

27. The disk caching system of claim 18, further comprising a means for adding one or more read ahead addresses to said read requests from said bus master if said bus master address output is not found in either of said real cache address buffer and said virtual cache address buffer.

28. The disk caching system of claim 18, wherein said virtual cache address buffer has a plurality of entries, said storing means further comprises:
    means for identifying one of said entries as a replacement entry; and
    means for copying said bus master address into said replacement entry.

29. The disk caching system of claim 28, wherein said identifying means further comprises a means for searching said virtual cache status buffer for a replacement entry.

30. The disk caching system of claim 28, wherein said identifying means selects said replacement entry using a least recently used replacement algorithm.

31. The disk caching system of claim 30, wherein said replacement entry is marked as the most recently used entry to update said virtual cache status buffer.

32. The disk caching system of claim 30, wherein said least recently used replacement algorithm uses a queue.

33. The disk caching system of claim 18, further comprising a means for adding one or more read ahead addresses to said read requests from said bus master if said bus master address output is not found in either of said real cache address buffer and said virtual cache address buffer.

34. The disk caching system of claim 33, wherein said adding means adds a small number of said read ahead addresses to said read requests.

35. A computer system for buffering read requests comprising:
    a bus master having a bus master address output for requesting data and a bus master data input for receiving data corresponding to said bus master address;

a data storage device having a data storage device address input for receiving a data storage device address and a data storage device data output for providing data corresponding to said data storage device address; and a cache system having a bus master address input coupled to said bus master address output, a bus master data output coupled to said bus master data input, a data storage device address output coupled to said data storage device address input, and a data storage device data input coupled to said data storage device data output, said cache system having a real cache with a real cache data buffer, a real cache address buffer and a real cache status buffer, said cache system having a virtual cache with only a virtual cache address buffer and a virtual cache status buffer, said cache system buffering data associated with said bus master address, said cache system including:

means for storing said bus master address in only said virtual cache address buffer if said bus master address is not found in either of said real cache address buffer and said virtual cache address buffer;

means for filling said real cache data buffer with data responsive to said bus master address from said data store device if said bus master address is found only in said virtual cache address buffer;

means for providing data responsive to said bus master address directly from said bus master to said data storage device without placing said data in said real cache data buffer if said address is not found in said real cache address buffer or said virtual cache address buffer; and means for updating said real cache address buffer and said real cache status buffer if said address is found only in said virtual cache address buffer, means for detecting a hit in one of said real cache address buffer entries if said bus master address output matches a real cache address; and means for providing data from said real cache data buffer associated with said hit to said bus master.

36. The computer system of claim 35, wherein said real cache status buffer stores cache invalidation information, further comprising a means for updating said real cache status buffer with cache invalidation bits.

37. The computer system of claim 35, wherein each of said real cache status buffer and virtual cache status buffer stores usage history information, further comprising a means for updating each of said real cache status buffer and said virtual cache status buffer with usage history statistics.

38. The computer system of claim 35, wherein said real cache address buffer has a plurality of address entries and said real cache data buffer has a plurality of buffer entries, one buffer entry corresponding to each of said address entries, said means for filling further comprising:

means for identifying one of said address entries in said real cache address buffer as a replacement entry;

means for copying said consumer address into said replacement entry; and means for copying said data responsive to said address into said real cache data buffer entry associated with said replacement entry.

39. The computer system of claim 38, wherein said identifying means further comprises a means for selecting a least recently used entry from said real cache address buffer.

40. The computer system of claim 38, further comprising a means for moving the address stored in said replacement entry to said virtual cache address buffer before copying said address from said bus master into said replacement entry.

41. The computer system of claim 40, wherein said moving means further comprises a means for identifying a most recently used entry from said virtual cache address buffer to store said replacement entry.

42. The computer system of claim 38, wherein said real cache status buffer has a plurality of entries corresponding to said real cache address buffer entries, said computer system further comprising a means for marking said real cache status buffer entry corresponding to said hit as a most recently used entry.

43. The computer system of claim 35, further comprising a means for providing data responsive to said address from said real cache data buffer to said bus master if said address is found in said real cache address buffer.

44. The computer system of claim 35, further comprising a means for adding one or more read ahead addresses to said read requests from said bus master if said bus master address output is not found in either of said real cache address buffer and said virtual cache address buffer.

45. The computer system of claim 35, wherein said virtual cache address buffer has a plurality of entries, said storing means further comprises:

means for identifying one of said entries as a replacement entry; and means for copying said bus master address into said replacement entry.

46. The computer system of claim 45, wherein said identifying means further comprises a means for searching said virtual cache status buffer for a replacement entry.

47. The computer system of claim 45, wherein said identifying means selects said replacement entry using a least recently used replacement algorithm.

48. The computer system of claim 47, wherein said replacement entry is marked as the most recently used entry to update said virtual status buffer.

49. The computer system of claim 47, wherein said least recently used replacement algorithm uses a queue.

50. The computer system of claim 35, further comprising a means for adding one or more read ahead addresses to said read requests from said bus mater if said bus master address output is not found in either of said real cache address buffer and said virtual cache address buffer.

51. The computer system of claim 50, wherein said adding means adds a small number of said read ahead addresses to said read requests.

52. A method for buffering read requests from a bus master to a data storage device using a cache system, said bus master having a bus master address output for requesting data and a bus master data input for receiving data corresponding to said bus master address output, said data storage device having a data storage device address input for receiving a data storage device address and a data storage device data output for providing data corresponding to said data storage device address input, said cache system having a bus master address input coupled to said bus master address output, a bus master data output coupled to said bus master data input, a data storage device address output coupled to said data storage device address input, and a data storage device data input coupled to said data storage device data output, said cache system having a real cache with a real cache data buffer, a real cache address buffer and a real cache status buffer, said cache system having a virtual cache with only a virtual cache address buffer and a virtual cache status buffer, said cache system buffering data associated with said bus master address, said method comprising the steps of:

buffering said bus master data in said real cache data buffer and storing said bus master address output in only said virtual cache address buffer if said bus master address output is not found in either of said real cache address buffer and said virtual cache address buffer; and filling said real cache data buffer with data responsive to said bus master address output from said data storage device if said bus master address output is found only in said virtual cache address buffer.

53. A method for buffering requests from a bus master to a data storage device using a cache system, said cache system including a virtual cache and a real cache, said method comprising the steps of:

predicting a read request is a sequential access if a request generates a hit to the real cache;

predicting a read request is a random access if a request generates a miss to the virtual cache and a miss to the real cache; and predicting a read request is a sequential access if the request generates a miss to the real cache and a hit to the virtual cache.

54. The method of claim 53, further comprising the step of:

providing data directly from the real cache to the data storage device if a sequential access is predicted.

55. The method of claim 53, further comprising the step of:

providing data directly from the bus master to the data storage device if a random access is predicted.

56. The method of claim 55, the virtual cache including a virtual cache address buffer, further comprising the step of:

updating the virtual cache address buffer with the address of the request to enable sequential accesses to be checked for sequential operation.

57. The method of claim 55, the virtual cache including a virtual status buffer, further comprising the step of:

marking the virtual cache status buffer corresponding to the request of a most recently used line to update said virtual cache.

58. The method of claim 53, further comprising the step of:

enlarging the request to include a plurality of read-ahead requests if the request is small and if a sequential access is predicted.

59. The method of claim 53, the virtual cache including a virtual cache buffer, further comprising the step of:

detecting if the address corresponding to the address is found in the virtual cache address buffer to determine if there is a hit to the virtual cache.

60. The method of claim 53, the real cache including a real cache address buffer, and further comprising the step of:

detecting if the address corresponding to the request is found in the real cache address buffer to determine if there is a hit to the real cache.

61. The method of claim 53, wherein the data storage device is a disk drive.

* * * * *